US006807558B1

(12) United States Patent
Hassett et al.

(10) Patent No.: US 6,807,558 B1
(45) Date of Patent: *Oct. 19, 2004

(54) UTILIZATION OF INFORMATION "PUSH" TECHNOLOGY

(75) Inventors: Gregory P. Hassett, Cupertino, CA (US); Jason Douglas, San Francisco, CA (US); Max Mancini, San Jose, CA (US)

(73) Assignee: Pointcast, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/089,056

(22) Filed: Jun. 2, 1998

Related U.S. Application Data

(60) Continuation-in-part of application No. 08/962,139, filed on Oct. 31, 1997, which is a division of application No. 08/489,591, filed on Jun. 12, 1995, now Pat. No. 5,740,549
(60) Provisional application No. 60/047,363, filed on Jun. 2, 1997.

(51) Int. Cl.$^7$ .............................................. G06F 15/16
(52) U.S. Cl. ......................................... 709/203; 707/7
(58) Field of Search ............................... 709/203, 206, 709/202, 245, 223, 224; 707/1, 10, 3, 6, 104, 7; 705/14, 27

(56) References Cited

U.S. PATENT DOCUMENTS

| | | | |
|---|---|---|---|
| 3,848,193 A | 11/1974 | Martin et al. | 325/53 |
| 3,987,398 A | 10/1976 | Fung | 325/309 |
| 4,170,782 A | 10/1979 | Miller | 358/84 |
| 4,186,413 A | 1/1980 | Mortimer | 358/146 |
| 4,224,644 A | 9/1980 | Lewis et al. | 360/72.2 |
| 4,287,592 A | 9/1981 | Paulish et al. | 370/88 |
| 4,288,809 A | 9/1981 | Yabe | 358/12 |
| 4,305,101 A | 12/1981 | Yarbrough et al. | 360/69 |

(List continued on next page.)

FOREIGN PATENT DOCUMENTS

| | | | |
|---|---|---|---|
| DE | 2918846 A1 | 5/1979 | |
| DE | 33 25810 C2 | 10/1985 | |
| DE | 3621 263 A1 | 1/1988 | |
| DE | 0 733 983 | 9/1996 | ........... G06F/17/30 |
| EP | 0113022 | 11/1984 | |

(List continued on next page.)

OTHER PUBLICATIONS

T. Berners–Lee, et al.; "Request for Comments (RFC) 1866, 'Hypertext Markup Language—20'", Nov. 1995.*

Source code for the Isis File $tk_{13}$new.c dated May 1990, Feb. 24, 1998 and Dec. 14, 1987.

CCITT Standard X.209.

CCITT Standard X.208.

(List continued on next page.)

*Primary Examiner*—Mark H. Rinehart
*Assistant Examiner*—Marc D. Thompson
(74) *Attorney, Agent, or Firm*—Blakely, Sokoloff, Taylor & Zafman, LLP

(57) ABSTRACT

An apparatus and computer-implemented method for distributing information to a plurality of client devices on a network is disclosed. The computer-implemented method includes the steps of: 1) receiving a variety of information from a plurality of sources, 2) organizing the variety of information into information categories, and 3) distributing the variety of information to the plurality of client devices based on the information categories requested by the plurality of client devices. The invention further includes the steps of: 4) accepting user input at the client device to specify information categories for retrieval from a server, 5) generating a user profile based on the information categories specified by the user input, and 6) retrieving information at predetermined intervals from the server based on the user profile.

46 Claims, 36 Drawing Sheets

U.S. PATENT DOCUMENTS

| | | | |
|---|---|---|---|
| 4,307,446 A | 12/1981 | Barton et al. ................ 364/200 |
| 4,338,644 A | 7/1982 | Staar .......................... 360/132 |
| 4,347,498 A | 8/1982 | Lee et al. .............. 340/825.02 |
| 4,381,522 A | 4/1983 | Lambert ...................... 358/86 |
| 4,405,946 A | 9/1983 | Knight .................... 358/192.1 |
| 4,429,385 A | 1/1984 | Cichelli et al. ............... 370/92 |
| 4,476,488 A | 10/1984 | Merrell ........................ 358/86 |
| 4,477,695 A | 10/1984 | Buck ............................. 178/3 |
| 4,488,179 A | 12/1984 | Kruger ....................... 358/181 |
| 4,519,029 A | 5/1985 | Thompson ................... 364/200 |
| 4,536,791 A | 8/1985 | Campbell et al. ........... 358/122 |
| 4,575,579 A | 3/1986 | Simon et al. .................. 178/4 |
| 4,587,514 A | 5/1986 | Schas et al. ................ 340/347 |
| 4,602,279 A | 7/1986 | Freeman ...................... 358/86 |
| 4,641,205 A | 2/1987 | Beyers, Jr. ................. 360/33.1 |
| 4,645,873 A | 2/1987 | Chomet ....................... 379/93 |
| 4,677,434 A | 6/1987 | Fascenda .................... 380/23 |
| 4,677,466 A | 6/1987 | Lert, Jr. et al. ............... 358/84 |
| 4,691,351 A | 9/1987 | Hayashi et al. ............... 380/10 |
| 4,691,354 A | 9/1987 | Palminteri ................... 380/15 |
| 4,701,794 A | 10/1987 | Froling et al. ............... 358/147 |
| 4,703,423 A | 10/1987 | Bado et al. ................. 364/400 |
| 4,706,121 A | 11/1987 | Young ........................ 358/142 |
| 4,722,005 A | 1/1988 | Ledenbach .................. 358/168 |
| 4,745,559 A | 5/1988 | Willis et al. ................. 364/514 |
| 4,751,578 A | 6/1988 | Reiter et al. ................ 358/183 |
| 4,751,669 A | 6/1988 | Sturgis et al. .............. 364/900 |
| 4,768,110 A | 8/1988 | Dunlap et al. .............. 360/33.1 |
| 4,775,935 A | 10/1988 | Yourick ...................... 364/401 |
| 4,788,682 A | 11/1988 | Vij et al. .................. 370/110.1 |
| 4,814,972 A | 3/1989 | Winter et al. ............... 364/200 |
| 4,815,030 A | 3/1989 | Cross et al. ................ 364/900 |
| 4,821,102 A | 4/1989 | Ichikawa et al. ............ 358/183 |
| 4,823,122 A | 4/1989 | Mann et al. ........... 340/825.28 |
| 4,829,569 A | 5/1989 | Seth-Smith et al. .......... 380/10 |
| 4,866,700 A | 9/1989 | Berry et al. ............... 370/58.1 |
| 4,868,866 A | 9/1989 | Williams, Jr. ................ 380/49 |
| 4,873,662 A | 10/1989 | Sargent ...................... 364/900 |
| 4,890,321 A | 12/1989 | Seth-Smith et al. .......... 380/20 |
| 4,899,394 A | 2/1990 | Lee ................................ 382/9 |
| 4,908,707 A | 3/1990 | Kinghorn .................... 358/147 |
| 4,908,713 A | 3/1990 | Levine ........................ 358/335 |
| 4,974,149 A | 11/1990 | Valenti ....................... 364/200 |
| 4,975,904 A | 12/1990 | Mann et al. ................ 370/85.1 |
| 4,975,905 A | 12/1990 | Mann et al. |
| 4,977,455 A | 12/1990 | Young ........................ 358/142 |
| 4,987,486 A | 1/1991 | Johnson et al. ............... 358/86 |
| 4,987,496 A | 1/1991 | Greivenkamp .............. 358/448 |
| 4,991,011 A | 2/1991 | Johnson et al. ............. 358/141 |
| 4,992,940 A | 2/1991 | Dworkin ..................... 364/401 |
| 4,994,908 A | 2/1991 | Kuban et al. ................. 358/86 |
| 4,994,909 A | 2/1991 | Graves et al. ................. 358/86 |
| 5,001,554 A | 3/1991 | Johnson et al. ............... 358/86 |
| 5,008,853 A | 4/1991 | Bly et al. .................... 364/900 |
| 5,053,883 A | 10/1991 | Johnson ...................... 358/349 |
| 5,058,108 A | 10/1991 | Mann et al. ................ 370/85.1 |
| 5,075,771 A | 12/1991 | Hashimoto ................... 358/84 |
| 5,077,607 A | 12/1991 | Johnson et al. ............... 358/86 |
| 5,091,936 A | 2/1992 | Katznelson et al. .......... 380/19 |
| 5,099,319 A | 3/1992 | Esch et al. .................... 358/86 |
| 5,105,184 A | 4/1992 | Pirani et al. ................ 340/721 |
| 5,131,020 A | 7/1992 | Liebesny et al. ............. 379/59 |
| 5,133,075 A | 7/1992 | Risch ......................... 395/800 |
| 5,151,789 A | 9/1992 | Young ..................... 358/194.1 |
| 5,177,680 A | 1/1993 | Tsukino et al. .............. 364/401 |
| 5,182,640 A | 1/1993 | Takano ........................ 358/86 |
| 5,187,787 A | 2/1993 | Skeen et al. ................ 395/600 |
| 5,200,823 A | 4/1993 | Yoneda et al. .............. 358/146 |
| 5,220,420 A | 6/1993 | Hoarty et al. ................. 358/86 |
| 5,220,501 A | 6/1993 | Lawlor et al. ............... 364/408 |
| 5,220,657 A | 6/1993 | Bly et al. .................... 395/425 |
| 5,230,048 A | 7/1993 | Moy ........................... 395/600 |
| 5,231,493 A | 7/1993 | Apitz ......................... 358/146 |
| 5,261,042 A | 11/1993 | Brandt ....................... 395/156 |
| 5,265,033 A | 11/1993 | Vajk et al. ................... 364/514 |
| 5,276,869 A | 1/1994 | Forrest et al. .............. 395/600 |
| 5,283,639 A | 2/1994 | Esch et al. ..................... 348/6 |
| 5,283,731 A | 2/1994 | Lalonde et al. ............. 364/401 |
| 5,285,272 A | 2/1994 | Bradley et al. ................. 348/6 |
| 5,301,028 A | 4/1994 | Banker et al. .............. 348/570 |
| 5,305,195 A | 4/1994 | Murphy ...................... 364/401 |
| 5,319,455 A | 6/1994 | Hoarty et al. .................. 348/7 |
| 5,319,707 A | 6/1994 | Wasilewski et al. .......... 380/14 |
| 5,321,750 A | 6/1994 | Nadan ......................... 380/20 |
| 5,327,554 A | 7/1994 | Palazzi, III et al. ......... 395/600 |
| 5,337,155 A | 8/1994 | Cornelis ..................... 348/473 |
| 5,339,239 A | 8/1994 | Manabe et al. ............. 364/401 |
| 5,343,300 A | 8/1994 | Hennig ....................... 348/478 |
| 5,345,594 A | 9/1994 | Tsuda .......................... 455/18 |
| 5,347,632 A | 9/1994 | Filepp et al. ................ 395/200 |
| 5,353,218 A | 10/1994 | De Lapa et al. ............ 364/401 |
| 5,355,480 A | 10/1994 | Smith et al. ................ 395/600 |
| 5,355,490 A | 10/1994 | Kou ........................... 395/700 |
| 5,357,276 A | 10/1994 | Banker et al. .................. 348/7 |
| 5,361,393 A | 11/1994 | Rossillo ...................... 395/650 |
| 5,379,383 A | 1/1995 | Yunoki ....................... 395/325 |
| 5,379,421 A | 1/1995 | Palazzi, III et al. ......... 395/600 |
| 5,404,505 A | 4/1995 | Levinson .................... 395/600 |
| 5,414,773 A | 5/1995 | Handelman ................... 380/49 |
| 5,426,427 A | 6/1995 | Chinnock et al. ........... 340/827 |
| 5,426,594 A | 6/1995 | Wright et al. ............... 364/514 |
| 5,428,606 A | 6/1995 | Moskowitz ................... 370/60 |
| 5,434,978 A | 7/1995 | Dockter et al. ............. 395/200 |
| 5,438,355 A | 8/1995 | Palmer ......................... 348/1 |
| 5,442,771 A | 8/1995 | Filepp et al. ................ 395/650 |
| 5,446,919 A | 8/1995 | Wilkins ...................... 455/6.2 |
| 5,448,262 A | 9/1995 | Lee et al. .................... 345/212 |
| 5,465,401 A | 11/1995 | Thompson ................... 455/89 |
| 5,471,629 A | 11/1995 | Risch ......................... 395/800 |
| 5,473,143 A | 12/1995 | Vak et al. ................... 235/380 |
| 5,475,740 A | 12/1995 | Biggs, Jr. et al. ............. 379/91 |
| 5,479,472 A | 12/1995 | Campana, Jr. et al. ........ 379/58 |
| 5,483,466 A | 1/1996 | Kawahara et al. ....... 364/514 C |
| 5,485,370 A | 1/1996 | Moss et al. ................. 364/408 |
| 5,491,820 A | 2/1996 | Belove et al. ............... 395/600 |
| 5,493,677 A | 2/1996 | Balogh et al. .............. 395/600 |
| 5,498,003 A | 3/1996 | Gechter ...................... 273/434 |
| 5,511,160 A | 4/1996 | Robson ....................... 395/162 |
| 5,512,935 A | 4/1996 | Majeti et al. ................... 348/9 |
| 5,515,098 A | 5/1996 | Carles ........................... 348/8 |
| 5,517,605 A | 5/1996 | Wolf ........................... 395/155 |
| 5,524,146 A | 6/1996 | Morrisey et al. ............ 379/207 |
| 5,528,490 A | 6/1996 | Hill ............................ 364/403 |
| 5,537,586 A | 7/1996 | Amram et al. .............. 395/600 |
| 5,557,721 A | 9/1996 | Fite et al. .................... 395/148 |
| 5,559,868 A | 9/1996 | Blonder ........................ 379/96 |
| 5,577,266 A | 11/1996 | Takahisa et al. .............. 455/66 |
| 5,579,471 A | 11/1996 | Barber et al. ............... 395/326 |
| 5,579,537 A | 11/1996 | Takahisa ...................... 455/66 |
| 5,583,563 A | 12/1996 | Wanderscheid et al. ....... 348/13 |
| 5,584,025 A | 12/1996 | Keithley et al. ............. 395/615 |
| 5,600,364 A | 2/1997 | Hendricks et al. .............. 348/1 |
| 5,600,366 A | 2/1997 | Schulman ...................... 348/9 |
| 5,604,542 A | 2/1997 | Dedrick ...................... 348/552 |
| 5,608,874 A | 3/1997 | Ogawa et al. |
| 5,614,940 A | 3/1997 | Cobbley et al. ................ 348/7 |
| 5,617,565 A | 4/1997 | Augenbraun et al. ........ 395/604 |
| 5,715,397 A | 2/1998 | Ogawa et al. |
| 5,721,910 A * | 2/1998 | Unger et al. ................ 707/104 |
| 5,740,549 A | 4/1998 | Reilly et al. .................. 705/14 |
| 5,748,190 A | 5/1998 | Kjorsvik ..................... 345/329 |

| | | | |
|---|---|---|---|
| 5,761,662 A | | 6/1998 | Dasan .......................... 707/10 |
| 5,768,528 A | | 6/1998 | Stumm .................. 395/200.61 |
| 5,809,242 A | | 9/1998 | Shaw et al. .................. 395/200 |
| 5,819,284 A | | 10/1998 | Farber et al. ............... 707/104 |
| 5,892,909 A | * | 4/1999 | Grasso et al. ............... 709/201 |
| 5,913,040 A | * | 6/1999 | Rakavy et al. .............. 709/224 |
| 6,018,619 A | * | 1/2000 | Allard et al. ............... 709/224 |
| 6,134,583 A | | 10/2000 | Herriot |
| 6,138,162 A | | 10/2000 | Pistriotto et al. |
| 6,173,311 B1 | | 1/2001 | Hassett et al. |

FOREIGN PATENT DOCUMENTS

| | | |
|---|---|---|
| EP | 0206565 | 12/1986 |
| EP | 0 566 454 A1 | 10/1993 |
| EP | 96303727 | 8/1996 |
| GB | 2034995 | 6/1980 |
| GB | 2141907 | 1/1985 |
| GB | 2207314 | 1/1987 |
| GB | 2185670 | 7/1987 |
| GB | 2256549 | 12/1992 |
| GB | 2281434 | 3/1995 |
| JP | 1-18380 | 1/1989 |
| JP | 3204259 | 5/1991 |
| JP | 4250591 | 7/1992 |
| JP | 6314184 | 8/1994 |
| WO | 8804507 | 6/1988 |
| WO | 9007844 | 7/1990 |
| WO | 9212488 | 7/1992 |
| WO | 9309631 | 5/1993 |
| WO | 9319427 | 9/1993 |
| WO | WO 94/30000 | 12/1994 |
| WO | 9531069 | 11/1995 |
| WO | 9630864 | 10/1996 |
| WO | 9634466 | 10/1996 |
| WO | WO 96/36141 | 11/1996 |

OTHER PUBLICATIONS

Joanna Bean "Colorado–Based Startup Uses Computer Screen Saver for Marketing", The Gazette Telegraph. Feb. 22, 1994.

Donald T. Hawkins, 'Electronic Advertising on Online Information Systems', Online, v. 18, n. 2, pp. 26–39.3/94.

Cooperstock et al., "Why Use A Fishing Line When you have a Net? An Adaptive Multicast Data Distribution Protocol", 1996 USENIX Technical Conference, Jan. 22–26, 1996, San Diego, CA pp. 343–352.

CompuServe Brochure, pp. 1–4, Cupertino, CA U.S.A., 1996.

"First Looks", PC Magazine, Jan. 7, 1997, p. 60.

David Bank, "Inverted Web: How Net is Becoming More Like Television to Draw Advertisers",The Wall Street Journal, Friday, Dec. 13, 1996.

Robinson, G., et al. "Touch–Tone' Teletext, A Combined Teletext–View Data System", IEEE Transaction on Consumer Electronics, vol. CE25, No. 3, Jul. 1979, pp. 299–303.

Crowther, G.O., "Teletext and Viewdata Systems and Their Possible Extension to Europe and USA", IEEE Transaction on Consumer Electronics, vol. CE25, No. 3, Jul. 1979, pp. 288–294.

Article, "There's more to one–way address ability than meets the eye".

Article, "DIP II", "The Ultimate Program Guide Unit From the Ultimate Listing Company".

"View Data", The British Library, Chapter 10, Science Reference Library, pp. 111–123.

F. Schneider, "United States District Court Northern District of New York", Rue Walsh & Miller, Attorney's at Law, Nov. 11, 1993.

PED Software Corporation, "Journalist User Guide", 1993, May 23, 1997, pp. 1–141.

"Journalists Quick Start", Article PED Software Corporation, 1997.

"Better Internet Access With WINVN" Technology Today, Jame M. Dumoulin, p. 14. Aerospace Technology Innovation.

Brian Proffit, "Intercast Brings the Web to TV", PC Tech/Internet Tools, Jan. 21, 1997, pp 203–204.

K. Birman, et al., "The ISIS System Manual", By The ISIS Project, Jun. 15, 1988, pp 1–291.

K. Birman, et al., Programming Your Way Out Of The Past ISIS and The Meta Project, Sun Technology, Summer 1989, pp 90–104.

Ped Software Corporation, "Journalist For A Window on a new World Of News", 1994, pp 1–4.

Diaz et al., Rule Management in Object Oriented Databases: A Uniform Approach Barcelona, Spain, Sep. 1991, pp 317–326.

"Monitoring Corporate Information With FirstFloor Products", World Wide Web, 1996.

Risch, T., "Monitoring Database Objects", Amsterdam 1989, pp 444–453.

McKenzie G.A., "ORACLE–An Information Broadcasting Service Using Data Transmission in the Vertical Interval", Journal of the SMPTE vol. 83, Jan. 1974, pp 5–10.

Schroeder et al., "Experience with Grapevine: The Growth of a Distributed System", ACM Transactions on Computer Systems, vol. 2, No. 1, Feb. 1984, pp 3–23.

Roizen, J., Teletext in the USA, SMPTE Journal, vol. 90, No. 7, Jul. 1981, pp 602–610.

James, A., "ORACLE–Broadcasting the Written Word", Wireless World, vol. 79, No. 1453, Jul. 1973, pp 314–316.

Phillips, R., Mediaview: "A General Multimedia Digital Publication System", Communications of the ACM, Jul. 1991, vol. 34, No. 7, pp 75–83.

Forsdick et al., "Initial Experience with Multimedia Documents in Diamond", 1984, pp99–113.

Birman et al., "Exploiting Virtual Synchrony in Distributed Systems", Operating Systems Principles, 1987, pp 123–138.

Bulterman et al., A Structure for Transportable, Dynamic Multimedia Documents, USENIX, Summer 1991, Nashville, TN, pp 137–155.

InterTect, Ltd., "Health & Science News", Hyper Texxt Newzz, Mar. 1996.

Kass, A., "An Interchange Standard and System for Browsing DIgital Documents", May 22, 1995, pp1–105.

Avalos, G., "PointCast to team with Microsoft, add new Net dimension", Contra Costa Times, Dec. 12, 1996, pp 1C, 5 C.

Bank, D., "Microsoft Picks On–Line News From Point-Cast", The Wall Street Journal, Marketplace, Dec. 12, 1996.

"Microsoft to Expand Its Internet Reach", Los Angeles Times, Dec. 12, 1996.

Postel et al., "The ISI Experimental Multimedia Mail System", ISI Research Report, Sep. 1986, pp1–27.

Huang et al., "Multimedia E–mail: the Evolution Approach Based on Adapters", Sep. 1994, pp 785–800.

Phillips, R., "An Interpersonal Multimedia Visualization System", IEEE Computer Graphics & Applications, May 1991, pp 20–27.

Srinivas Ramanathan et al., "Architectures fro Personalized Multimedia", IEEE Multimedia, Spring 1994, pp 37–46.

Dunkin, A., "PC Meets TV: The Plot Thickens", Personal Business Week, Dec. 23, 1996, pp 94–95.

Dieberger, A., "Browsing the WWW by interacting with a textual virtual environment—A framework for experimenting with navigational metaphors", 1996, pp 170–179.

Ramanathan et al., "Towards personalized multimedia dial-up services", Computer Networks and ISDN Systems, 1994, pp1035–1322.

Borenstein, N., Multimedia Electronic Mail: "Will the Dream become a reality?" Communicatons of the ACM, Apr. 1991, vol. 34, No. 4, pp 117–119.

Zuckerman L., "Pushing the Envelope on Delivery of Customized Internet", New York Times, Dec. 9, 1996, pp D5.

Yan et al., "Sift– A Tool for Wide–Area Information dissemination" Unenix Technical conference, Jan. 16–20, 1995, New Orleans, LA, pp 177–186.

Story et al., "The RightPages Image–Based Electronic Library for Alerting and Browsing", AT&T Bell Laboratories, Sep. 1992, pp 17–25.

Mitchell, G., "Two Free Programs Deliver News to Your PC", PC World, Aug. 1996, pp 76.

Corel Draw Users Manual–Version 4.0, pp 1–475, Corel Corporation, 1993.

"A Need–To–Know Basis", WebMaster, Oct. 1996.

"Microsoft Cuts deals with 2 firms", San Jose Mercury News, Dec. 12, 1996.

"Microsoft Unites With Pointcast at Trade Show", San Francisco Chronicle, Dec. 12, 1996.

"Microsoft and Pointcast in Broadcast Alliance", The New York Times, Dec. 12, 1996.

"Big Business at Businesswire.Com", INSITE, Web Techniques, Christopher Elliott, pp 95–99, Dec. 1996.

"Microsoft teams with Poincast", The Globe and Mail, Dec. 12, 1996.

Prodigy article, Prodigy Services Company, 1989, pp1–6.

K. Birman, et al., "The ISIS System Manual", By the ISIS Project, Mar. 15, 1988, pp 1–15.

"Journalist", "Your Personalized Newspaper for CompServe", Ped Software Corporation, 1994, pp 1–143.

Lamont, L., "Synchronization of Multimedia Data for a Multimedia News–on–Demand Application", IEEE Journal on Selected Areas in communications, vol. 14, No. 1, Jan. 1996, pp 264–278.

Baer, R., "Tele–Briefs a Novel User–Selectable Real Time News Headline Service for Cable TV", IEEE Transactions on Consumer Electronics, vol. CE–25, No. 3, Jul. 1979, pp 406–408.

Frook, J., "News to the Desktop", Interactive Age, Apr. 29, 1996, pp IA1, 1A8.

Hoffert, E. et al., The Digital News System at EDUCOM: A Convergence of Interactive Computing, Newspapers, Television and High–Speed Networks, Communications of the ACM, Apr. 1991/vol. 34, pp 113–116.

"PointCast Network", Netguide, www.netguidemag.com, Sep. 1996, pp 121.

"Specification of Abstract Syntax Notation One", Fascicle VIII.4–Rec.X.208, Melbourne, 1988, pp 57–130.

J. Gecael, "The Architecture of Videotex Systems", 1983, pp174–177, pp 233–238.

Professional Group E14 (Television and Sound), Broadcast and Wired Teletext Systems–Ceefax, Oracle, Viewdata, Jan. 13, 1976, pp 2–7.

"IBM Technical Disclosure Bulletin", IBM Corporation, Patent Library vol. 28, No. 5, Oct. 1985, pp 2160–2161.

Singh, A., "News Servers", PC Magazine, Jan. 21, 1997.

Thimm, H., "A Multimedia Enhanced CSCW Trvice for Wide Area Cooperative Authoring of Multimedia Documents", SIGOIS Bulletin, Dec. 1994, vol. 15, No. 2, pp 49–57.

Jackson, S. et al., "InterMail: A Prototype Hypermedia Mail System", Dec. 1991, pp 405–409.

Miller, G. et al., "News On–Demand for Multimedia Networks",1993, pp 383–392.

K. P. Birman et. al., "ISIS Documentation: Release 1", Jul. 1987, pp 1–89.

Barrie, J., et al., "The World Wide Web As An Instructional Tool", Science/vol. 274, Oct. 1996, pp 371–372.

Berst, J., "'Push' Products Redefine Internet", PC Week, 1996, pp 63.

Overton, R., "PointCast 1.1: More Content for News Junkies", PC World, Jan. 1997, pp 102.

Nauchno–Tekh, article , "An Adaptation Method for SDI", Nauchno–Teknicheskaya Informatsiya Seriya 2, 1973, USSR, pp 25–27.

Simba Information, Inc., "PED Delivers Personalized Newspapers To Users Desktops", Electronic Information Report, Apr. 15, 1994, vol. 15, No. 14.

O'Connell, G.M., article, "Turning on to screen Savers", Jun. 1994, pp 97.

Journal Article, "Innovation That Has a Purpose Is Called Key to Tehnology Success Anonymous", Marketing News vol. 22, No. 6, Mar. 14, 1988, pp 37, 40.

Inglesby, T., Journal Article, "Manufacturing Systems Supplement", Oct. 1992, pp 6–10.

Quain, J., "Journalist Delivers Your Own Personlized Newspaper", PC Magazine, vol. 12, No. 17, Oct. 12, 1993, pp 49.

Flynn, M. et al., "The Daily Me: Laying Out Tomorrow's (electronic) News", PC Magazine, vol. 12, No. 15, Oct. 12, 1993, pp 29.

Textine Global News, Home Computer–From Your own Correspondent, Sep. 24, 1993, pp 15.

Business & Industry, "Journalist–A New Podigy Add On", Newsbytes News Network, Apr. 5, 1994.

Peake, S. et al., "New Custom File Capability For Nexis", Dateline: Dayton, OH., May 1, 1985.

Abrahms, D., "Patent Office May Hinder Hopping Of bunny Across Computerscreens", The Washinton Tiimes, Business Section, Apr. 16, 1997, pp B7.

Williams, M., Article, "Oracle's Vision of Networked Future", Geneva, Switzerland, Oct. 5, 1995.

Article, "And Now The News– On Your PC Screen", Broadcast Newsbytes News Network, Kanata, Ontario, Canada, Oct. 16, 1995.

Article, "Globe Information To Market NewsEdge In Canada", Newsbytes News Network, Toronto, Ontario, Canada, May 26, 1992.

Patent Abstracts of Japan, "European Patent Office", Abstract date Jan. 20, 1993, Application JP910000887.

Patent Abstracts of Japan, "European Patent Office", Patent date Aug. 11, 1994, Application JP930124730.

Patent Abstracts of Japan, "European Patent Office", Abstract date Apr. 12, 1991, Application JP900000018.

Berkely Systems, Inc. Article, "More After Dark for Macintosh", vol. 1, pp 1–13, 1991.

Daniel Grotta, et al., "PhotoGenix creates screen–saver slide shows", PC Magazine vol. 13, No. 16, pp 52, Sep. 27, 1994, Copyright Ziff–Davis Publishing Company 1994.

Rebecca Rohan, "In Your Face makes you a star–okay, a screen saver", Computer Shopper, May 1994, vol. 14, No. 5, pp 767, Copyright Coastal Associates Publishing LP 1994.

David Morgenstern, "Farcast service broadcasts instant info via the Internet; database use "droids" to process new items", PC Week, Aug. 29, 1994, vol. 11, No. 34, pp 50, Copyright Ziff–Davis Publishing Company 1994.

Karen Rodriguez, "Individual to tap Internet with an agent–based news service", Info World, Oct. 24, 1994, vol. 16, No. 43, pp 58, Copyright infoWorld Publishing Company 1994.

Article, "Specification Of Basic Encoding Rules For Abstract Syntax Notation One", Fascicle VIII.4–Rec. X.209, Melbourne, 1988, pp131–151.

Patrick McKenna, "COMDEX–Moon Valley's NetCruiser CD and more", Newsbytes, Nov. 16, 1994.

F. Schmuck, "ISIS Release", V2.0, May 1990, pp 1–12.

Article, "VCR Technology", No. 4 in a series of reports from Mitsubishi R&D, Video Review, Jan. 1989.

U. Bensch, "VPV–VideoText Programs Videorecorder", The Phillips Group of Companies, Eindhoven, The Netherlands, Jun. 10, 1988 pp1–5.

Barbara Krasnoff, "Microsoft Scenes screen savers bring culture to your desktop (various natural and artistic wonders depicted as screen images)", Computer Shopper (cont.).

Affidavit in Support of Lead Case Plaintiff's Motion for Partial Summary Judgment, ISIS Distributed Systems, Inc. versus Teknekron Software, Inc. Civil Action No 93–CV–878 (FJS, GJD) (member case), Nov. 4, 1993.

* cited by examiner

The Big Picture

WWW.POINTCAST.COM

INVEST WITH CONFIDENCE
T. ROWE PRICE

POINTCAST™

PUBLIC ACCESS

ECOSOURCE

RED TIDE BLAMED IN DEATHS OF THE MANATEE

SIERRA CLUB CONGRESSIONAL PLATFORM

US MAYOR MOCKS RECYCLING PROGRAMS

FIGURE 22

ARTICLE PROPERTIES

TITLE: POINTCAST NEWSLETTER

URL: HTTP://WWW.POINTCAST.COM/CONNECTIONS/NEWSLETTER.HTML

ARTICLE TYPE
- ⦿ HTML
- ○ ANIMATION

AUTO FETCH
- ⦿ YES
- ○ NO

SHOW ITEM IN
- ■ CHANNEL VIEWER
- ☐ SMART SCREEN

BACKGROUND COLOR
- ○ WINDOWS
- ○ ANIMATION

CONTINOUS LOOP
- ○ YES
- ○ NO

STRETCH TO FIT
- ○ YES
- ○ NO

ALIGN ▶

[PREVIEW] [CONTINUE] [CANCEL]

FIGURE 30

ARTICLE PROPERTIES

TITLE: POINTCAST 2.0 PREVIEW

URL: HTTP://WWW.POINTCAST.COM/CONNECTIONS/PREVIEW.ANM

ARTICLE TYPE
- ○ HTML
- ⦿ ANIMATION

AUTO FETCH
- ⦿ YES
- ○ NO

SHOW ITEM IN
- ▪ CHANNEL VIEWER
- ▪ SMART SCREEN

BACKGROUND COLOR
- ○ WINDOWS
- ○ ANIMATION

CONTINUOUS LOOP
- ○ YES
- ○ NO

STRETCH TO FIT
- ○ YES
- ○ NO

ALIGN: LEFT ▼

[PREVIEW] [CONTINUE] [CANCEL]

FIGURE 31

CONNECTIONS WIZARD

THE FOLLOWING INFORMATION IS USED TO LABEL AND IDENTIFY YOUR CONNECTION ON THE INTERNET

CONNECTION NAME: POINTCAST CONNECTION

CONNECTION URL: HTTP://WWW.POINTCAST.COM/ PCAST.PPA

MORE INFO URL: HTTP://WWW.POINTCAST.COM/ CONNECTIONS

EXPIRATION DATE/TIME: 04/25/97 12:00

CONNECTION DESCRIPTION:
PROVIDES INFORMATION ON THE LATEST INTERNET BROADCAST TOOLS, NEWS AND PRODUCT INFORMATION. GIVES UPDATED CHANNEL INFORMATION AND CHANNEL HIGHTLIGHTS.

[<< BACK]  [NEXT >>]  [FINISH]  [CANCEL]

FIGURE 32

CONNECTIONS

POINTCAST IS READY TO DOWNLOAD YOUR CONNECTION ARTICLES. DEPENDING ON YOUR INTERNET CONNECTION, THIS CAN TAKE ANYWHERE FROM THIRTY SECONDS TO SEVERAL MINUTES.

YOU CAN MINIMIZE POINTCAST AND CONTINUE TO WORK IN OTHER APPLICATIONS AS IT DOWNLOADS THE CONNECTION ARTICLES. WOULD YOU LIKE TO DOWNLOAD YOUR FIRST BATCH OF ARTICLES NOW?

YES  NO

FIGURE 38

UTILIZATION OF INFORMATION "PUSH" TECHNOLOGY

CROSS-REFERENCE TO RELATED APPLICATIONS

This U.S. Patent Application is a continuation-in-part of and claims priority to U.S. patent application Ser. No. 08/962,139 filed on Oct. 31, 1997 and entitled "INFORMATION AND ADVERTISING DISTRIBUTION SYSTEM AND METHOD". The U.S. patent application Ser. No. 08/962,139 is itself a divisional of and claims priority to U.S. Pat. No. 5,740,549 dated Apr. 14, 1998 and entitled "INFORMATION AND ADVERTISING DISTRIBUTION SYSTEM AND METHOD", which issued from U.S. patent application Ser. No. 08/489,591 filed on Jun. 12, 1995. This U.S. Patent Application also claims priority to U.S. Provisional Patent Application 60/047,363 filed on Jun. 2, 1997 and entitled, "IMPROVEMENTS IN THE UTILIZATION OF INFORMATION "PUSH" TECHNOLOGY".

TECHNICAL FIELD

This invention relates to am improved system and method for distributing, utilizing and displaying disparate information in a "push" technology environment to a set of subscribers. More particularly, it relates to adaptations of information usage that conditions a "push" information system to optimally match and display headlines, information text, animations, graphics and photographs for the benefit of a user.

BACKGROUND

Push networks have been with us for several years. As contrasted with a user initiated search that starts fresh each time it is initiated, push technology brings new information to the user's desktop once an initial selection of news or other information items has been selected by the subscriber/user. In short, push technology is a system wherein each subscriber receives information, files and/or advertising from a network server for display at their local workstation on a refreshed and dynamic basis whenever a predetermined criteria, usually involving idleness of the local workstation, is met.

Push technology, in its simplest form, can be considered to start with 28 electronic mail (e-mail), messages delivered to a user from almost any source once the 29 user's e-mail identity and address have been established and made known. Another 30 barebones form of push technology is an Internet mailing list which causes subject related messages to be sent to a subscriber's computer. A more robust and current manifestation of push technology is exemplified by the PointCast Network whereby information content and advertising is distributed via the Internet to client based subscribers for display as a screen saver after the subscribers's workstation has been idle for a predetermined period.

In the PointCast Network, a user, employing locally installed push client software, subscribes to channels or topics of interest. Channels are information packaged in logical groupings. The user's expressed preferences are captured in a subscriber profile that can subsequently be changed as desired by the user. The system allows each user to customize the operation of his or her own push client, controlling the kind of information the client retrieves from the server and, within prescribed limits, the frequency of such refresh operations. Basically, after establishing a profile, the user receives updated information either in response to automatic polling of the content server at specified intervals by the push client software or in response to the server sending immediate information updates to client software that has been enabled for such frequent feeds of information.

The PointCast Network is an integrated client/server system that is designed to provide current information, along with advertisements, in an interesting and useful manner. The ability to supply and display all sorts of information for a subscriber in a compelling manner and timely fashion is what distinguishes the leading push technology systems, such as the PointCast Network, from the simplistic stuffed window approach.

The basic PointCast Network system is described in commonly assigned and co-pending U.S. patent application Ser. No. 08/489,591 filed Jun. 28, 1995 for an INFORMATION AND ADVERTISING DISTRIBUTION SYSTEM AND METHOD in the names of J. Reilly and G. Hassett. That application is incorporated herein by reference in its entirety.

With respect to improvements in the manner in which data communicated, directed and/or serviced in the PointCast Network system, please refer to commonly assigned and co-pending U.S. patent application Ser. No. 08/795,476 filed Feb. 11, 1997 for AN APPARATUS, METHOD AND ARTICLE OF MANUFACTURE FOR COMMUNICATING DATA BEHIND FIREWALLS AND PROXY SERVERS in the names of G. Hassett and J. Reilly, commonly assigned and copending U.S. patent application Ser. No. 08/797,724 filed Feb. 11, 1997 for AN APPARATUS, METHOD AND ARTICLE OF MANUFACTURE FOR REDIRECTING CLIENT REQUESTS ON A NETWORK in the names of J. Pistritto and K. Montinola and commonly assigned and co-pending U.S. patent application Ser. No. 08/800,153 filed Feb. 13, 1997 for AN APPARATUS, METHOD AND ARTICLE OF MANUFACTURE FOR SERVICING CLIENT REQUESTS ON A NETWORK in the names of G. Hassett and H. Collins. All three of these improvement patent applications are incorporated herein by reference in their entirety. In the original PointCast Network system, an information server stored and updated a database of information items and advertisements. The information items and advertisements were each categorized so that each was associated with a specific information category. Workstations remotely located from the information server each included a display device, a communication interface for receiving at least a subset of the information items and advertisements from the information server's database and local memory for storing the information items and advertisements received from the information server.

An information administrator in each workstation established communication with the information server from time to time in order to update the information items and advertisements stored in local memory with at least a subset of the information items and advertisements stored by the information server. An information display controller in each workstation caused the display on the workstation's display device of at least a subset of the information items and advertisements stored in local memory when the workstation meets predefined idleness criteria.

At least some of the workstations were provided with a profiler for storing the subscriber profile data. The subscriber profile data represents subscriber information viewing preferences, indicating information categories for which a subscriber associated with the workstation does and does not want to view information items. The information display controller includes a filter for excluding from the information items displayed on the display device those information items inconsistent with the subscriber profile data.

SUMMARY OF THE INVENTION

The present invention is an apparatus and computer-implemented method for distributing information to a plurality of client devices on a network. The computer-implemented method includes the steps of: 1) receiving a variety of information from a plurality of sources, 2) organizing the variety of information into information categories, and 3) distributing the variety of information to the plurality of client devices based on the information categories requested by the plurality of client devices. The invention further includes the steps of: 4) accepting user input at the client device to specify information categories for retrieval from a server, 5) generating a user profile based on the information categories specified by the user input, and 6) retrieving information at predetermined intervals from the server based on the user profile.

BRIEF DESCRIPTION OF THE DRAWINGS

FIG. 22 shows another example of a SmartScreen that may be displayed.

FIG. 30 shows an exemplary graphical user interface or screen for specifying article properties, in this case for an HTML type newsletter, which may be presented when an article is added or edited.

FIG. 31 shows an exemplary graphical user interface similar to that shown in FIG. 30 when the article type is animation.

FIG. 32 shows an exemplary graphical user interface or screen that may be presented by a Connection Wizard to allow a user to specify information used to label and identify a connection on the Internet.

FIG. 38 shows an exemplary graphical user interface or screen that may be presented to allow downloading of connection articles to begin.

DETAILED DESCRIPTION OF THE INVENTION

Figure 1A:
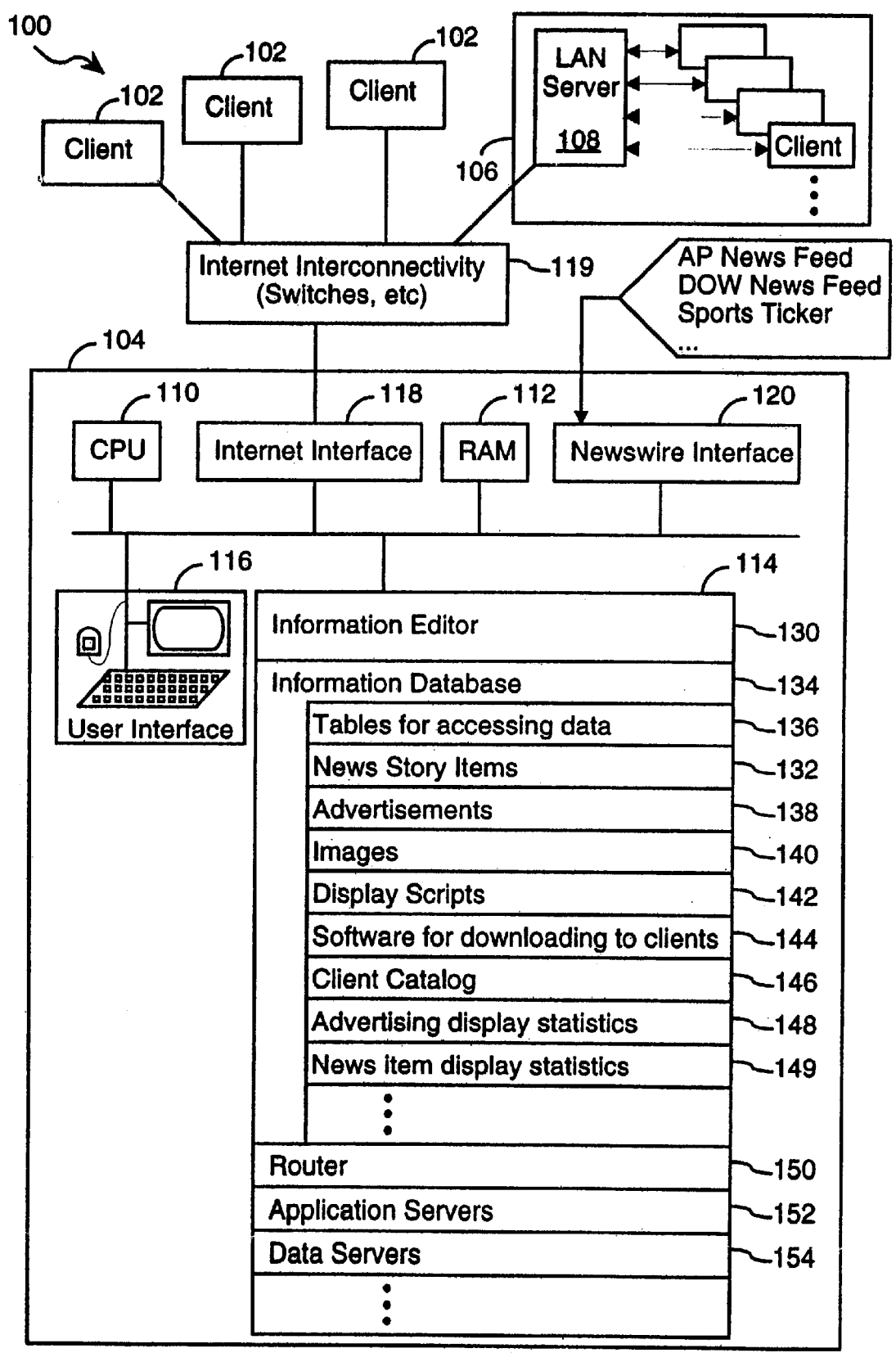
FIG. 1A depicts a block diagram of an information push technology system wherein information, advertisements, scripts and software updates are stored, transmitted and utilized.

Referring to FIG. 1A, there is shown a computer based information and advertising distribution system 100 having many client computers 102 and at least one information server computer 104. Client computers or workstations are often called "subscribers' computers or workstations" in the present document, and the terms "subscriber computer or workstation" and "client computer or workstation" will be used synonymously. In many instances, a set of subscribers 102 will be located within a common local area network (LAN), and are connected to a LAN server 108.

Each subscriber's computer 102 is connected to the information server 104 via the Internet 119 for a small fraction of each day. Other forms of electronic communication connections, including private wide area networks similar to CompuServe, America OnLine or Prodigy, can be used to connect subscribers' computers to the information server 104.

While most client computers are desktop computers, such as IBM compatible computers and Macintosh computers, virtually any type of computer can be a client computer as long as it can support the "screen saver" mode of operation described herein.

The information server 104 includes a central processing unit 110, primary memory 112 (i.e., fast random access memory) and secondary memory 114 (typically disk storage), a user interface 116, an Internet interface 118 for communication with the client computers 102 via the Internet 119, and one or more news wire interfaces 120 for receiving news feeds from information transmission services such as the AP news feed, the DOW news feed and various sports news feeds. An information editor 130 is used, typically under the direction of a person using the user interface 116, to select news stories received from the new feeds and to edit and format the news stories into a form suitable to dissemination to subscribers' computers using the present invention. The selected and edited news stories 132 are stored in an information database 134 in the information server 104.

The information editor 130 is used to assign each news story to an information category and, where appropriate, to also assign the news story to one or more sub-categories. The information editor maintains a list of the currently defined categories and sub-categories. The category list can be updated by the personnel operating the information server, typically to add and delete special new categories associated with major news events such as a famous trial or event which generates many news stories. The category to which each news story is assigned is represented in one or more Data Access Tables 136.

The information editor 130 is also used to divide most news stories into two components or portions: a primary component or portion and a secondary component or portion. The primary component is what is displayed on a subscriber's workstation when the subscriber's workstation is turned on but has been idle, while the secondary component is what is displayed, along with the primary components only upon a subscriber's request. For instance, as will be described below, there are number of ways in which a subscriber can request the display of the "full text" of a news item (which may include photographs and the like). For convenience, the primary component of each news story is sometimes herein called the "headline", even though it will often contain more information than just the headline of the news item, and the secondary component of each news story will sometimes be called the "body."

Advertisements 138 are also stored in the information database 134 and each advertisement is assigned to at least one of the predefined information categories. Each advertisement is displayed on subscribers' workstations simultaneously with news items assigned to the same category as the advertisement. When an advertisement is assigned to multiple categories, it is treated in most respects as several advertisements each assigned to one category, except that only one copy of the advertisement is actually stored.

Next, the information database in the server computer includes a set of images 140 used during the display of news items and advertisements. For instance, different "wallpaper" or background images may be useful when displaying news items in various types of information categories. As an example, the images 140 include three fixed images for indicating that the stock market has risen, fallen or stayed largely unchanged. Then, depending on what has happened to the stock market on any particular day, information concerning the amount of change in the stock market during the relevant time period, and sometimes other associated information, is superimposed on a selected one of those fixed images. Other images stored in the information database include various "actors" that can be moved around the display with the news items when the system is in screen saver mode.

The information database 134 also stores a set of "display scripts" 142. A script controls the display of news items and advertisements, typically displaying a selected number of news items and one advertisement for a period of 30 seconds. A script determines the number of news items displayed, determines the positions of the news items and advertisement on the display, determines any movement of the news items around the displayed image, and determines what background image or images are displayed in conjunction with the news items.

An important concept associated with the PointCast Network is that of constantly varying the presentation of news items and advertisements, through the use of a rotating set of scripts, makes it easier and more palatable for subscribers to read the news headlines and advertisements being presented. Thus, at least two distinct scripts, and preferably three or more distinct scripts are usually provided for most information categories, with a total of at least ten different scripts being used. Most scripts can be used with multiple categories of news items. The procedure for defining display scripts and the associated data structure are described below with reference to FIG. 4A.

The information database 134 also stores software modules 144 for downloading to subscribers' computers. The information administration management procedures and information viewing procedures in subscribers' computers will need updating and upgrading from time to time. The new versions of these software procedures are stored in the information server's information database 134 for downloading into the computers of subscribers at the same time that the information items or advertisements in the subscriber computers' information database 184 is updated. Since numerous types of subscriber computers are supported, the server's information database 134 will typically store a set of updated software modules for each of the supported types of computers.

Finally, the information database 134 includes advertising display statistics 148 and news item display statistics 149. The display statistics are collected from the subscribers' computers when the subscribers' computers call in for updated news stories and the like. Advertising display statistics indicate how many times each advertisement has been displayed on subscribers' computers. Display statistics for each advertisement are divided into a display count for displaying during data viewer usage, a display count for other display instances, and an indication of each advertisement the user has interacted with, such as by "clicking" on the advertisement to connect to the advertiser's World Wide Web page. News item display statistics 149 concern how much time the subscriber spent viewing each non-advertising item in the data viewer as well as the amount of time the screen saver was active for each information category.

Other procedures stored in the information server's secondary memory are a router procedure 150, application server procedures 152, and data server procedures 154. The utility of these procedures is explained below with reference to FIGS. 5 and 6.

Figure 1B:
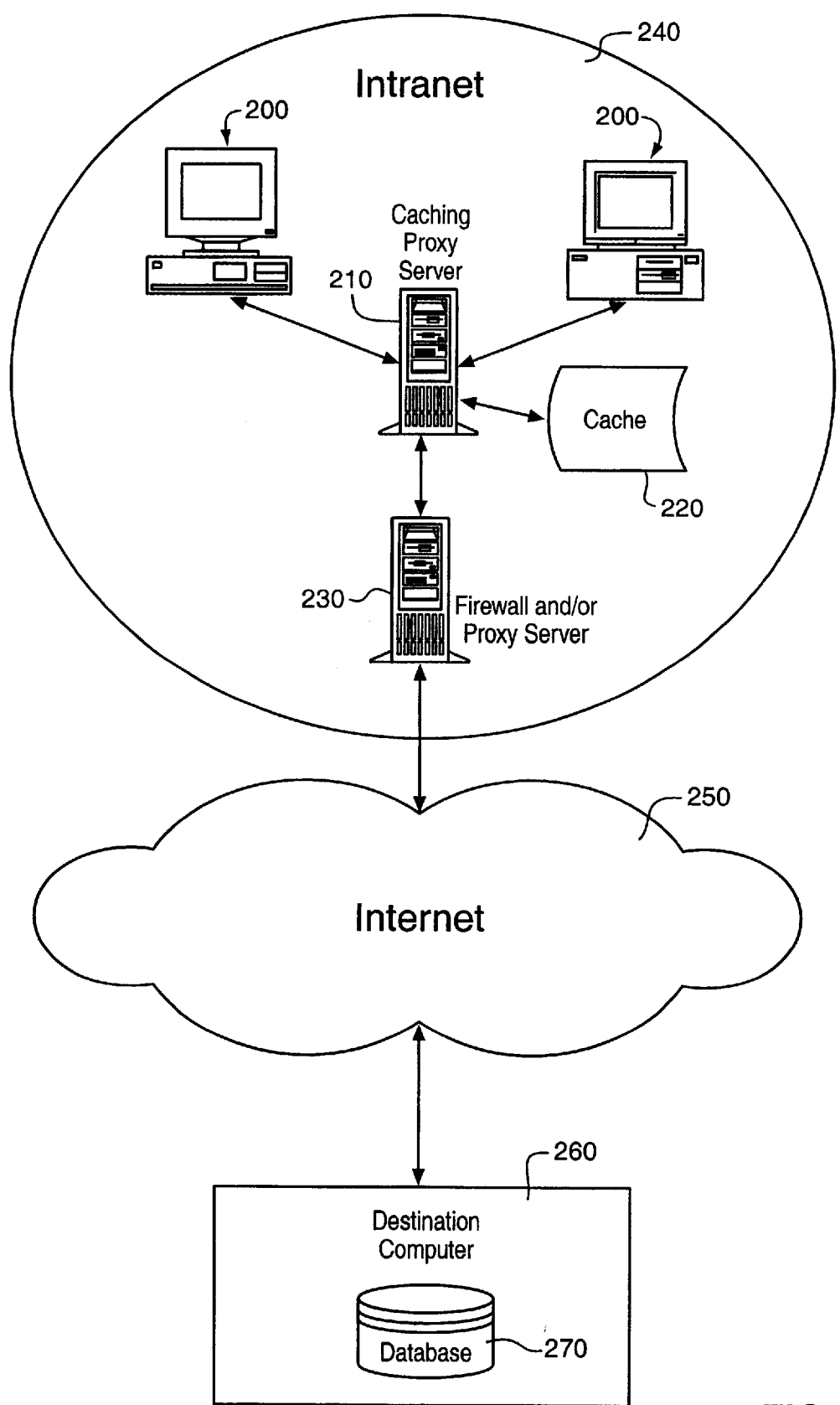
FIG. 1B schematically shows the FIG. 1A information push technology system.

FIG. 1B diagramatically illustrates an updated version of the information push technology system described above with respect to FIG. 1A. In this instance, subscriber workstations 200, typically PC-based computers, are coupled to and communicate with a caching proxy server 210 that is provided with a data cache 220 where frequently requested information can be stored. Proxy server 210 is connected to the Internet 250 via a firewall and/or proxy server 230. Additional details pertinent to this improved arrangement and other innovations for moving push technology supplied information for utilization by individual subscribers who are connected to the Internet via an intranet having a proxy server and/or firewall will be found in the aforementioned, co-pending and commonly assigned '476, '724 and '800 patent applications.

Figure 2:
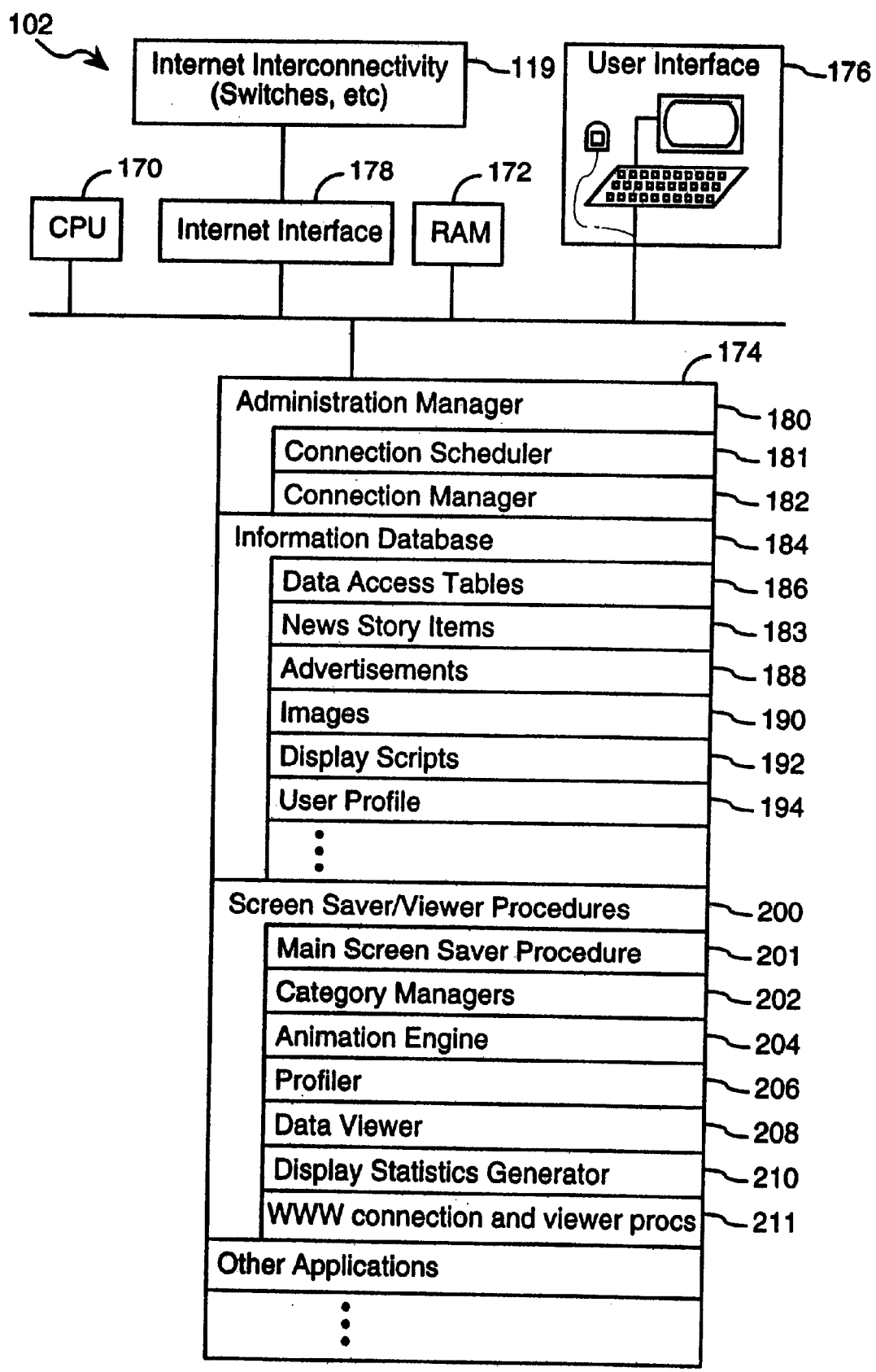
FIG. 2 illustrates a block diagram of a subscriber's workstation as adapted for use in the information push technology system of FIGS. 1A and 1B.

FIG. 2 is a schematic representation of the subscriberts workstation or computer 102 that is not connected to the information server 104 via a LAN server. For subscribers' workstations connected to the information server 104 via a LAN server 108, FIG. 2 is representative of the LAN server, but the display device used by each such subscriber's computer to view news items and advertisements is part of the subscriber's workstation rather than the LAN server 108.

The subscriber workstation 102 includes a central processing unit 170, primary memory 172 (i.e., fast random access memory) and secondary memory 174 (typically disk storage), a user interface 176, and an Internet interface 178 for communication with the information server 104 via the Internet 119. In this document, whenever the phrase "clicking on V is used, that phrase means a subscriber selecting the X image on a display device by positioning a pointer image over the X image, using the subscriber computer's mouse or trackball device, and then depressing a button or key to indicate selection of the X image.

An administration manager 180 schedules and controls all communications with the information server 104. The administration manager 180 includes a connection scheduler 181 that initiates the execution of a connection manager 182 that handles communications with the information server as well as the integration of information and software procedures received from the information server into the information and software procedures stored in the client computer.

The workstation's secondary memory is used to store a local information database 184 that includes news stories 183, advertisements 188, images 190 and display scripts 192. In each case the workstation's secondary memory stores at least a subset of the corresponding items stored in the information server 104. The amount of information stored in the workstation's secondary memory depends on the amount of secondary memory available for storing such information, as well as a user profile 194 for the subscriber that indicates which categories and subcategories of news stories are of interest to the subscriber.

Figure 5:
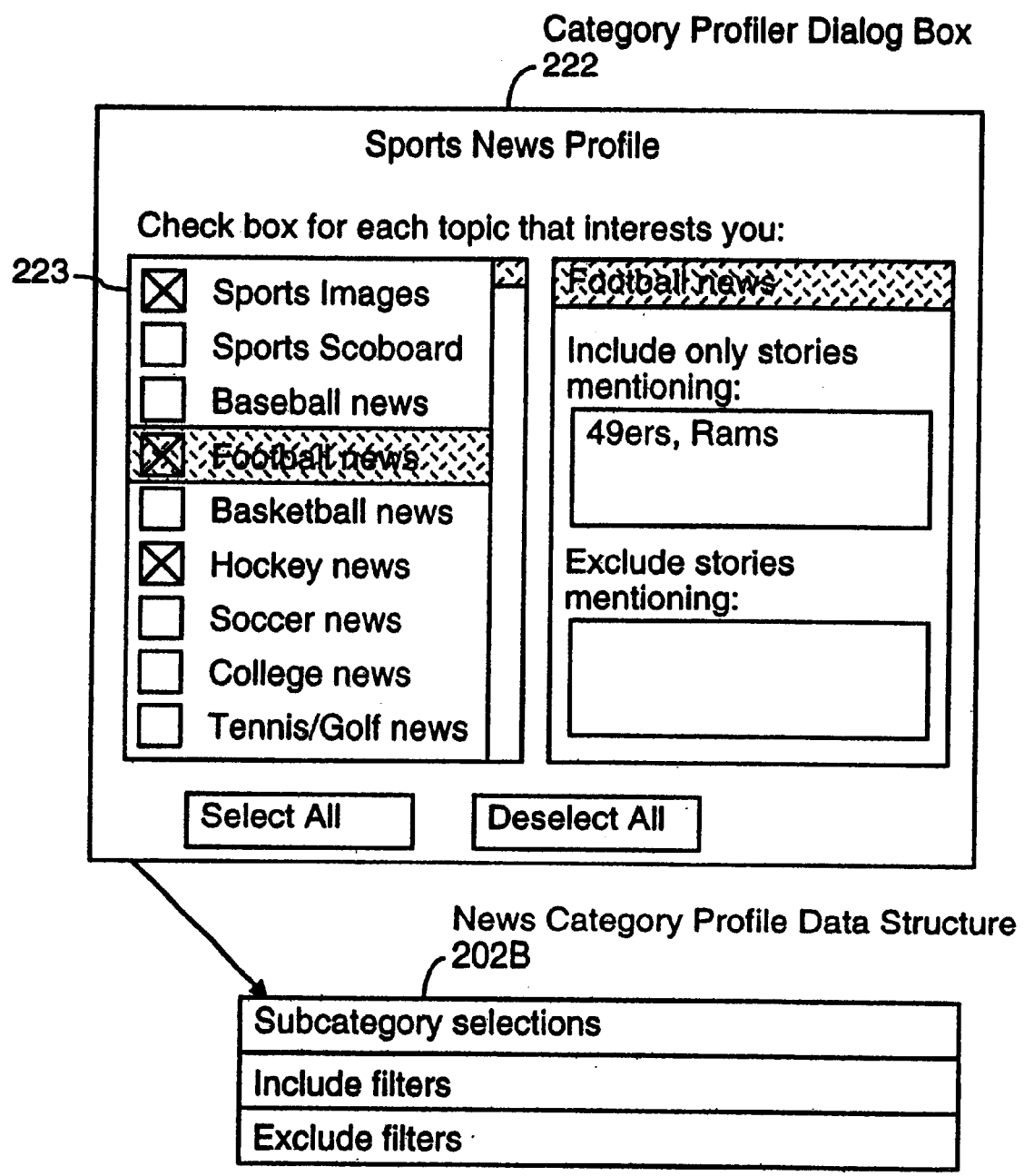
FIG. 5 schematically illustrates the dialog box used to define the user profile for one information category.
Figure 6:
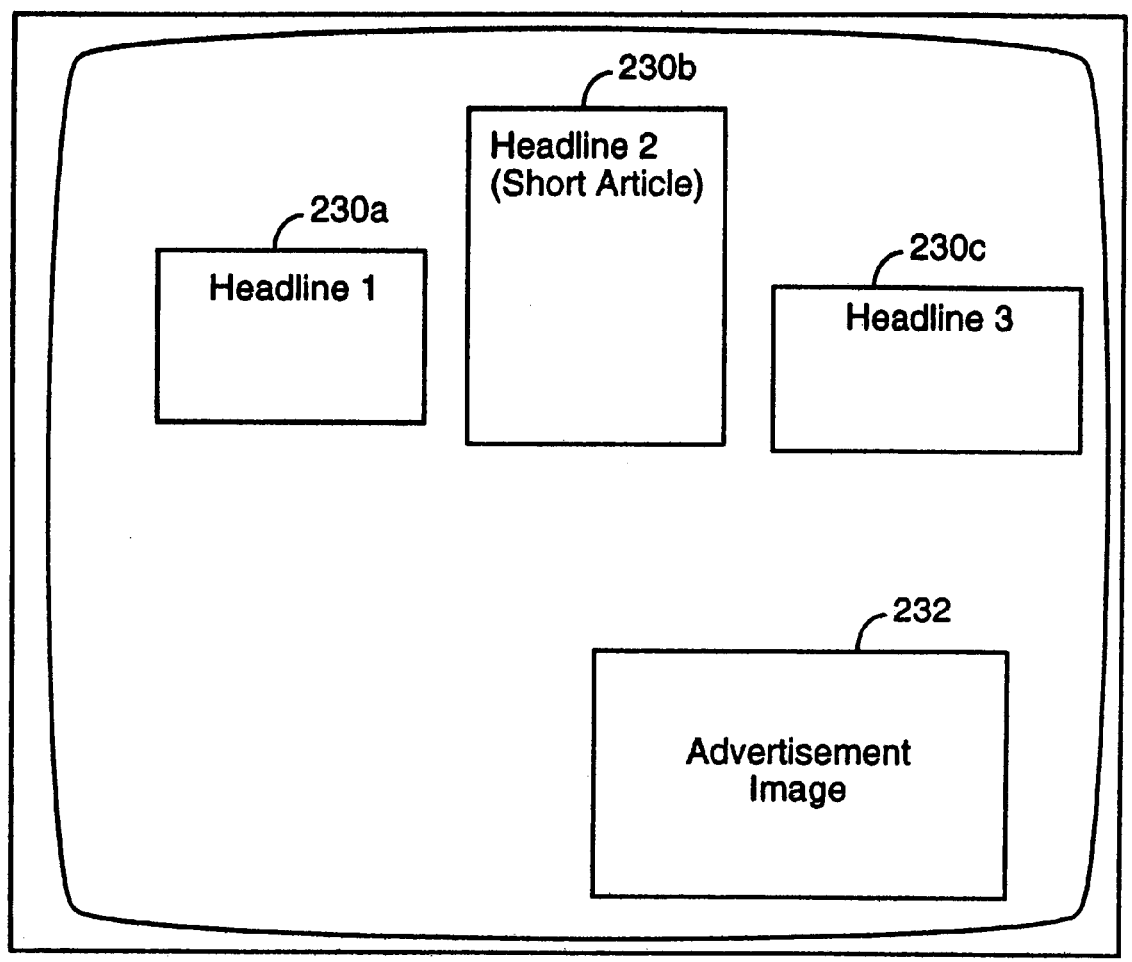
FIG. 6 shows the schematic representation of a display generated on a 5 subscriber's display device using a screen saver procedure in association with the 6 workstation of FIG. 2.

Data Access Tables 186, which are discussed in more detail below with reference to FIGS. 5 and 6, are used to access news stories, advertisements and display scripts associated with each of the categories of news items that are to be displayed on the subscriber's workstation.

Screen Saver and Viewer Procedures 200 are a set of procedures for controlling the display of news stories and advertisements. These procedures include a main screen saver procedure 201, category managers 202, an animation engine 204, a profiler 206, a data viewer 208 and an advertisement display statistics generator 210.

Each of the category managers 202 is a collection of programs and data associated with particular information categories. In the preferred embodiment there is a separate category manager for each information category, although in some cases it may be more efficient to use the same category manager for two or more information categories.

Figure 3:
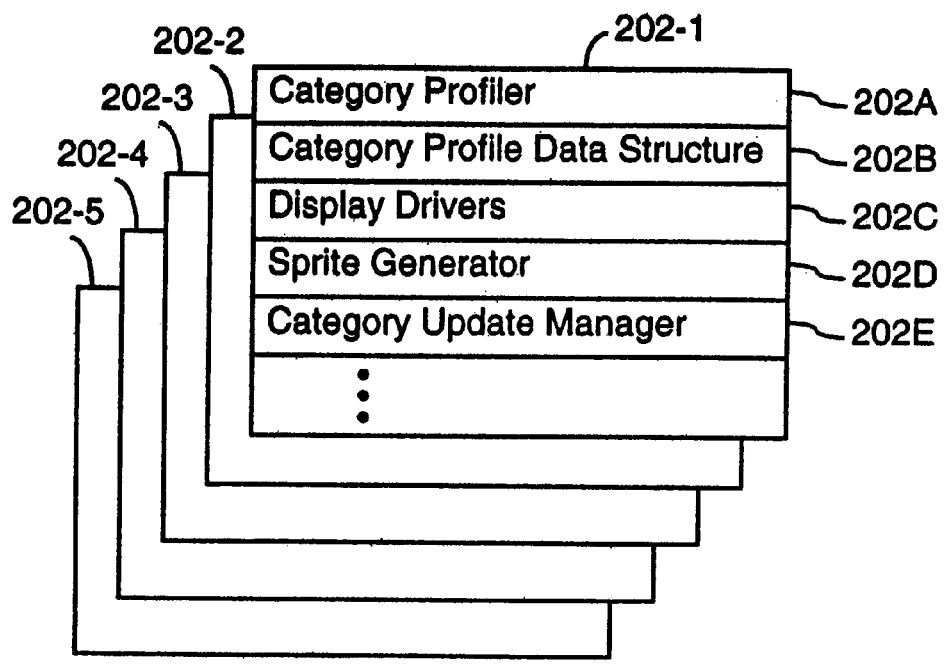
FIG. 3 schematically shows the procedures and data structures in a set of category managers.

Referring to FIG. 3, each category manager 202 includes a category profiler 202A, a category profile data structure 202B, one or more display drivers 202C for viewing items in the corresponding information category with the data viewer, a sprite generator 202D generating images displayed by the screen saver procedure, and an update 5 manager 202E.

The category profiler in each category presents a category profile dialog to the subscriber to determine the subscriber's interest in receiving information relating to particular subcategories. Subcategories may relate to specific companies, geographic regions, specific sports and sports teams, and so on, depending on the category. The result of the decisions made by the subscriber during the category profile dialog is stored as a category profile data structure.

The update manager in each category handles the process of updating the local information database with new items from the information server for that information category as well as the deletion of all items and the rebuilding of the portion of the data access tables used to control access to the information items, advertisements and display scripts in that information category.

The display drivers in each category manager are customized to generate images specifically needed in the corresponding categories. For instance, in the category manager for the sports category, the display driver includes instructions for generating a simulated scoreboard which is automatically updated every few seconds to show a sequence of game scores or contest outcomes in various sporting events. In another example, the display driver for the weather category includes instructions specifically designed for efficiently displaying weather maps and other weather information.

Referring once again to FIG. 2, the animation engine 204 interprets a currently selected display script and controls the display of a selected set of news stories and an advertisement in accordance with the instructions in the currently selected display script.

Figure 4:
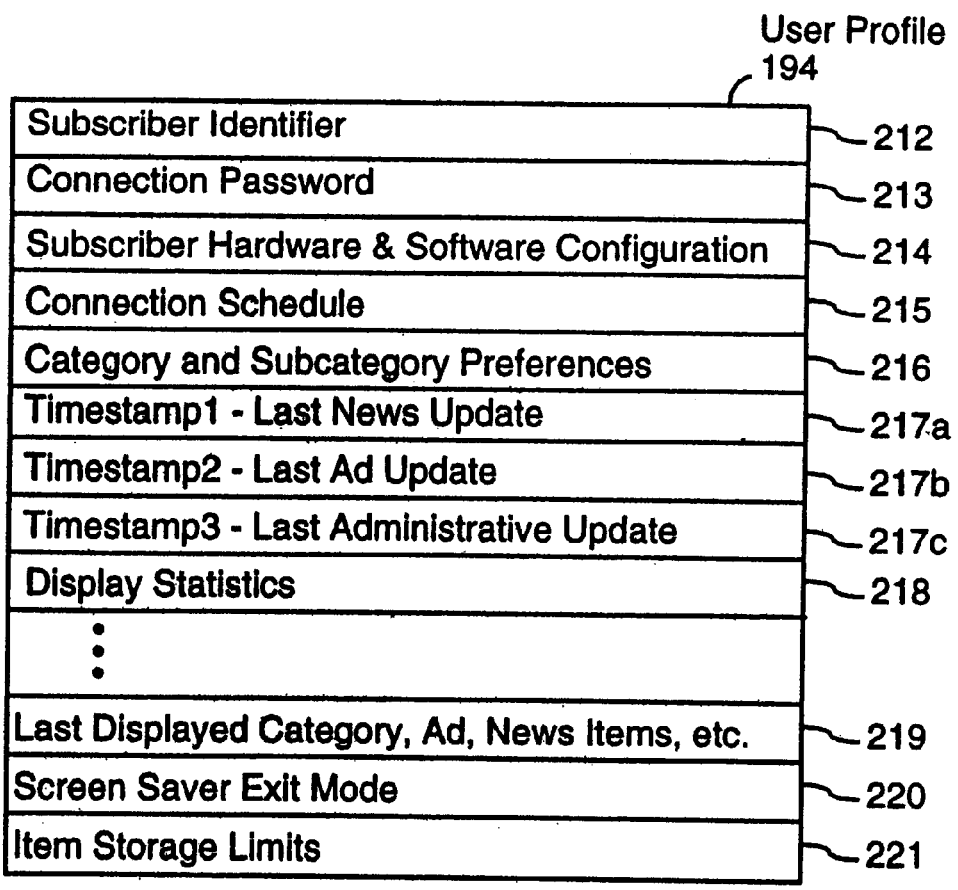
FIG. 4 schematically depicts a user profile data structure showing status and configuration information for a particular subscriber and workstation as stored in that workstation.

The profiler 206 is actually a set of procedures that define and update the subscriber's user profile 194. Referring to FIG. 4, in the preferred embodiment, the user profile 194 includes:

a subscriber identifier 212;

a connection password 213 used in conjunction with the subscriber identifier when connecting to the information server to identify the calling computer as a registered subscriber;

subscriber hardware and software configuration information 214 that identifies for the information server hardware and software information needed to determine the type of software and image files that are compatible with the subscriber's computer;

a connection schedule 215 that specifies to the connection scheduler 181 within the administrative manager 180 how often the subscriber's computer should connect to the information server 104 to update its information database 184;

category and subcategory preferences information 216 that identifies categories and subcategories of news stories that the subscriber does not want to view, as well as a list of "special categories" of news stories of special interest to the subscriber which override any categories noted as not being of interest to the subscriber;

timestamps 217a–217c indicating the time of the last updates to the subscriber computer's locally stored set of news stories, advertisements and administrative files (including scripts, images and software modules);

advertising and news item display statistics 218;

screen saver information 219 indicating the last displayed information category and the last displayed advertisement and news items in each information category are stored in a portion of the user profile 194 not transmitted to the information server; and a screen saver exit mode indicator 220, indicating what actions cause the screen saver procedure to terminate and what actions cause the data viewer 208 to be executed.

The default connection schedule is for the subscriber's computer to initiate a connection to the information server once during the middle of the night (e.g., a randomly selected time between 11 p.m. and 7 a.m. local time) for an update," and once every four hours during the rest of the day for "news story updates." During the administrative update connection, the set of advertisements, scripts and images in the subscriber computer's local information database are updated as necessary, and any software upgrades are also downloaded onto the subscriber's computer. During both "administrative update" and "news story update" connections, the news stories in the subscriber computer's local information database are updated. At the option of the information server's system operator, script and/or software updates can be made during news story update" connections, especially when a malfunction has been detected in previously distributed scripts or software.

The profiler 206 can be used to specify a connection schedule other than the default schedule. For instance, if the subscriber's computer is typically turned off at night, the administrative update connection may be scheduled to occur (A) during the subscriber's typical lunch time, or (B) once per day when the subscriber's computer has not received any user input for a specified minimum period of time (e.g., ten minutes) that indicates the subscriber is away from his/her computer.

The downloading of advertisements (which are typically images), fixed images used by display scripts and software modules is preferably performed during the night or long periods of user inactivity because images and software modules are typically much larger than the news items, which are primarily text data. Images, including advertisements, and software modules are compressed using well known data compression techniques to make the download transmissions as time efficient as possible. Even so, downloading images is a time consuming process. For instance, downloading two high resolution advertisement images having pixel sizes of, say, 400×300 pixels each, even when using data compression, will typically take over two minutes using conventional 14 AK baud modems. By way of contrast, downloading a dozen news stories and corresponding database base update instructions will typically take less than fifteen seconds of connection time using conventional 14 AK baud modems. Therefore, updating the local database's set of news items can be accomplished relatively 4 unobtrusively even while the subscriber is using his/her workstation, while updates to the 5 advertisements and fixed images in the local database take longer and are therefore more intrusive.

It is noted that the secondary portions of news items can also include images, such as photographs that accompany the text of a news story. The transmission of such news story images can significantly increase the amount of connection time required for news item updates, and thus most news stories in the preferred embodiment do not use images, and every effort is made to transmit those news stories that have images to subscribers' computers during the overnight administrative update rather than during the daytime news item updates.

The data viewer 208 is a program for viewing news items that the subscriber specifically wants to read. The data viewer 208 can be executed at the subscriber's explicit command, and can also be launched from the screen saver if the user indicates he/she wants to read a news story shown in the screen saver display. This is explained in more detail below.

The display statistics generator 210 keeps tracks of how many times each advertisement in the local information database has been displayed since the last time advertisement display statistics have been transferred to the information server. The display statistics generator 210 also keeps track of how many times each news item has been displayed in the same time period. These display statistics are stored in the user profile 194 at 218. In the preferred embodiment, the advertisement display statistics, and news items display statistics, are transferred to the information server once per day during a connection also used to update the subscriber computer's information database. In alternate embodiments, the advertisement display statistics could be transferred more often (e.g., every time the subscriber's computer connects to the information server) or less often (e.g., once per week).

As mentioned earlier, each of the category managers includes a profiler procedure for defining the subscriber's interest in receiving news items within each information category. An example of the profile definition dialog generated by a category profiler, for the Sports category, is shown in FIG. 5. In this example, the Sports Definition Profile dialog box 222 includes, on the left side, a scroll box 223 in which the user can select and deselect subcategories of sports information by clicking on boxes next to the listed subcategories. A "Select All" button in the dialog box can be used (i.e., by clicking the subscriber computer's mouse or trackball device on the image of the box) to select all subcategories, and a "Deselect All" button can be used to indicate that the subscriber does not want to receive any news items for the Sports category. For each subcategory, either an "include only" or an "exclude" filter (but not both) can be defined where the user types in key words to be used to select (for the include only) or deselect news items within that subcategory. For instance, if the subscriber types in the words "49ers, Rams" in the box for the include only filter for the "football news" subcategory, only news items using either of those words will be shown to the subscriber.

The category manager profile procedure generates a category profile data structure 202B that represents the subcategories of interest to the subscriber as well as any associated filters that have been defined.

Referring to FIG. 6, there is shown in outline form a snapshot of typical display generated by the screen saver procedure of the present invention. On this particular exemplary display are shown three news story "headlines" 230a–232c and one advertisement image 232. Each of the headlines 230 is an image representing the text of the primary component" of a news items, as explained above. While the image shown in FIG. 6 appears static, in its preferred embodiment the display script that controls the display of the headlines and advertisement can and most often does contain instructions for continuously moving the headline images around the screen.

The display scripts also mix fixed images with the headline images to create varied and interesting displays. In one example of a display script, cartoon characters appear to move the headlines around. In another example of display script, the background behind and surrounding the headlines is a sequence of fixed images such as pictures of peaceful landscapes, while the headlines gently float around the portions of the display not occupied by the advertisement image 232.

Figure 7A:
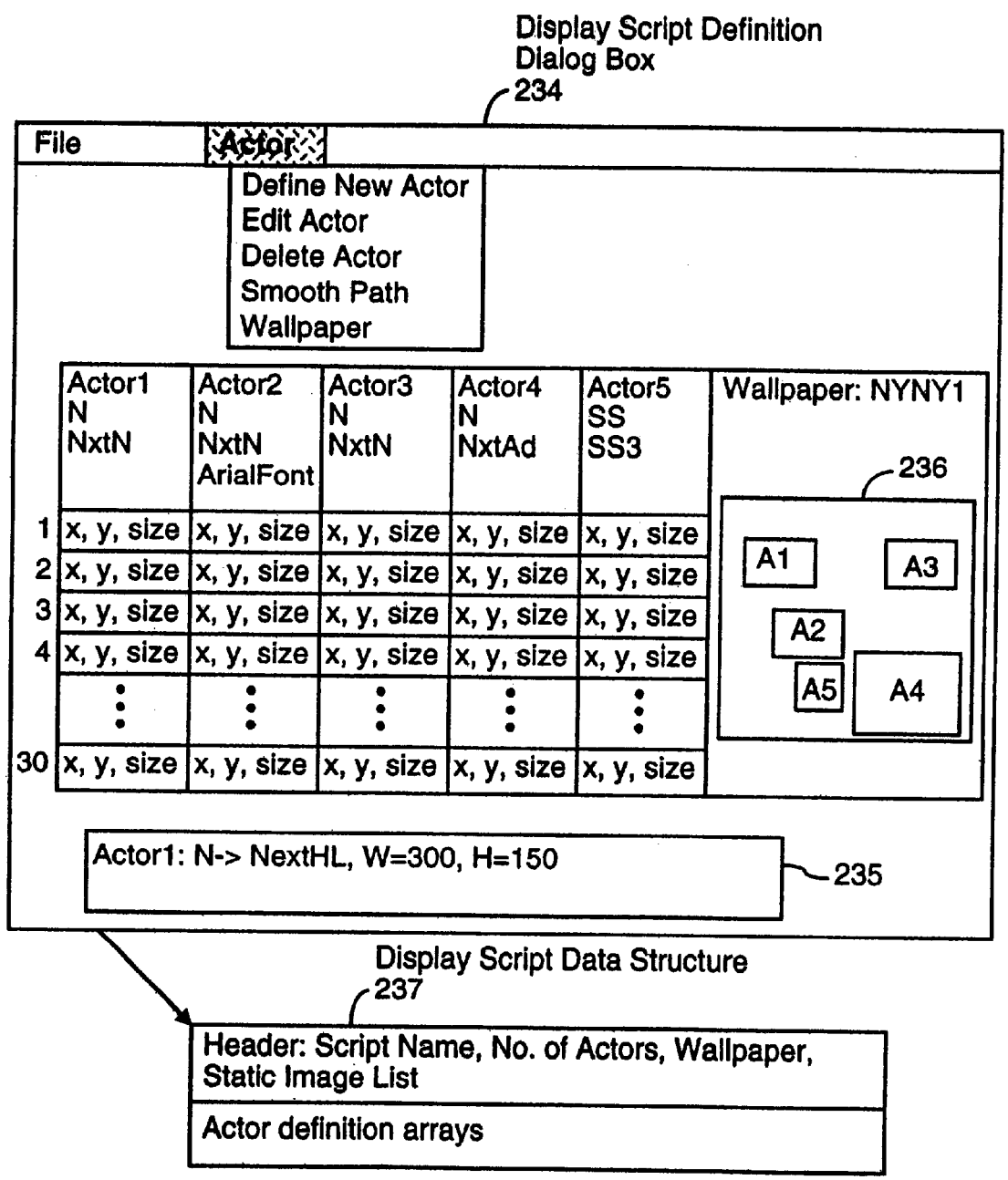
FIGS. 7A and 7B schematically depict the dialog box used to define a display structure and the data structure resulting therefrom.

Referring to FIG. 7A, the preferred embodiment provides an easy to use dialog 234 for display script definition. A display script consists of definitions for two or more actors, plus an optional definition of a background image, called the wallpaper image. Each "actor" represents a sprite, which is a displayable image, that can move and whose size can vary dynamically. An new actor is initially around the screen defined by selecting the "new actor" command in the Actor menu, as shown in FIG. 7A, and then entering a text string (shown in box 235) that specifies (A) the sprite generator procedure to use to generate the image for the actor, (B) the source of the information to be displayed, (C) the nominal width and height of the sprite (e.g., in units of pixels), and (D) any optional parameters that are specific to the specified sprite generator (e.g., a font may be specified for the News information category's sprite generator, whereas a font designation parameter may be meaningless for other ones of the sprite generators).

The specified sprite generator must be either the static sprite generator that is part of the animation engine 204, or is any specified one of the sprite generators 202D in the category managers 202. In an alternate embodiment, additional sprite generators may be provided by the animation engine 204, such as an animated sprite generator for successively displaying a sequence of images to simulate a motion. The source of information to be displayed is either a static image, in the case of the static sprite generator, or information items in a specified information category. For instance, the parameter "NextHL" in an actor definition indicates that the information to be displayed in the corresponding sprite is the next headline in the information category corresponding to the specified sprite generator for the actor. In another example, the parameter "NextAd" in an actor definition indicates that the information to be displayed in the corresponding sprite is the next advertisement image for the information category corresponding to the specified sprite generator for the actor.

The second stage of defining a sprite is to define its position and size at one second intervals, for 30 seconds in the preferred embodiment. The position of the sprite for a particular time can be defined by either typing in an X,Y, or by selecting a box representing the sprite with the user interface and then moving it to a position on a simulated display screen 236. The size specification for the sprite at each time is a percentage of the sprite's nominal size (e.g., "size=120" indicates the sprite is to be displayed at 120% of its nominal size). The full definition for a sprite includes thirty X,Y, size tuples for a thirty second screen saver display period. In a typical display script, nor more than one advertisement, three news items and two static images are used because the resulting display will be excessively busy, although the display script definition procedure allows a virtually unlimited number of sprites to be specified.

The data structure 237 representing each display script is shown in FIG. 7A: a header specifying the script's name, the number of actors defined in the script, an optional Wallpaper definition, and a list of all static images referenced by the script; plus a set of Actor definition arrays.

The screen save procedures interpret each display script and generate an animated display for 30 seconds based on the script. During display, the image corresponding to each actor is moved and sized in a virtually continuous manner, where the position and size of each sprite is linearly interpolated between the instantaneous position and size specifications for each second. During the display definition process, the sequence X,Y, size parameters for a currently selected actor can be smoothed, to produce more fluid movement and size changes of the actor by selecting the "smooth path" command in the Actor menu.

Figure 7B:
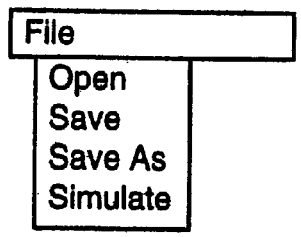

Referring to FIGS. 7A and 7B, the person preparing a display script using the display script definition dialog 234 can see the movement and sizing of the actors in the simulated display screen 236 by selecting the simulate command in the File menu, which cause the boxes in the simulated display screen 236 to move and be sized in accordance with the sequence of X,Y, size parameters for each specified actor.

While in the preferred embodiment, advertisements are always simultaneously displayed with news items. In other embodiments, advertisements and news items could be displayed sequentially. Computer programmers of ordinary skill in the art could modify the script definition dialog of the preferred embodiment, as described above, to define display scripts with sequential display of advertisements and news items.

Screen saver procedures for displaying news items and advertisements are invoked using the same types of criteria as are used by other types of screen saver procedures. Generally, whenever the system detects a lack of user inputs via either keyboard or pointer device (e.g., a mouse or trackball) for a user configurable or otherwise specified length of time (e.g., 5 minutes), the screen saver procedures of the present invention begin the display of news items and advertisements from the local information database. In the preferred embodiment, the screen saver procedures display news items and advertisements for a sequence of information categories in a sequence of 30 second time slots.

More specifically, under the control of the screen saver procedures, news stories and an advertisement assigned to a first information category are displayed using a first display script for 30 seconds, then news stories and an advertisement assigned to a second information category are displayed using a second display script for the next 30 seconds, and so on until news stories and an advertisement have been displayed in all the information categories indicated in the subscriber's user profile 194 as being of interest to the subscriber, at which point the process repeats with the first information category.

Figure 8:
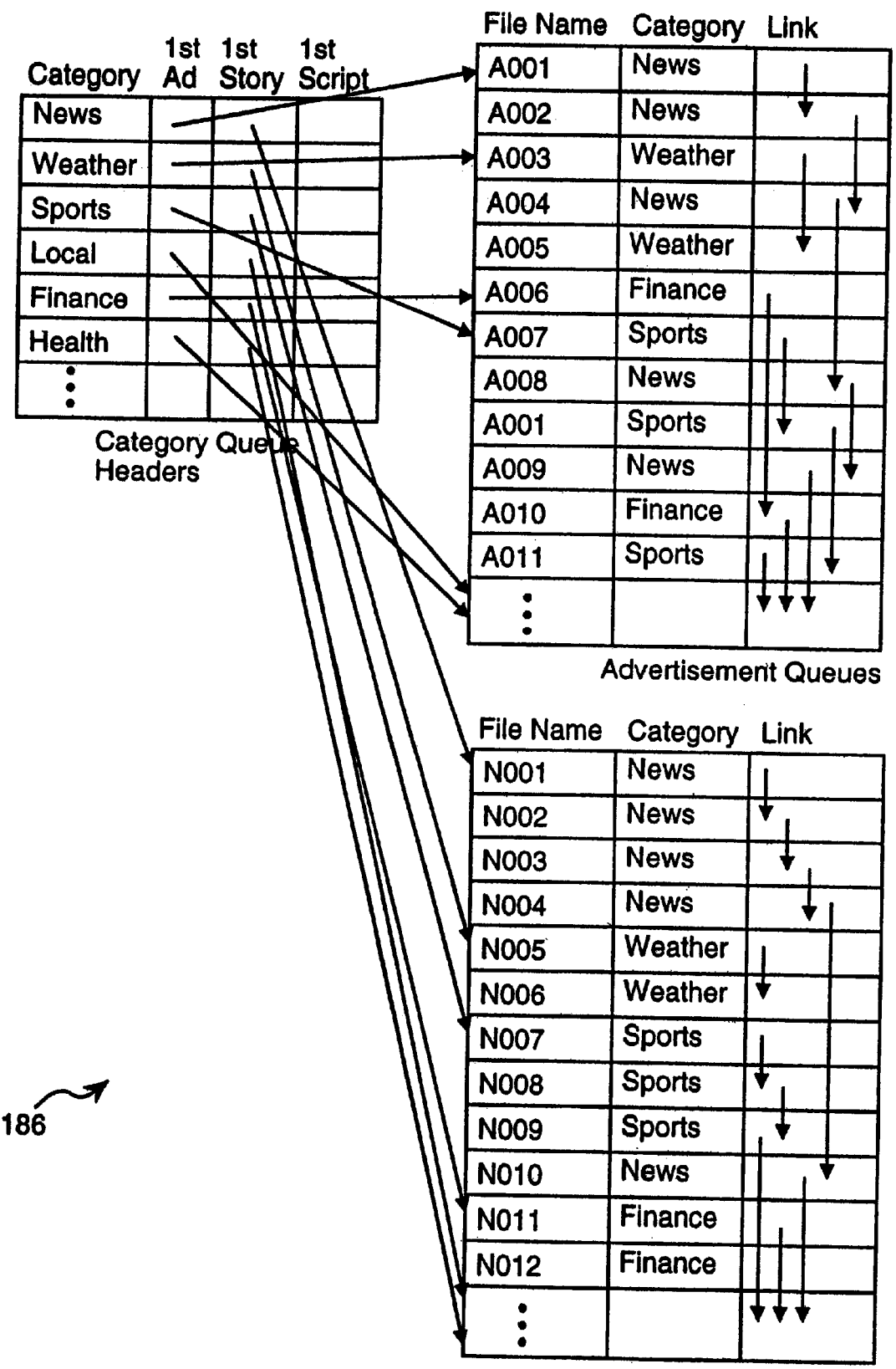
FIGS. 8 and 9 schematically depict data structures stored in a subscriber's 12 computer to indicate the advertisements and news stories available for display in various information categories.

Referring to FIG. 8, news stories, advertisements and display scripts are stored in files or similar data structures which have assigned unique file names. Each news story (herein usually called a news item) is usually assigned to a single information category, although nothing in the system of the preferred embodiment would prevent a news story from being assigned to multiple information categories. Advertisements can 10 be assigned to multiple information categories as can display scripts.

Figure 9:
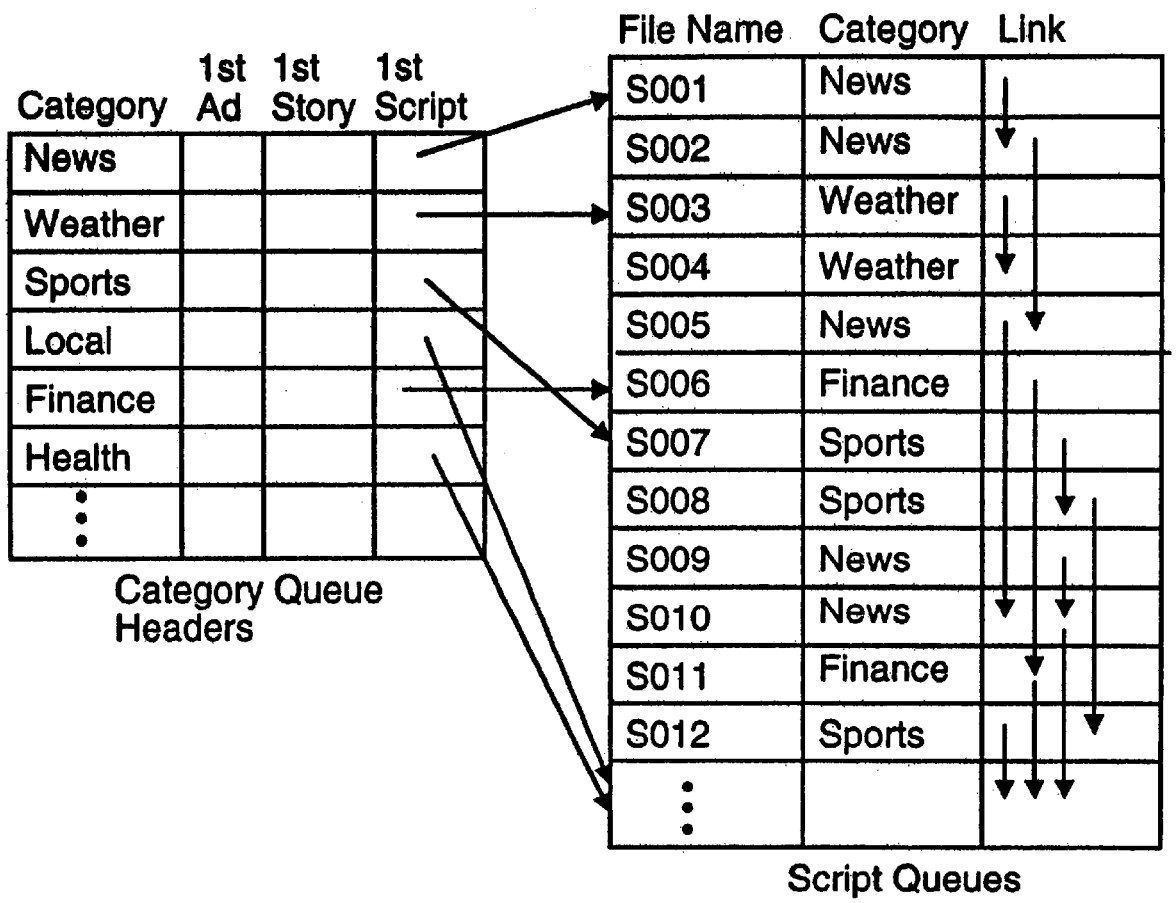

As shown in FIGS. 8 and 9, the advertisements assigned to each information category are organized, through the use of a set of data access tables 186, in a separate linked list so as to create a separate "queue" of advertisements for each information category. Similarly the news items and display scripts assigned to each information category are organized in separate linked lists so as to generate separate queues of news items and display scripts for each information category.

FIG. 8 includes an example of an advertisement (AOO I) assigned to two 20 information categories (News and Sports). This advertisement is stored only once in the 21 workstation's local hard disk, but is included in two of the linked lists of advertisements.

The basic procedure for determining what display script, advertisement 24 and news stories to display during each 30 second time slot is shown in pseudocode form 25 in Table 1.

TABLE I

Pseudocode Representation of Screen Saver Procedure

Store, indication of last information category displayed,
and for each category an indication of the last advertisement,
news story and display script used.
Do Until Screen Saver Mode is exited:
{
Select next information category (SIC).
Select next display script (SDS) from queue of display scripts
    and next advertisement (SA) from queue of advertisements
    for the selected information category.
Inspect selected display script to determine NN,
    the number of news items to be displayed. Select
    the NN next news items (SNI) from queue of
    news items for the selected information category.

TABLE I-continued

Pseudocode Representation of Screen Saver Procedure

Update User Profile to indicate the last selected
    information category, and to indicate for the
    selected information category, the selected display
    script, advertisement and last selected
    news story.
Call Animation Engine (SDS, SA, SNI) to display for
    the next 30 seconds the selected advertisement
    (SA) and news items (SNI) under the direction
    of the selected display script (SDS).
Call Ad Display Statistics Generator to update displayed
    advertisement statistics to include the advertisement
    displayed during current screen saver display period.
}

Each time the Screen Saver procedure 201 is invoked, it starts with the next information category after the last one to have been used, and starts with the next advertisement and news stories after the last ones used in that information category. The screen saver status information 219 indicating the last displayed information category and the last displayed advertisement and news items in each information category are stored in a portion of the user profile 194 not transmitted to the information server.

Execution of the Screen Saver procedure 201, like other screen savers, is terminated and the subscriber's computer's display is returned to whatever was being displayed before the Screen Saver was executed, upon detection of certain types of user input. In the preferred embodiment, the user can use the profiler to select one of at least two exit modes: in a first mode, the Screen Saver procedure is terminated by hitting any key on the subscriber computer's user interface keyboard or by moving the user interface's mouse or trackball; in a second mode, the Screen Saver procedure is terminated by hitting any key on the subscriber computer's user interface keyboard, but movement of the mouse or trackball does not cause the Screen Saver procedure to terminate. Rather, in the second screen saver exit mode, the subscriber can use the mouse or trackball to point to any of the news items being displayed and upon clicking one of the mouse or trackball's buttons, the data viewer 208 is executed with the news item selected by the subscriber being displayed.

When using the second screen saver exit mode, if subscriber user clicks on 16 an advertisement, the subscriber's computer is automatically connected to the an associated World Wide Web page on the Internet that Provides additional information from the advertiser. This is accomplished by World Wide Web connection and viewer procedures 211 (see FIG. 2) stored on subscriber's computer. Each advertisement is stored on both the information server and subscriber computers as a C++ data structure that includes (A) an image data array, typically representing a "GIF" format image, as well as (B) a list of static images (such as corporate logos and legends), if any, incorporated into the advertisement, and (C) a Web site address that is used by the World Wide Web connection and viewer procedures 211 to connect the subscriber to the advertiser's specified Web page when the subscriber clicks on the image of the associated advertisement.

Figure 10:
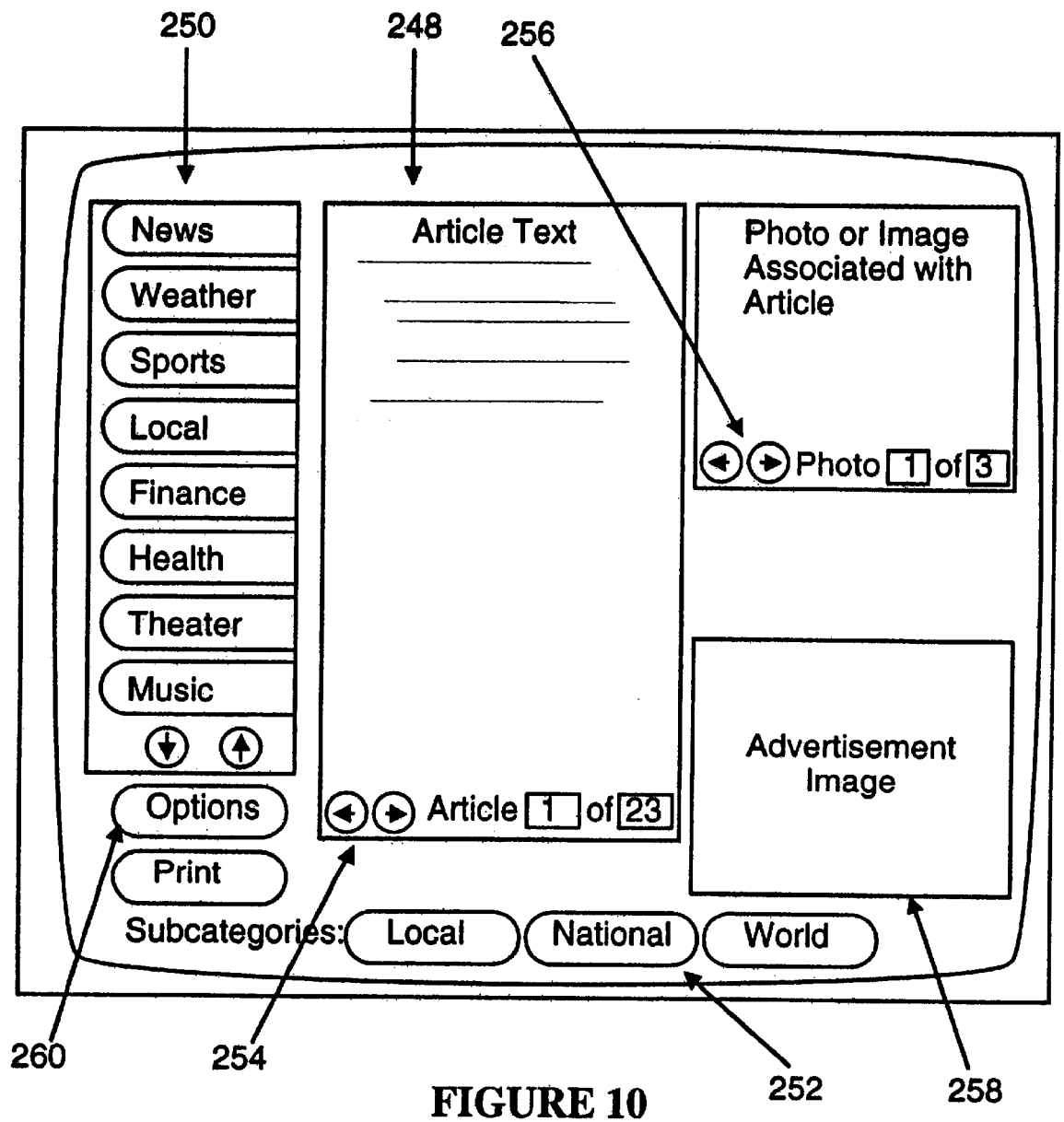
FIG. 10 schematically illustrates a display generated on a subscriber's display device using a data viewer procedure.

Referring to FIG. 10, the data viewer 208 is a program for viewing news 29 items that the subscriber specifically wants to read. The data viewer 208 can be executed 30 at the subscriber's explicit command, and as just described in the immediately preceding section of this document, the data viewer can also be launched from the screen saver when the subscriber indicates that he/she wants to read a news story shown in the screen saver display by "clicking" the subscriber's computer's mouse or trackball on that news story.

The news stories shown in the center section 248 of the data viewer's display is selected by first selecting an information category by clicking on any of the category buttons 250 on the left margin of the display, and a subcategory button 252, if any, on the bottom margin of the display, and then clicking on the article advance backward and forward buttons 254 to scroll through the news items in the selected information category. When a news item has more than one photo image associated with it, the subscriber can click on the photo advance backward and forward buttons 256 to scroll through the photos.

Each news item displayed in the center section 248 of the data viewer's display includes both the primary and secondary portions of the news item, thereby providing the subscriber in most instances with access to a fuller version of the news item than was shown by the screen saver. In the case of very short news items, the entire news item may be contained in its primary component. Furthermore, in client computers with very limited hard disk space available for storing news items, as indicated by the user profile 194 for the client computer, the secondary component of news items may not be stored in the local information database in order to conserve disk space.

A portion of the data viewer screen is always occupied by an advertisement image 258. The advertisement image shown is selected on the basis of the information category associated with the news item being viewed. In a preferred embodiment, the advertisement shown in the data viewer screen is changed (A) every time the subscriber clicks on a category button 250 so as to select a different information category than the one previously selected, and (B) every 30 seconds when subscriber continues to view news items in a single information category for more than 30 seconds. The advertisements are selected in rotating order among the advertisements assigned to each information category, as described above for the screen saver procedure.

When using the data viewer, if subscriber user clicks on the displayed advertisement, the subscriber's computer is automatically connected to the an associated World Wide Web page on the Internet that provides additional information from the advertiser.

The Options button 260 is used to invoke dialog procedures in which the subscriber specifies general preferences, such as how quickly data scrolls in the scrolling windows, and which mode of screen-saver termination the subscriber prefers.

Figure 11:
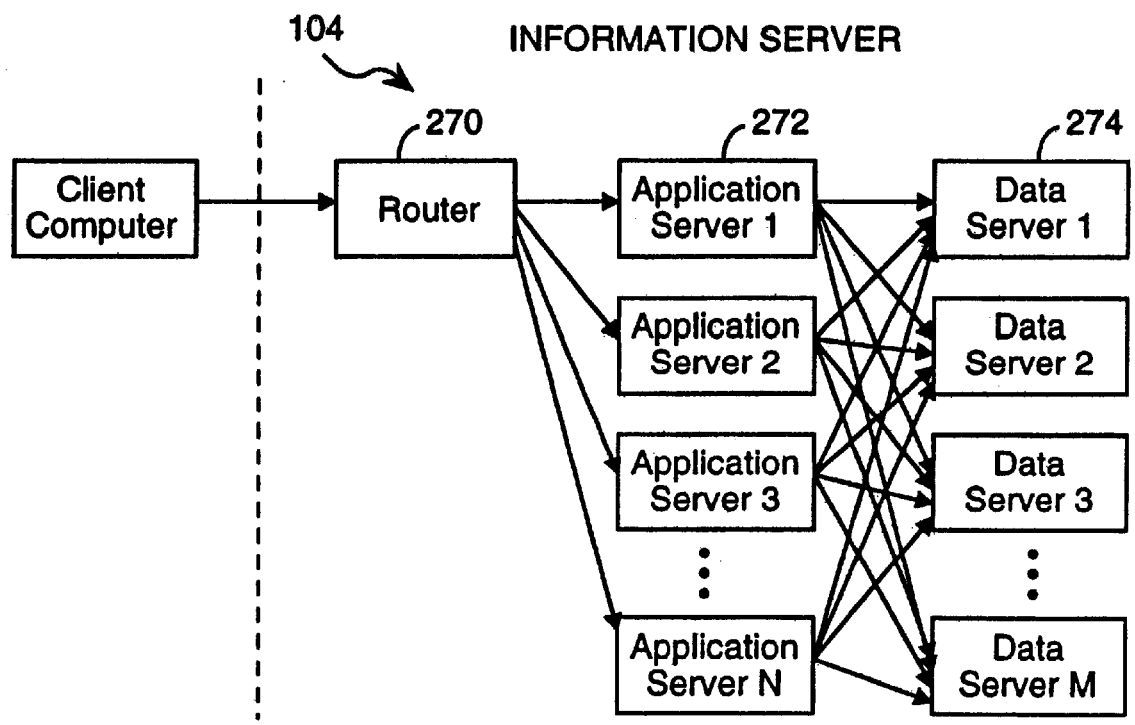
FIG. 11 depicts the relationships between various processes in the information server.
Figure 12:
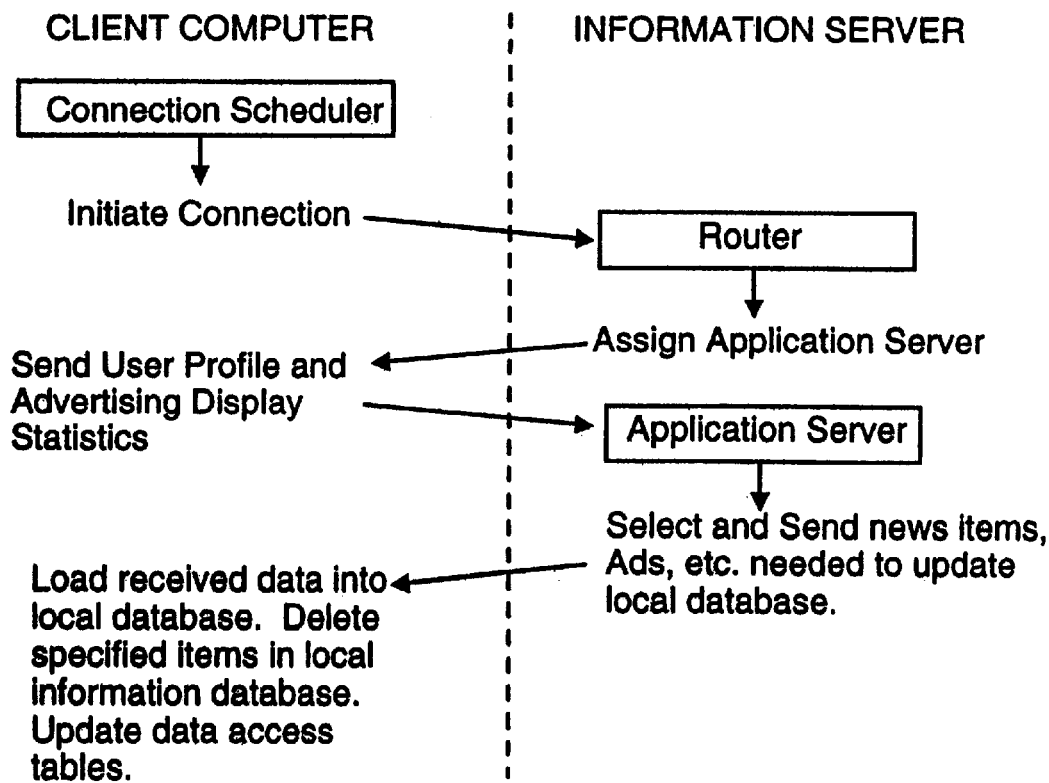
FIG. 12 is a flow chart that shows the procedure for updating the local database and software modules of a subscriber's computer.

Referring to FIGS. 11 and 12, the information server is preferably a set of computers interconnected by a local area network that each operate under a multi-tasking, multi-threading operating system such as Microsoft's Windows NT. The information server 104 has multiple "application servers" 272, which are processes run on one or more computers. Each application server 272 preferably has multiple threads, each of which can service one connection with a client computer at any one time.

A primary concern with the architecture of the information server is that the information be able to handle a very large volume of connection requests from client computers. The information server may need to service thousands of connection requests per hour, and thus efficient handling of each connection request is important.

In a preferred embodiment, during each connection of a subscriber computer to the information server, the information server sends a "next recommended download time" to the subscriber computer along with the other information being downloaded onto the subscriber computer. The server computer selects the next recommended download times sent to the various subscriber computers so as to spread their connection requests fairly evenly over time. In an alternate embodiment, connection requests are spread over time by having the subscriber computers randomly select connection times within the general boundaries of a specified schedule of connections (e.g., a randomly selected time anywhere within a half hour, plus or minus, of each scheduled connection time).

When a client computer first initiates a connection to the information server, it sends a first message to the Internet address associated with a router process 270 in the information server. The router selects an application server 272 with at least one available thread and passes back to the client computer an Internet address associated with that application server.

The client computer then sends a portion of its user profile to the assigned application server. If an administrative update is being requested, the locally accumulated advertising display statistics 218 (see FIG. 4) are also sent to the application server.

Based on the time of day and the information in the transmitted user profile, the application server determines (A) what type of update is to be performed (i.e., a news item update or an administrative update), and (B) what new information needs to be downloaded to the client computer and what items in the client computer's local information database should be deleted. The application server 272 then makes calls to one or more data servers 274 to collect all the information that needs to be sent to the client computer and then sends those items to the client computer, along with instructions on what items, if any, should be deleted from the client computer's local information database.

The client computer then loads the received information into its local database, and replaces software modules with received software modules, if any. It also deletes the items, if any, specified for deletion by the information server. Finally, it updates its data access tables 186 to incorporate all the changes to the information database so that the client computer is ready to display news items and advertisements in each information category.

A more detailed explanation of the local database update process is provided by a pseudocode representation of that process in Table 2.

In one preferred embodiment, when the "client" that is connected to the information server for an update is itself a local area network server, the client downloads all news items into its local database. In a second preferred embodiment, the client/LAN server generates a group profile that represents the union of all news category and subcategory preferences of the subscribers connected to the client computer, and news items are downloaded into the client's local data base based on that union group profile. In either embodiment, the screen saver procedures filter out news items in the LAN server's local information database that are not consistent with each subscriber's user profile, thereby showing each subscriber only the subset of news items corresponding to the subscriber's user profile. In the preferred embodiments, the subscriber level news item filtering is accomplished by setting up the subscriber's data access tables 186 to include only news items corresponding to the subscriber's user profile. In the computers of stand alone subscribers, the filtering of news stories is handled during the data download process, by only downloading news items corresponding to the subscriber's user profile.

The subscriber level news item filtering function is also used to enable the information server to instruct the subscriber's computers to "black out" an advertisement, without deleting it from the local database. For example, a company may want to suspend its advertisements for a few days after a disaster involving the company. The black out function is achieved by simply removing the corresponding advertisement(s) Crom the advertisement queues in the data access tables. For this purpose, the information server and subscriber computers may temporarily define a "non-use" information category and a corresponding advertisement queue for keeping track of blacked out items.

TABLE 2

Pseudocode Representation of Database Update Procedure

```
Connect to Information Server
If Update Type=Administrative /* i.e., not a news story only update*/
    {
    Client sends display Statistics to server, and clears
        display statistics upon confirmation that server
        has successfully received them
    /* Pool Synchronization*/
    Server Sends list of items (i.e., advertisement and scripts)
        that should be included in the client's advertisement
        and script pools
    Client deletes items in its advertisement and script pools
        that are not included in the list received from the Server
    Client determines what items are missing from its
        advertisement and script pools
    Client sends requests to Server for advertisements
        and scripts determined to be missing from local pools
    Server sends requested items to Client
    Client stores received advertisements and scripts
        in their respective disk directories
    Client opens all advertisement and script files to
        determine the static images referenced by those
        files, but not included in the local static image pool.
    Client sends requests to Server for static images determined
        to be missing from local pool
    Server sends requested items to Client
    Client stores received static images in their assigned
        disk directory
    /* Software Module Synchronization*/
    Client sends message indicate it is ready for software
        synchronization, including date and time of last
        administrative update
    Server sends new software modules, if any, based on date
        and time of last administrative update
    }
For each Category Manager (CMx)
    {
    /* CMx.Fetch Procedure:*/
    Client (CMx.Fetch procedure) sends profile data
        for CMx to Server, including subcategory data
        and filter data, if any
    Server sends items consistent with profile data
    Client (CMx.Fetch procedure) stores received items in data
        structures and files for that category
    Client (CMx.Fetch procedure) deletes items, in FIFO order,
        for current category which (A) exceed data storage
        limit in date, (B) exceed item count limit, or
        (C) exceed specified age limit
    /* Item storage limits 221 for each category are
    defined in a portion of the user profile 194 (see FIG. 4) */
    }
Client updates data access tables
Return
```

One embodiment of the present invention comprises a computer-implemented method for distributing information to a plurality of client devices on a network, the computer-implemented method comprising receiving a variety of information from a plurality of sources, organizing the variety of information into information categories, and distributing the variety of information to the plurality of client devices based on the information categories requested by the plurality of client devices. The computer-implemented method may further include accepting user input at the client device to specify information categories for retrieval from a server, generating a user profile based on the information categories specified by the user input, and retrieving information at predetermined intervals from the server based on the user profile. Another embodiment of the present invention comprises a computer-implemented method for varying information displayed on a client device, the computer-implemented method comprising maintaining a plurality of scripts on the client device, executing a first script from the plurality of scripts to display a first set of information for a first predetermined period, and executing a second script from the plurality of scripts to display a second set of information for a second predetermined period. Still another embodiment of the present invention comprises a computer-implemented method for generating and maintaining information access statistics for each piece of information stored on a client device, the computer-implemented method comprising generating tracking information indicative of a number of times each piece of information is displayed during a predetermined period, and transferring the tracking information to a server at predetermined intervals.

Several improvements of note have been made with respect to PointCast's client push software and improved server with respect to the manner in which access to and display of pushed information is implemented and coordinated. These improvements are as follows:

A. Dynamic Actors:

Dynamic actors match content in the client to actors in an animation based on properties of the actors and the content, rather than any hard-coded reference. This ability is necessary to create and support "template" animations, such as SmartScreens, that can rotate through all content on a given user's machine-independent of what specific content is present; for example, displaying a headline from the News channel in a SmartScreen without referring to a specific news article.

In the earlier versions of PointCast, the channels themselves did the mediation between data and animations. However, now that there is centralized content management in the client (see the Local Content Manager specification and description hereinafter), content providers can create compelling animations, and are allowed to do so, without client code changes, by removing the channels from this process. There is also an additional performance and memory footprint benefit to this restructuring in that the SmartScreen can now run independently of the Channel Viewer.

To extricate the channels from actor creation, however, it is necessary to establish a method and syntax for content to declare what actors it can create and for each dynamic actor in an animation to declare what content it needs. For content, the ACTORS tag in the wrapper and PCN-ACTOR tags in the body (for HTML items) can be used to declare what actors it can create. For actors, the ACTORDATA tag in the initialization section of the animation can be used to declare what data it needs. LCM and special iteration code called by an animation engine (in the presence of an INITIALIZE tag) will match content to actors.

Content: Declaring Dynamic Actors

Actors are declared in content using the ACTORS property in the wrapper of the data item (for more information on wrappers, see the Fetching and LCM spec). The syntax for the ACTORS property is: [<content ID>=]<name>[, <name>. . . ][&<content ID>=<name>[,<name>. . . ]. . . ].

To break this down more specifically, in the case where the entire data item is to serve as the actor, then no content ID need be specified. For example, a weather map uses the following actors string:
ACTORS="Map"

However, through the use of the PCN-ACTOR tag, multiple actors can be declared within one HTML item, and those actors can even be grouped together to correspond to individual stories within the item using the ContentID property of the PCN_ACTOR tag. For example, a digest article with two summary articles might have the following ACTORS property (where Story1 and Story2 are the two Content IDs):
ACTORS "Story1=Summary, Photo& Story2=Summary, Photo,Photo2"

The syntax for the PCN_ACTOR tag is:
<PCN_ACTOR
ContentID=
Name=
[Data=URL]
>
[DATA]
</PCN_ACTOR>
where the data to associate with the PCN_ACTOR is either specified by the Data property, or if the Data property is not present, then the data between the open and close PCN_ACTOR tags is used.

Note: If there is more than one PCN_ACTOR tag in a data item that uses the same ContentID and Name, then the last specified Data property will be used. In the case where no Data property is present for any of the PCN_ACTORs, then the data for all of the tags will be concatenated together and returned.

The following table gives a more detailed explanation of each of the PCN_ACTOR properties.

PCN-ACTOR

| Field Name | Type | Default | Description |
| --- | --- | --- | --- |
| CONTENT-ID | Value | 0 | ContentID is used to mark actors as belonging to the same content item when a file contains multiple content items (i.e., a digest file) and can be any string value. ContentID "0" is a special case that serves as the default ContentID for any data item. Content ID "0" is useful when PCN_ACTORS are needed (because actors are embedded within the HTML), but there's only one story (content ID) in the document. |
| NAME | Value | Summary | The NAME property is used to identify data as being of a certain type (editorial type, not render type). An example of the usage of NAME is if a content provider wished to specify one section of every HTML article as being the "Abstract," they could add PCN_ACTOR tags that had Name = "Abstract" to all of their content and then create SmartScreens that only called for Abstracts. |
| DATA | URL | | A URL to the data for this actor. This field is optional. When not present, the data between the open and close PCN_ACTOR tags will be used. |

Animations: Initializing and Using Dynamic ActorsInitializing Dynamic Actors

Dynamic actors are initialized in an animation script using the ACTORDATA tag. This tag describes the data needed by an actor and appears in the initialization section of the animation (the initialization section is demarcated by the INITIALIZE tag).

In addition to the ACTORDATA tag, ACTORGROUP tags are used to specify the relationship of ACTORDATA requests to each other, as well as to impose requirements for the successful initialization of the animation. More specifically, ACTORGROUP tags can be used to specify which ACTORDATA request should come from the same category or content item, as well as specify which or how many ACTORDATA requests must be fulfilled (matched with content) before the entire 11 animation can be considered successfully initialized.

An entire animation can be considered successfully initialized if the top level ACTORGROUP tag is successfully initialized. In the case where there is more than one top-level ACTORGROUP tag, there is an implied generic ACTORGROUP (see below) that encloses the entire initialization section. Following is the structure of the INITIALIZE section of an animation:
<INITIALIZE>
  ACTORGROUPS/ACTORDATA
</INITIALIZE>
<ACTORGROUP>
  Type=Story|Category|Generic
  Create=All|1|2|. . .
  Required=All|1|2|. . .
  InitOrder=Sequential|Random
  [Restrictions]
>
  ACTORGROUP|ACTORDATA
</ACTORGROUP>
>ACTORDATA
  ActorName=
  ID=
>
</ACTORDATA>
Here are more in-depth descriptions of the ACTORDATA properties.

ActorData

| Field Name | Type | Default | Description |
| --- | --- | --- | --- |
| ACTOR-NAME | Value | _TITLE | ACTORDATA tags are linked to PCN_ACTORs via the ACTORNAME property. To fulfill an ACTORDATA request, the client scans the currently selected portion of LCM (i.e., within the current channel and category ACTORGROUP) for a data item that contains a reference to this ACTORNAME. Usually, the ACTORNAME is found in the ACTORS field, however the default ACTORNAMES have custom requirements for intializations (see table below). |
| ID | Value | | The ID is used as an identifier for the data that an ACTORDATA request will return if successfully initialized. To access this data, actors in the animation script will have an ActorDataID property that matches the ID of an ACTORDATA request. |

While most ACTORNAMEs need to be listed in the ACTORS field in LCM to be successfully initialized, there are some built-in ACTORNAMEs that don't need to be listed and have different requirements for initialization:

Default ActorNames

| Field Name | Requirement for initialization | Description |
|---|---|---|
| _TITLE | Non-empty TITLE field | The TITLE field in LCM, as text. Especially useful for headlines. |
| _DATE | Valid CREATION_TIME field | The date stamp of a content item, as text. |
| _CATEGORY-NAME | Defined in channel | The name of the channel, as text. |
| _CATEGORY-LOGO | Defined in channel | The logo for a category (i.e. the Money magazine logo in the Pathfinder channel). |
| _CATEGORY-DATE | Valid LAST_UPDATED time | Gives the time when the current category was last updated, as text. |

The properties for the ACTORGROUP tag:

ActorGroup

| Field Name | Type | Default | Description |
|---|---|---|---|
| TYPE | Value | Key | Values: Story\|Category\|Generic<br>The Type property specifies what content needs to be iterated through to look for ACTORDATA when this ACTORGROUP is initialized.<br>Story - Iterates through content IDs for the current channel and category. Stories can be either at the data item level, or the content ID level.<br>Category - Iterates through all categories in the current channel (the category list will be returned by the channel itself -- this is the one remaining dependence on channels for actor creation in 2.0).<br>Generic - Used for grouping conditions for successful initialization of the animation. The Generic ACTORGROUP does not cause any iteration itself. |
| CREATE | Value | KEY | Specifies the number of child ACTORGROUP or ACTORDATA tags to initialize. For example, if an ACTORGROUP has a Create value of 1 but has three child ACTORGROUP tags, as soon as one ACTORGROUP is successfully initialized, the actor iteration code would not even attempt to initialize the others. |
| REQUIRED | Value | — | Specifies the number of child tags that must be initialized. If the required number of ACTORGROUPs cannot be initialized, then the ACTORGROUP itself will fail initialization. |
| INIT-ORDER | Value | Sequential | Values: Sequential\|Random<br>This property specifies what order the ACTORGROUP should use in attempting to initialize its children.<br>Sequential - The ACTORGROUP initializes its children in the same order they appear in the INITIALIZE tag.<br>Random - The ACTORGROUP initializes its children randomly (but only attempts once per child). |
| [Restrictions] | — | — | Any number of properties can be specified that will serve as restrictions on LCM tables. These restrictions further define the set of data to be scanned looking for ACTORDATA. See the Restrictions table below for the set of supported restrictions. |

Restrictions

| Field Name | Type | Default | Description |
|---|---|---|---|
| [CHANNEL] | Number | Channel of SS | This is an implied restriction. In 2.0, only the channel that called the animation (via the SmartScreen catalog) can be used to generate dynamic actors for that animation. |
| SKIP-SHOWN | Boolean | True | If true, don't initialize content IDs or data items that have already been marked as shown in LCM (using the ACTORS_SHOWN property). |
| NEWNESS | Number | — | Can only be applied to a Category ACTORGROUP, the newness value is the number of seconds since the last time the category was updated. The logic is: If (last fetch time – article creation time < newness value) then the article is new enough to be shown. |

Using Dynamic Actors
And then, within the MOVIE tag itself:
<ACTOR
    ActorDataID=
    . . .
>
</ACTORDATA>

Actor

| Field Name | Type | Default | Description |
|---|---|---|---|
| ACTOR-DATA-ID | String | — | This property ties an Actor to the ACTORDATA tag with this ID. The actor will be created using the data initialized by the ACTORDATA tag corresponding to this ID, and will not be created at all if the ACTORDATA tag is not successfully initialized. If the actor already has a DATA tag, then the actor will be created using the file specified by the DATA tag, but only if its associated ACTORDATA tag was successfully initialized. This is useful for tying graphic actors (such as bullets) to the successful creation of dynamic actors (such as headlines). |

Smart Screens

SmartScreens are the only animations in the 2.0 client that use dynamic actors. While the INITIALIZE section specifies whether or not an individual SmartScreen can be successfully initialized, there is an overall logic that determines which SmartScreen to play next:

For each channel in the viewer's selected channel list, attempt to initialize each SmartScreen for that channel.

If all the SmartScreensfail to initialize, clear the ACTORS-SHOWNflags in LCMfor the current channel and then try all the SmartScreens again. If all fail yet again, then on to the next channel. If all channels fail, then play a "house" SmartScreen.

Dynamic Actors in 2.0 channels

Channels

Channel nameactor type example (pcn_actor, actor tag, ss) ,Channel[s], PCN_ACTOR, Channel ACTORS string/inline actors, SmartScreen initialization

| Channel Name | ACTORS | INITIALIZE |
|---|---|---|
| Companies | | |
| Industries | | |
| Lifestyle | | |
| PathFinder | | |
| Boston Globe | | |
| Chicago Tribune | | |
| Globe and Mail | | |
| Hot CoCo | | |
| LA Times | | |
| Mercury Center | | |
| Miami Herald | | |
| Minneapolis Star-Tribune | | |
| NY Times | | |
| Philadelphia Online | | |
| Seattle Times | | |
| Tampa Tribune | | |
| Wall Street Journal | | |
| CNN | | |
| CNNfn | | |

One of the difficulties in the presentation of pushed information results from the fixed association of text and a photograph or an image of some kind and the strong desirability, if not absolute requirement, for displaying the associated information at the same time. In fact, because the text and photograph of an associated pair would not be as interesting or informative if displayed separately, the default for the utilization of such tightly coupled material is to display them together or not at all. This result is somewhat difficult to achieve because the associated material may not all be present when needed or it may not be associated when received by the client.

These difficulties are overcome by defining PCN-Actors or data chunks in a dynamic script, where the defined actors are provided with appropriate associative tags that define the associative relationship between text and photographs or other images. In other words, a linked set of text and photograph is created. The iteration code that sequences through the dynamic script would then come across that linked set, and any others, and try to play each of them as a pair, regardless of the order of their constituent data chunks in storage. If, for some reason, the associated text and photograph can't be found, their SmartScreen is not played and the next dynamic actor in the script is displayed. In that manner, client administration is optimized by permitting all playable content, whether or not they comprise associated data chunks, to be used and displayed in the most efficient way.

Figure 13:
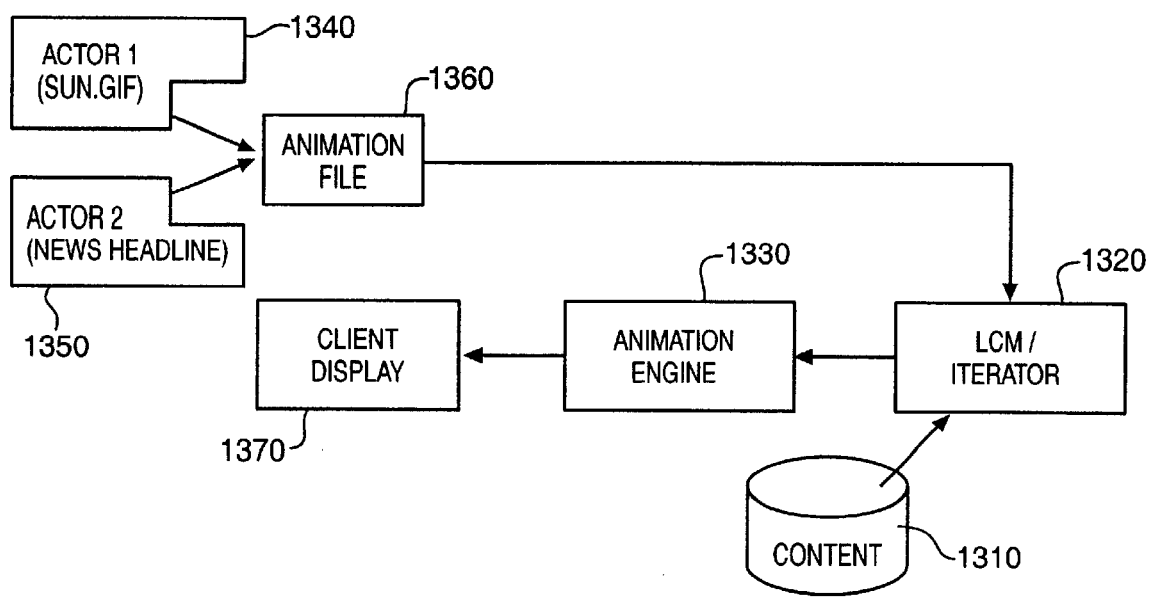
FIG. 13 shows a block diagram of an arrangement for creating a subscriber's display screen by playing pushed information content in accordance with the dictates of a local content manager and appropriate animation files.

Referring now to FIG. 13, it can be seen that content from local storage means 1310 is accessed by the local content manager 1320, which includes an iterator function and code therefor. Hints in the form of PCN tags are placed in the content in order to aid the iteration process. That content is made available to an animation engine 1330 by the iterator code. In addition, dynamic actors 1340 (a graphic file) and 1350 (a text file) from animation file 1360 are forwarded to the local content manager 1320 for iterated feed to the animation engine 1330. The animation engine 1330 then forwards its output to the display unit 1370 of the client workstation.

Figure 14:
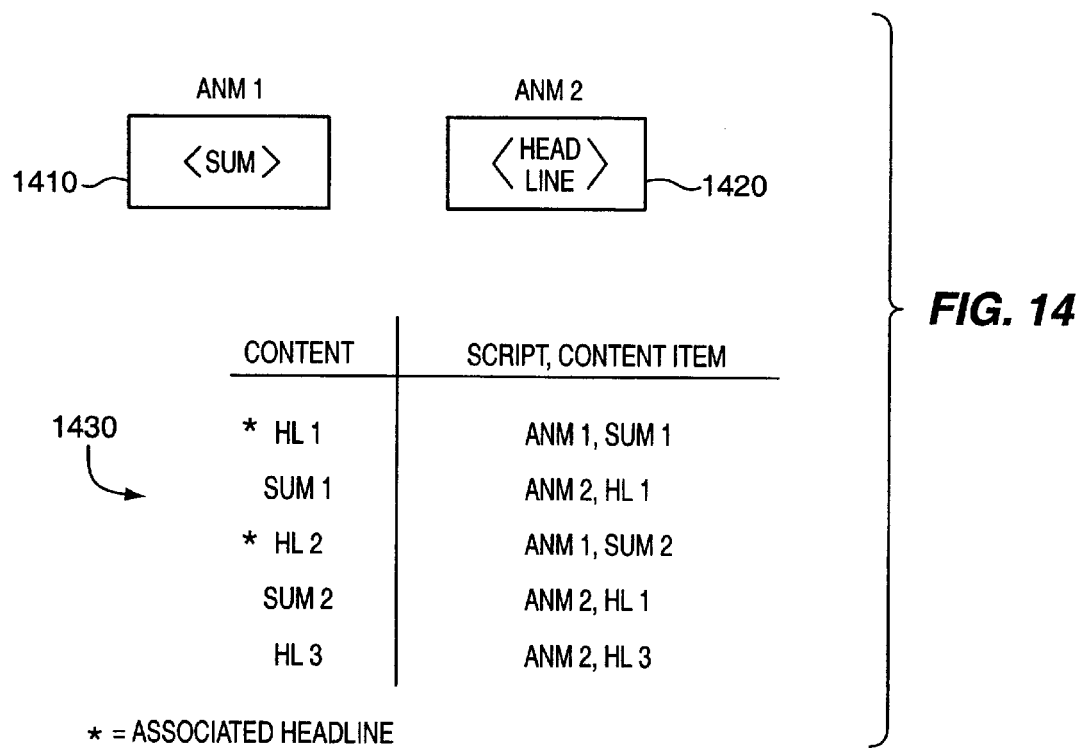
FIG. 14 is a tabular representation of how animation scripts and the content they refer to are controlled for subscriber display purposes, all as a function of their association, if any.

An example of how the iteration code serves the appropriate content for display is illustrated by FIG. 14. Assume that a first animation script file 1410 holds references to various summaries associated with particular news headlines. Alternatively, the news summary could be and often is replaced by a photograph, chart, illustration or other graphic specifically associated with a particular news headline. A second animation script file 1420 holds the news headlines. In the FIG. 14 example, the delivered content is assumed to comprise several headlines (HL I, HL2 and HL3) and at least two summaries (SUM I and SUM2). The specification for and file format of animation script files as used herein can be found in Appendix I to this specification.

When animation script file I is played, it reaches a call for SUM I, accepts that information and causes it to be displayed on the client workstation display 1370. Next, animation script file 2 is played and its call for HL I is responded to causing HL I to be played in a scripted associative fashion with respect to SUM I on the client workstation display 1370. The same routine is followed for display of SUM2 and HL2. The asterisk alongside headlines HL I and HL2 indicates that these headlines have summaries or another item associated with each of them. That is not the case for HL3.

When animation script file 1 is next interrogated, its non-associated status is reported, i.e.—there is no SUM3, whereupon the interrogator code causes HU to be played by itself However, had HU been an associated headline, the lack of a SUM3 in the content queue would have resulted in HU being skipped since the display of a headline without its associated summary or photograph is deemed to be undesirable. Further, if there were several dozen or more unassociated headlines present, they would all stand an equal change of being displayed depending on their order in the content queue.

The versatility of this approach is to be contrasted with animation code that is embedded in an HTML page and played by a Visual Basic or Java script. The present invention is versatile and content driven while the HTML approach, even with dynamic HTML, is content limited and restricted by its "hardwired" content approach.

B. Local Content Manager

Content Management

Better enable multi-part articles

Provide client-level ability to add, delete, reorder etc. content

Maintain properties on content (i.e. read or unread)

Componentization

Embedded third-party browser

Constellation, Active Desktop, and JavaStations

Figure 15:
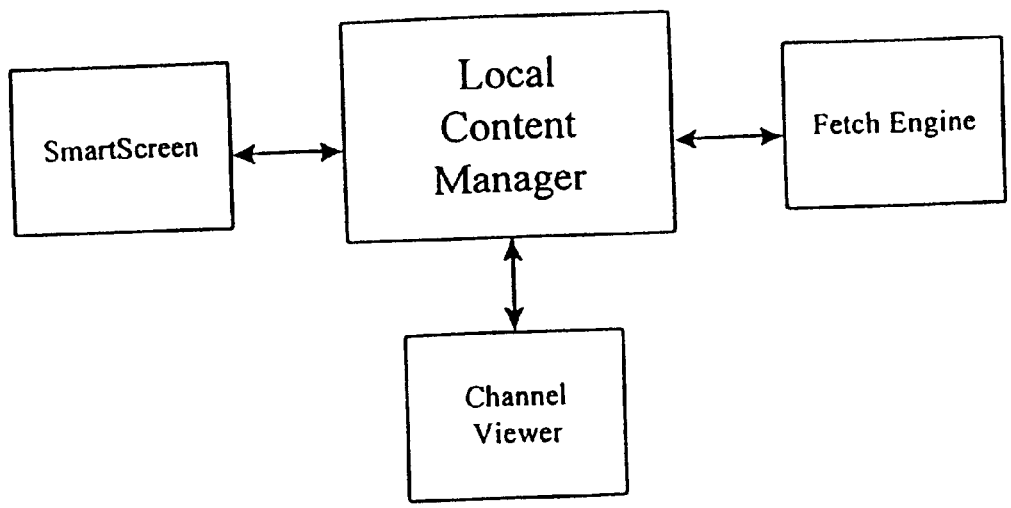
FIG. 15 shows a structure of a componentized client having a local content manager at its center and interacting with a smartscreen, channel viewer, and fetch engine.

FIG. 15 shows a structure of a componentized client having a local content manager at its center and interacting with a smartscreen, channel viewer, and fetch engine.

Summary

The Local Content Manager (LCM) is responsible for serving as well as adding, removing, and modifying properties of all data in the client that is not administrative (administrative data includes software, animations, catalogs, etc.). The LCM works by keeping a record of properties for each data item on the client. These records are created and edited through the use of content wrappers.

Figure 16:
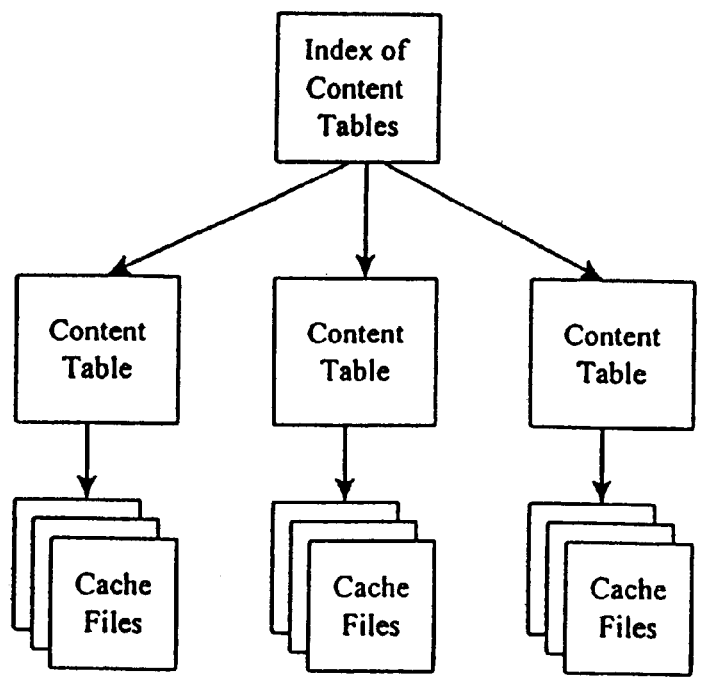
FIG. 16 shows a relationship between cache files containing data, content tables associated with the cache files, and an index of the content tables, which may be used by a local content manager to manage data in a client.

FIG. 16 shows a relationship between cache files containing data, content tables associated with the cache files, and an index of the content tables, which may be used by a local content manager to manage data in a client.

Content Tables
Content tables are the guts of LCM. Each category ID will have its own content table, unless the TABLE_CAT_ID field is set in the category catalog (in order to share one table across several category IDs).

| Field Name | Type | Default | Description |
|---|---|---|---|
| INDEX | Binary | Key | Unique key for the data item record (across all LCM tables). The key is generated by the LCM. |
| CAT_ID | L4 | CAT_ID item was fetched using | The category ID of the item. This is the "content" category ID and not the fetch category ID (see Category Table). This value is supplied by the fetch engine if nothing is specified in the wrapper. |
| SEARCH-STRING | String8 | Searchstring item was fetched using | The Searchstring specifies what Searchstring, if any, was used to fetch this item. This field is necessary so that the client can select items for a specific search-sting (generating article lists for listboxes, deleting items after personalization, etc.). |
| URL | String8 | — | Only used for web-fetched category Ids, this is the absolute URL that this data item was fetched from. (Need to keep verified - conditional get - state per session). |
| MD5 | Binary | — | The MD5 checksum of the data item (not including the wrapper). Needs to be generated by the feed (to allow for item-based fetching). Always on the UNCOMPRESSED data. |
| ARTICLE_ID_MD5 | Binary | — | Article_IDs are a property of the data item and set by the feed. The MD5 checksum (hexadecimal) of the Article ID is used instead of the Article ID string itself as an optimization. If just the Article ID string is specified in the wrapper, then the client will convert it to an MD5 before inserting in the LCM. |
| CHILDREN | Binary | — | List of database keys for the children of this item (20 bytes each, no delimiter). List is used to overwrite expires times from parent |
| MIME_TYPE | String8 | — | The MIME type of the data item. (Needs to be specified in the wrapper so that the client can decide whether to fetch children. For example, the viewer may not want audio clips automatically downloaded.) |
| LOCALE | L4 | | ID of the Win32 locale this category is intended for. |
| CHARSET | L4 | | ID of the charset content for this category uses. |
| CREATION_TIME | TimeT | Time of fetch | Can be server supplied. If not in the wrapper, the time at which the item was inserted in the LCM will be used. |
| EXPIRATION_DATE | TimeT | Creation_Time + Lifespan | Values: 0|FFFFFF|Value The time to make A value of 0 is a "kill," this item will be deleted. A value of FFFFFF means "archive." Unless the expiration date is modified, this item will never be deleted. |
| SIZE | L4 | — | The size, in bytes, of the STORED data item (sans wrapper). |
| TITLE | String-8 | — | The string to be used for the item in the article listbox and for the Headline actor in the SmartScreen |
| SHOW_ | L4 | — | A numeric value specifying what order the |

-continued

Content Tables
Content tables are the guts of LCM. Each category ID will have its own content table, unless the TABLE_CAT_ID field is set in the category catalog (in order to share one table across several category IDs).

| Field Name | Type | Default | Description |
|---|---|---|---|
| ORDER | | | sorting priority of the item is. If not explicitly defined in the wrapper, this field is left blank. To build an ordered list, the channel would sort in descending order (higher values should be higher on the list) on Show_Order as the first key and descending order on Creation_Date as the second key. |
| ACTORS | String8 | | This is a list of content IDs and what actor types are available for each. Please see the PCN_ACTORS section of this spec for more detail. Syntax: <content ID>= <name>[, <name> . . . ] [&<content ID>= <name> [, <name> . . . ] . . . ] |
| *ACTORS_SHOWN | L4 | | Bitmask of sorted content IDs indicating which content IDs have been played. |
| *READ | Boolean | 0 | A flag that marks whether the item was displayed in the client. The icon for this item in the article listbox will vary depending on this flag. |
| [Reserved Fields] | | | |

* = User-specific fields. Will eventually be moved to separate tables (necessary for shared or networked LCM).

Using the LCM
Here are the interfaces:

```
//////////////////////////////////////////////////////////
//
// PCNTable
//
#define PCNTABLE_METHODS (IPURE)                        \
    XPMethod (SetColumns)                               \
        (PPCNPropTagArray     lpPropTagArray,           \
         UInt32               ulFlag) IPURE;            \
    XPMethod (GetRowCount)                              \
        (UInt32               ulFlags                   \
         UInt32 FAR *         lpulCount) IPURE;         \
    XPMethod(FindRow)                                   \
        (LPSPCNRestriction    lpRestriction,            \
         UInt32               ulFlags) IPURE;           \
    XPMethod(SortTable)                                 \
        (LPSPCNSortOrderSet   lpSortCriteria,           \
         ULONG                ulFlags) IPURE;           \
    XPMethod(QueryRows)                                 \
        (LONG                 lRowCount,                \
```

-continued

```
              UInt32              ulFlags,             \
              LPSPCNRowSet FAR *       lppRows) IPURE;
class PCNTable : public XPUnknown
{
public:
    PCNTABLE_METHODS (XPPURE);
};
#define LCM_CREATE             0x00000001L
//////////////////////////////////////////////////////////////
//
// PCNCache
//
#define PCNCACHE_METHODS(IPURE)                              \
    XPMethod (ItemFromURL) (                                 \
                                IN UInt32 ulFlags,           \
                        \       IN LPCSTR szURL,
                                OUT PPCNCacheItem *
                                ppcacheitm)
IPURE; \
    XPMethod (AddItemFromFile) (                             \
                                IN UInt32 ulFlags,
                        \
                                IN PPCNProp pProp,
                        \
                                IN LPCSTR szFile,
                        \
                                OUT PPCNCacheItem *ppcacheitm)
                                IPURE;
    \
    XpMethod (ItemFromIndex) (                               \
                                IN UInt32 ulFlags,
                        \
                                IN UInt32 ulcatid,
                        \
                                IN REFLCMKEY puuidIndex,
                        \
                                OUT PPCNCacheItem *
                                ppcacheitm)
IPURE; \
    XPMethod (GetTable) (                                    \
                                IN UInt32 ulcatid,
                        \
                                OUT PCNTable ** pptbl)
                                IPURE;
class PCNcache : public XPUnknown
{
public:
    PCNCACHE_METHODS(XPPURE);
};
//////////////////////////////////////////////////////////////
//
// PCNCacheItem
//
#define PCNCACHEITEM_METHODS(IPURE)                          \
    XPMethod (GetStream) (                                   \
                                IN UInt32 ulReserved,
                        \
                                IN UInt32 ulFlags,
                        \
                                IN XPIIDREF refiid,
                        \
                                OUT PPCNStream * ppstm)
                                IPURE;
    \
    XPMethod (Lock) (                                        \
                                IN UInt32 ulReserved) IPURE;
    \
    XPMethod (Unlock) (                                      \
                                IN UInt32 ulReserved) IPURE;
    \
    XPMethod (SaveChanges) (                                 \
                                IN UInt32 ulReserved) IPURE;
class PCNCacheItem : public PCNProp
{
public:
    PCNCACMEITEM_METHODS(XPPURE);
};
enum { eRead, eTitle, eExpTime, eCreatTime, eSize, eURL, eMDS,
        eDBIndex, eContentType, eCatId, eShowOrder,
        eArtIdMDS, eChldKeys, eChnlStr1, eChnlStr2,
        eChnlBin1, eChnlBin2, eChnlInt1, eChnlInt2,
        eActorTypes, eFileId};
#define NUMLCMVARSIZEPROPS 8
#define LCMVARSIZEPROPS         \
{                               \
    8                           \
    {                           \
        XPR_TITLE             ,\
        XPR_URL               ,\
        XPR_CHLD_KEYS         ,\
        XPR_CHANNEL_DATA_STR1 ,\
        XPR_CHANNEL_DATA_STR2 ,\
        XPR_CHANNEL_DATA_BIN1 ,\
        XPR_CHANNEL_DATA_BIN2 ,\
        XPR_ACTOR_TYPES        \
    }                           \
}
```

Accessing a Data Item in the LCM through the Localhost Server

To enable the use of third-party browsers to render our articles, a localhost server will become part of the client. The localhost server in the 2.0 client will respond to three different request types:

MD5 - The combination of category id and MD5 checksum can uniquely identify any LCM data item (actually, just the MD5 is enough to uniquely identify a data item, however the category ID is needed by LCM to select the correct table). By requesting a URL with the following syntax, any LCM item can be accessed from a browser.

```
              address>/v1?catid=<category id>&md5=<md5
checksum>
```

PointCast content will use root-level URLs for child references (images, etc.) because the LCM localhost could use any port (or any IP, for that matter, in the case of a diskless workstation). For example, a PCNFILE-style image from a 1.x feed would now use the following URL.

```
<IMG SRC = "/v1? catid=1011&md5=1234567890ABCDF01234">
```

URL - While URLs are not as unique as MD5s (they're unique at any point in time, but not over time), they are a very commonly used way of address data. In addition, for any content that comes from the web rather than the Data Center, MD5s won't be available. For these reasons, LCM items can also be accessed using their URL with the following syntax:

```
                    id>&url=<URL-encoded URL>
```

By using different category IDs, many different web caches can be created. The PointCast 2.0 client will have three, one for the browser, one for the corporate channel, and one for the Connections channel. The equivalent example

Figure 17:
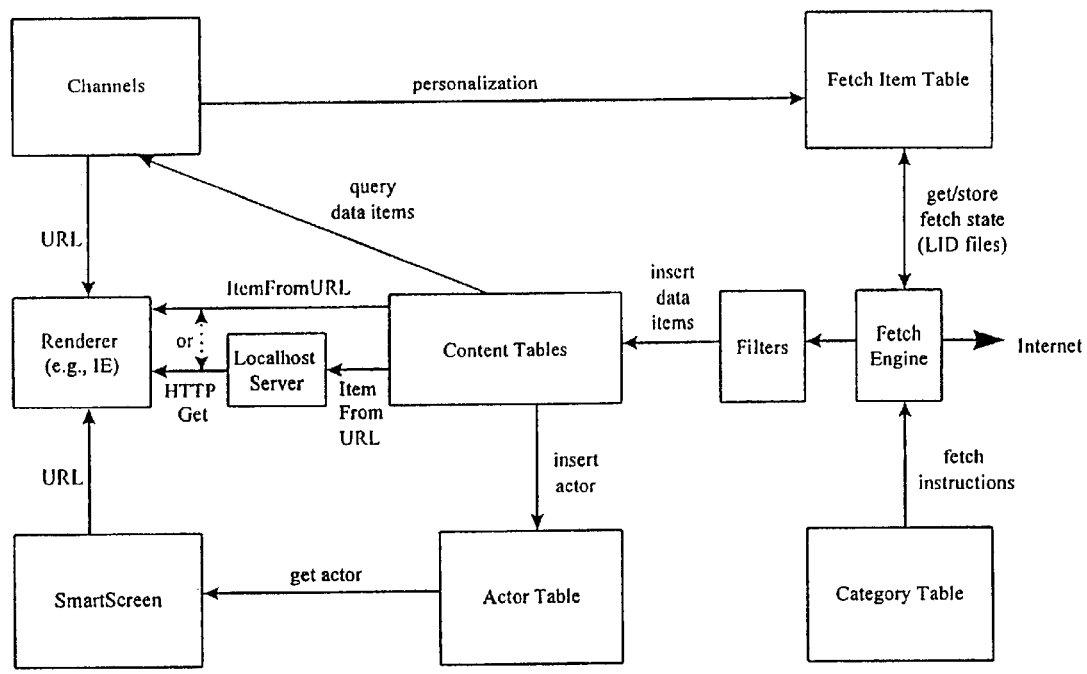
FIG. 17 shows a block diagram a local content management system including relationships between channels, a renderer, a smartscreen, an actor table, a local host server, content tables, a category table, a fetch engine, a fetch item table, and filters.

```
<IMG SRC = "/v1?catid=120&url=
    http%3A%2F%2Fwww%2Epointcast%2Ecom%2Fimages%-
    2Freuter%2Egif">
```
would retrieve the image that originally came from:
http://www.pointcast.com/images/reuter.gif PCNEXEC - PCNEXEC commands were used in the 1.x client to force the client to perform some action based on clicking a link in the browser or animation. Because the old PCNEXEC was done at the protocol level, it needs to be modified in 2.0 to support localhost. The new syntax will be:

FIG. 17 shows a block diagram a local content management system including relationships between channels, a renderer, a smartscreen, an actor table, a local host server, content tables, a category table, a fetch engine, a fetch item table, and filters.

C. Fetching and the Local Content Manager

Fetch Item Table
The Fetch Item table keeps a list of items to fetch, instructions for fetching them, and the state for each. Items are created in the Fetch Item table through personalization. When a viewer personalizes a channel, what they're really doing is choosing a set of category ID and search-string pairs that they wish to "subscribe" to. For each unique combination of CAT_ID and SEARCHSTRING, a new record will be created in the Fetch Item table.

| Field Name | Type | Default | Description |
|---|---|---|---|
| INDEX | Binary | Key | Unique key for record |
| CAT_ID | L4 | KEY | Uniquely identifies the category. This cat_id will be used throughout the client and Data Center to identify content belonging to this category. |
| SEARCHSTRING | String8 | — | The search-string to use in requesting the item. For a LastID fetch (see Request_Type in the Category table) this field can be blank or provided by a channel based on personalization (i.e. MSFT, if a viewer as added Microsoft to the Companies channel). For the Web Request_Type, the search-string will be the URL to update. |
| FETCH_TYPE | String8 | LastID | Values: LastID\|MD5 \|ArticleID\|Web\|Prefilter\|PCNItem Describes the syntax that will be used to update this category. LastID - The "traditional" syntax. See PCN_HTTP for more detail. MD5 - A new method that allows for requesting items individually. The syntax is outlined in a later section. ArticleID - A new method that allows for requesting items individually by type. The syntax is outlined in a later section. Web - Used for any category that is updated from a web server using standard URLs. Prefilter - Instantiates the Filter for the fetch item only (no data is requested or transmitted before the filter is called). PCNItem - Used for backward compatability with old-style custom fetch items (admin items, weather, etc.) |
| FILTER | GUID | | Filter to call for this fetch item. (see Filters section) |

-continued

Fetch Item Table
The Fetch Item table keeps a list of items to fetch, instructions for fetching them, and the state for each. Items are created in the Fetch Item table through personalization. When a viewer personalizes a channel, what they're really doing is choosing a set of category ID and search-string pairs that they wish to "subscribe" to. For each unique combination of CAT_ID and SEARCHSTRING, a new record will be created in the Fetch Item table.

| Field Name | Type | Default | Description |
|---|---|---|---|
| CHANNEL_ID | L4 | | Used to notify channel when fetching for this item is completed and for knowing where in the table to start a fetch so that the active channel is updated first. |
| CATEGORY | String8 | | Reserved for use by the Actor iterator code (see tbe Dynamic Actors spec). |
| FETCH_ORDER | L4 | | Reserved for use in specifying relative fetch order of items (either inter-channel, intra-channel, or both). |
| FETCH_MESSAGE | Sring8 | | Text string to show in menu bar while fetching. Needs to support variable substitution for SearchString. For example, the company news category would have "<Searchstring> News" which would turn into "Getting AAPL News_" in the title bar. |
| DATA_CENTER_ID | String8 | 1 | An ordered list of Data Centers from which this category can be fetched. Data Centers are identified to the client through a set of *.dc files that contain a list of IP addresses and basic properties of a Data Center. |
| INCLUDE_REG_ID | Boolean | 0 | Should the registration ID be included in the syntax of requests for this category ID? This field only applies to the Request_Types LastID and MD5 and not to Web. Including the registration ID makes a request unique, loggable, and uncacheable. |
| NUM_ITM | L4 | 10 | The number of items that the client should request for this category. Used for LastID fetches only. |
| AUTHENTICATION | String8 | — | Username and encrypted password. Needed for fetching content that uses HTTP challenge authentication. The value is stored exactly as it appears in the HTPP header (password encrypted). |
| EXPIRATION POLICY | String8 | Number | Values: Lifespan\|Num_Keep Lifespan - Use only the expires value to expire content Num_Keep - In addition to using the expiration date, enforce the Num_Keep value. |
| LIFESPAN | L4 | 259200 0 | The default lifespan for all data items fetched on this category in seconds. That is, if the content itself does not carry an expires time it's expires time will default to the time it was fetched plus this lifespan value. |
| NUM_KEEP | L4 | 25 | The number of items that should be kept in the LCM for any entry in the Fetch Item table. This entry is used by the LCM whenever it needs to "cleant" a table. |
| LAST_UPDATED | TimeT* | — | The time when this item was last successfully updated (200-series response). |
| NEXT_UPDATE | TimeT* | — | The time when this item will again be ready for automatic updating. This value is supplie by the Data Center. |
| LAST_ID | L4 | 1 | The value of the highest fidotag fetched for this item. The fidotag is a sequential and incrementing database key that is unique per data item within a category ID. The fidotag for each data item is specified |

-continued

Fetch Item Table
The Fetch Item table keeps a list of items to fetch, instructions for fetching them, and the state for each. Items are created in the Fetch Item table through personalization. When a viewer personalizes a channel, what they're really doing is choosing a set of category ID and search-string pairs that they wish to "subscribe" to. For each unique combination of CAT_ID and SEARCHSTRING, a new record will be created in the Fetch Item table.

| Field Name | Type | Default | Description |
|---|---|---|---|
| | | | in the data stream header (see PCN_HTTP.doc). This field is not used for the Web Request Type. |

*TimeT is the number of seconds since Jan 1,1970 GMT.
NOTE:
For more detail on specifically how some of these fields are used in fetching, please see Harry Collins' PCN_HTTP spec (n:\ped_pub\hcollins\docs\pcn_http.doc).

Category Catalog

The category catalog is a list of overrides to values in the fetch item table that is fetched from the Data Center. This Data Center-side control extends to the ability to turn category IDs off by changing their status.

The catalog itself is a series of HTML like tags—one per category ID. The HTML syntax is used so that backward and forward compatibility are easy to maintain because properties can be added or deleted without affecting existing clients. All of these fields are defined in the fetch item table except for ServerCatID and Status.

<CATEGORY

*CatID=

ServerCatID=

Status=

DataCenterID=

NumItm=

NumKeep=

IncludeRegID=
DefaultLifespan=
ExpirationPolicy=
>
</CATEGORY>
*=Required

| Field Name | Type | Default | Description |
|---|---|---|---|
| SERVER_CAT_ID | L4 | ID | Specifies the category ID from which to fetch the item. By default, this is the same as the cat_id. However, the category catalog can redirect the client to fetch this category from anywhere, although the client will still treat all data fetched from the fetch_cat_id as though it came from the original cat_id. |
| STATUS | String8 | — | Values: Blocked<br>Blocked - The client will not fetch this category until it receives a new category catalog that does not block this category. |

Fetching

The Process
Fetch item
Pass to filter
Returns properties of file
List of fetch commamds
Process fetch commands
[fetch item]
Insert file and set properties
Finish item Filters Upon startup of the client, components of the client can register filters to process fetch items. Filters are called by the fetch engine to process data items after they've been fetched but before they're inserted into the content tables (or even before they're fetched, in the case of the Prefilter Fetch_Type). When a filter registers for a category ID it becomes responsible for sequencing the calls to any other filters that might be necessary and passing its results to the wrapper parser (if necessary) or inserting into the content tables.

HTML—Scans for images, changes their URLs to use LCM, and adds child fetch commands for them to the wrapper. Also needs to scan for the <TITLE> tag and put it in the wrapper (unless TITLE is already specified in the wrapper).

PPA—Turns PPA files into wrapper-based fetch catalogs.

ANM—Adds a wrapper with fetch commands for all non-embedded image files.

Content Wrapper

Content wrappers allow fetched data to communicate its properties, as well as its relationship to order data items. The content wrapper is created at the feed level and is not modified by the client. In fact, the content wrapper is not removed from the file once it is stored on disk so that the LCM tables can be thrown out and rebuilt from the content itself if necessary. Because the wrappers are not removed from the content, ALL wrapped content must be accessed through the LCM.

The format of the content wrapper is HTML (what else?) and is designed to be "invisible" to other browsers if the data item itself is HTML. The wrapper consists of a comment that gives the byte-offset of the "actual" data item and then a PCN_ITEM tag that may contain PCN_COMMAND tags as children.

```
<!--[5-digit byte offset to where content begins]--!>
<PCN_ITEM
    Type = Data|catalog
    Offset = [5-digit byte offset to where content begins]
    [Content table properties_. (see next section)]
>
<PCN_COMMAND
    Type = Child_Fetch|Force_Fetch|Set_Props
    [Content table properties_. (see next section)]
</PCN_COMMAND>
</PCN_ITEM>
[Content_.]
```

5-digit byte offset—The byte-offset is an LCM optimization that also allows clients that don't support LCM a way to strip the wrapper without having to parse it. The five-digit number must be at bytes 5–9 of the file.

There are two types of PCN_ITEMs:
  Data—If a PCN_ITEM tag is the Data type, its properties apply to the actual wrapped data item.
  Catalog—Catalog is identical to Data except that it doesn't have any content—it is just a wrapper. Catalog PCN_ITEMS can be used for catalog fetching, issuing kills, reordering data items, etc.

There are three types of PCN_COMMANDs:
  Child_Fetch—The child_fetch type is used to force the fetch of an item that is needed by the PCN_ITEM (i.e., an image in an article). Once the item is fetched, it is then added to the Children list of the PCN_ITEM (see Content Table). The PCN_COMMAND tag for a child MUST contain the CAT_ID and either the MD5 or the ARTICLE_ID_MD5, because these values are necessary for both checking to see if the item is already present, and if not, for fetching it.
  Force_Fetch—Force_Fetch is identical to Child, except that the item is not added to the PCN_ITEM's list of children.
  Set_Props—A Set_Props PCN_COMMAND updates the properties of the specified item. If the item is not present, no action is taken.

Wrapper Fetch Commands: MD5 and ArticleID fetching

To enable the effective fetching of individual items (the CHILD_FETCH and FORCE_FETCH PCN_COMMAND types), two new fetch MD5 Fetching MD5 requests can be bundled into single requests. Initially, there will only be one category ID used for this style of fetching. However, this category ID is in essence a "back door" for fetching any item based on its CAT_ID and MD5.

/FIDO-1/<special MD5 CatID>-1?cm+<Any CatID>_<MD5 of desired item>[+cm+<Any CatID><MD5 of desired item>_]

Article ID MD5 Fetching

This type of fetching works identically to MD5 fetching, however since Article IDs are not guaranteed to be unique, the service agent should always return the newest, and only the newest, item matching the request.

/FIDO-1/<special Article ID MD5 CatID>-1?cm+<Any CatID>_<MD5 of the Article ID of desired item[+cm+<Any CatID>_<MD5 of the Article>_]

D. Version Control
  Overview

The goal of this redesign of version control is to make upgrading the PointCast software as convenient and transparent as possible for users, as well as supporting client-specific software.

Version Control Types
Current catalog version controls:
hot swap
reload channels
  show dialog after 30 minutes idle or next launch of client [upgrading channels_]
Reboot
  required components that require reboot [force funpack There are missing or corrupt files in this installation. Do you want to fix this now?
Upgrade catalog version controls:
Just as in 1.1
Update
  The update button causes the PCN client to update the active channel first and then all other channels. The display of each channel is refreshed as soon as it completes updating.

Personalize

The personalize dialog allows the user to select and order channels as well as personalize what is shown in those channels. The personalize options for each channel will be detailed in that channel's section of the design overview. Selecting and ordering of channels will occur in the following dialog:

[Click to view at full size]

A user can select channels by checking their checkboxes. They can select up to eight optional channels in addition to their mandatory channels, which have grayed-out checkboxes. Which channels are mandatory is communicated from the Data Center or I-Server as part of the administrative fetch (see). Typically, there will be one PCN mandatory channel and one LMP (Local Media Partner) mandatory channel.

Italicized channel lettering means that the software necessary to personalize and view that channel is not present. If any of these channels are selected, then the Get New Channels button becomes active. Selecting the Get New Channels button begins a version control that does not require shutting down PCN.

Upon completion of the version control, the new channels' .dlls will be loaded, their channel names will no longer be in italics, and their properties pages will be present. In order to make the acquisition of new channels as seamless as possible, configuration files and a default SmartScreen will be downloaded in addition to the software necessary to run each channel. This mechanism will be outlined in more detail in the section.

New Channel Notification

When a new catalog is fetched, the next time the client is launched, restored, or the Personalize dialog is launched, the user should see the following dialog"

The following new channels are now available:
  Channel Name (in Channel path)
  To add any of these channels, click Personalize and go to the Channels tab.
  Personalize Cancel See the Channel Dictionary section in the Software Catalog for an explanation of how the client will know when there are new channels.

Version Control

The client what software files are needed for version control using the software catalogs specified in the catalog-.dat administrative fetch. Once all of the necessary files are present, there will be three kinds of version control processes:

Software upgrade—Same as current version control.
  Get New Channels—Occurs when the Get New Channels button is pressed. A status dialog is displayed while the software, configuration files and a default SmartScreen for the new channels are fetched. The version control should be completed without shutting down the application.
  Configuration files—If no files requiring shutting down the application are necessary for the version control (as determined by the core flag which needs to be added to the update options field in the software catalog), then the version control should happen automatically without needing any user feedback.

The Software Catalog
  Overview
  The file is divided into five sections:
  Administrative info
  Path Dictionary Channel Dictionary Software Table INI Modifications The Two Catalogs Because of the many different uses of the software catalogs, the client needs to use two software catalogs (although the two catalogs will often be the same).

Current Software Catalog

The current software catalog is used for software maintenance and the addition of channels only. In short, it is used for restoring software already listed in the catalog and not for upgrading to anything. Version controls required in this catalog always take priority over version control in the upgrade software catalog.

Upgrade Software Catalog

An upgrade software catalog will be posted anytime a change occurs to the core software (not channels or resources).

Administrative Info

Administrative Info section starts with a line equal to "Admin". This section contains the software catalog version stamp. Having a version stamp will enable several features, the 4 most important of which is providing a defense against reverse migration.

The version stamp of the current catalog will be recorded in the pcn.ini. Whenever a new catalog is fetched, it's version stamp will be compared with what is already listed in the pcn.ini. If the stamp is higher, a new channel check will be run (see the Channel 8 Dictionary section) and the new catalog version stamp will be recorded. If the version stamp is older, then the fetched catalog will be discarded.

The stamp itself will be a string with to tab separated fields: of platform code and catalog version (ppp-Vvbbbbnnnn). Catalog version is a 10 character string. The first two are split up as follows major version number followed by minor. The next four are a client build number, the last four are the catalog number for this particular build. For example, "w32<tab>2002040001" would be the version stamp of the first catalog for build 204 of the 32-bit Windows client, version 2.0. If resources have changed that don't require a new build, the next catalog issued would have a version stamp of "w32<tab>2002040002".

Windows Specific Platform codes: w32, w16—these would be used for Windows 16 bit and 3 2 bit on INTEL based platforms. We can add others as we began to support other platforms for NT RISC, PowerPPC, Path Dictionary This section starts with "PathDictionary". The path dictionary is used to specify what directories contain files that need to be added or modified as part of the version control process. Each entry in this dictionary contains a character specifier to be used in the Software Table and the path relative to either the PointCast application or the currently active system. The paths start with {pcn} for application folder relative or {sys} for system relative. A sample dictionary follows:

--- x {pcn} - application root dir
   z   {sys} - Current Windows directory, not "windows\system"
   6  {pcn }images\- images directory

---

The dictionary entries are used to specify a file's target location. For example, a target entry of "{6}pcn.ini" might translate to a file path of "c\Program Files\PointCast\/images\pcn.ini" on a user's machine provided that pcn is installed in to c:\Program Files\PointCast\.

Channel Dictionary

This section starts with "ChannelDictionary". The channel dictionary is a listing of channel names and numbers. Having a separate lookup table for channel names simplifies the software table.

Channel number—The channel ID.

Channel name—The display name for the channel in the channel selection personalize page (important for listing channels that are not currently on the machine).

Channel description

Catalog version introduced—This field will list the version stamp of the catalog in which this channel was first introduced. By comparing the version stamp of the previous catalog (from pcn.ini), the client will know which channels are new (see New Channel Notification above).

Personalize path—The hierarchy within the channel selection personalize page the channel should be listed in. While ideally the channel catalog itself would be presented in this hierarchy, having the path as a field is necessary to retain compatibility with the Mac version of the client.

Brand ID—Specifies the Brand IDs for which this channel is available (* means all)

ADI—Specifies the ADIs for which this channel is available (* means all)

EXAMPLE

| Channel Number | Channel Name | Channel Description | Version Stamp | Personalize Path | Brand ID | ADI |
|---|---|---|---|---|---|---|
| 10 | News | New from all over the world | 01000001 | \ | * | * |
| 20 | Companies | Latest Hi Tech news | 01000001 | \Finance\ | * | * |
| 80 | Industries | | 01000001 | \Finance\ | * | * |
| 90 | Lifestyle | | 01000001 | \Entertainment\ | * | * |
| 4000 | Pathfinder | | 01000001 | \Entertainment\ | * | * |
| 4010 | TechWire | | 01260001 | \High Tech\ | * | * |

-continued

| Channel Number | Channel Name | Channel Description | Version Stamp | Personalize Path | Brand ID | ADI |
|---|---|---|---|---|---|---|
| 2000 | Boston Globe | | 01000001 | \Newspapers\ | * | * |
| 2010 | LA Times | | 01000001 | \Newspapers\ | * | * |
| 6000 | CNN | | 02560001 | \CNN\ | * | * |
| 6010 | CNNfn | | 02560010 | \CNN\ | * | * |
| 6020 | CNN-SI | | 02560027 | \CNN\ | * | * |
| 7000 | Compaq | | 01300010 | \ | 19 | * |

Software Table

This section starts with "Files". The software table includes the following fields:

Channel ID
compressed filename
target file name
size of compressed data
Compressed CRC
size of expanded data
expanded file CRC
Target file creation date
Target file modification date
version string
update option flags
data compression scheme
Brand IDs
ADIs
Flags For files that are not channel specific Channel ID is set to kdwChnICore (see chnl-ids.h).

Flags field is an ORd combination of different flag bits. Currently only two lower bits are used.

If 0x1 bit is set, this file is to be registered as the main module for this channel. It means a line "Channel-ID=Target-File-Name" will be written into pcn.ini. If this bit is set, Channel ID can't be kdwChnICore.

If 0x2 bit is set, it means that the corresponding channel is a generic channel and catgenxx.dll is to be called upon to create the channel.

Time stamp format is "mm/dd/yyyy<space>hh:mm".

The differences between branded clients (independent of channels) can be contained within the pcn.cfg (.ini switches and attached resources). Because the Mac already only uses the Brand ID and ADI fields for channel files, a "dummy" channel number of 666 will be used for the pcn.cfg listings. Therefore, there will be one entry for each major difference in this new format is that not all files are required for an upgrade. If files belong to other ADIs or Brand IDs, or to channels that are not selected, they are not required for a version control.

Update Option Flags

There are three sets of update options flags. The first three are mutually exclusive (i.e., there shouldn't ever be more than three flags used for any one file. The fourth "File Attributes" flag, can have more then one flag or attribute associated with it (i.e., we can set a file to be both read-only and hidden. Orjust hidden, orjust read-only.). Every set of flags is represented by a single lower case character. So update flags field is a string of length three.

File options:

remove ('d') replace if newer ('r') (based on version resource, is valid only for. exe and .dll),
update ('u'), add if don't exist ('a'), patch ('p').

Version Control Type:

hot swap ('h'), channel reload ('c'), client reload ('v'), reboot system ('s')

File attributes:

read-only ('r'), hidden ('h'), system ('s'), hidden and read-only ('c'), default('d')

INI Modification

The INI Modification section starts with "INI". The section includes the following fields:

{Dir_Name}File_Name
Modification Flag
INI Section
INI Entry
INI Value
Data
Recover flag (Boolean: 'y'/'n' must be lower case) (defaults to 'y')

Dir-Name has to be one of the predefined directories.

All fields except Data and Recover flag are mandatory even if Modification Flag is Delete.

If Modification Flag is 'r'—Replace, Data is a';' separated list of values. If the current value of the field is one of the values in the Data field, it is replaced with INI Value.

If Recover flags is 'y'(default) then this item is reapplied every time we detect that something is wrong with pcn.ini. (For example when we can not find a DLL name for a channel).

EXAMPLE

<INI
  File={pcn}pcn.ini
  OpCode=m
  Sect=Channels
  Key=10
  Value =catgen32.dll
  Rebuild=y
>

```
</INI>
  <INI
  File={pcn}pcn.ini
  OpCode=m
  Sect=Startup
  Key=ShowLicense
  Value=1
  Rebuild=n
  >
</INI>
```

EXAMPLE

{pcn}PCN.INI M Startup ShowLicense 1
Modification Flags: (case is important)
Add/Modify ('m'), Delete ('d'), Replace ('r').

E. The Administrative Fetch

This section deals with the administrative fetch itself and is broken into two parts, the request and the response.

The Request

| Field Name | Type | Description |
|---|---|---|
| Brand ID | 4-digit number | The Brand ID is used to specify a "flavor" or variation of the software. Typically, image resources and different default settings differentiate one branded client from another. The Brand ID value is read from the PCN.CFG file. |
| Build Type | 10-char string | This is the build type of the client. For example, a specific label of the windows client can be compiled to either a .16-bit or 32-bit version. |
| Client Version | 12-char string | This is the version number of the client. The syntax is MMmmBBBB where MM is the major client version, mm is the minor client version and BBBB is the build number. |
| Country Code | 3-digit number | The country code is the three-digit ISO country code for the country the user specified during registration. |
| Location Code | 12-char string | Currently, the location code is of the following format: The first digit of the location code is 0 if the viewer chose "United States" when installing the software and 1 if they chose anything else. In the case where 0 is the first digit, the remaining three digits represent the first three digits of the zip code the viewer entered. If it is 1, the remaining three digits are the ISO country code for the country the viewer entered (the exception to this rule is Canada, where fake ISO country codes have been created for each province). However, it has been extended to 12-characters to accommodate alpha-numeric zip codes as well as IP addresses. |
| OS Platform | 10-char string | This is the operating system version of the computer the client is currently running on. The OS Platform value may include whatever information is necessary to determine which client will be compatible with the viewer's environment. As this string will get mapped to a new value on the server, the syntax is somewhat flexible and can change as client needs change. |
| Registration ID | 14-digit number | This number uniquely identifies an installation of a PointCast client. The format of this number is BBBBLLLLSSSSSS, where BBBB is the brand ID, LLLL is the location code and SSSSSS is a sequence number returned to the client by the server at the time of registration and is chosen to ensure a unique registration ID (all 12 digits). In past versions of the administrative fetch, the first six digits of the registration ID were used to determine the Brand ID and Location Code of the client, rather than uploading those values independently. In |

-continued

The Request

| Field Name | Type | Description |
|---|---|---|
| | | 66336, those values will be uploaded separately to ensure accuracy and not require the client to re-register every time the location code changes (this value will be user-modifiable in the next version of the client). However, the registration ID still needs to be included in the request, as the administrative fetch is recorded by MIS to keep track of client activity. |

These six values are concatenated into the URL for requesting the catalog.dat. The syntax for this request will be:

GET/FIDO-1/66336-1?catalog.dat+regid+010002039001+ostype+w954-00+version+010100138+buildtype+w16+brandid+1+location+0002+country+840

Responding to the administrative fetch

Location Table

A new location code lookup table is necessary because the location code sent up by the client needs to be used for two distinctly different purposes: querying the master table for the catalog.dat and sending back a list of ADIS so that the client knows which ads to play, software to use, etc. In the new table, the Primary ADI is used for the Former purpose and the Client ADIs field for the later. Also, because channel restrictions may require more precise control than catalogs, all of the channel related fields have been moved to this table.

The Location Code Lookup Table

| Field Name | Type | Description |
|---|---|---|
| Country Code | 3-digit number | Key |
| Location Code | 12-char string | " |
| Primary ADI | 12-char string | The ADI to use to query the catalog table |
| Client ADIs | string | The ADIs to return to the client. |

Master Table

This table will be queried using specific values for each of the five key fields. There will be no "defaulting" or wild-carding used for querying this table—only an EXACT match of the five key fields will result in a complete catalog.dat.

The "Master" Administrative Fetch Table

| Variable | Type | Description |
|---|---|---|
| Brand ID | 4-digit number | (key) |
| Primary ADI | 12-char string | " |
| Client Version | 12-char string | " |
| Build | 10-char | " |

-continued

The "Master" Administrative Fetch Table

| Variable | Type | Description |
|---|---|---|
| Type | string | |
| OS Code | 3-char string | " |
| Required Channels | string | The list of channels that are always active and not selectable on a client. These channels do not count against the total of eight selectable channels each client is allowed. |
| Optional Channels | " | The list of channels that are selectable by a client, but do not count against the total of eight selectable channels each client is allowed. These channels should also default on the first time they appear in a catalog (please see the Client Issues section for more details). |
| Upgrade Required Channels | " | The list of channels that will be required upon completion of a version control to the Upgrade Software Catalog. |
| Upgrade Optional Channels | " | The list of channels that will be optional upon completion of a version control to the Upgrade Software Catalog. |
| Category Catalog Name | String | This specifies the name of the category catalog t request. No format for the name is specified at this time, because it is not anticipated that it will change very often. |
| Ad catalog Name | " | This specifies the name of the ad catalog to request and is of the format aYYMMDDS.dat where YY is the year, MM the month, DD the date, and S is a sequence number to indicate the time at which the catalog was created (populated?). Ad catalog names must be unique (i.e., two ad catalogs with the same name MUST have the same contents. This is a new requirement). |
| SS catalog Name | " | This specifies the name of the SmartScreen catalog to request and is also of the format aYYMMDDS.dat where YY is the year, MM the month, DD the date, and S is a sequence number to indicate the time at which the catalog was created (populated?). SmartScreen catalog names must be unique. |
| SW Catalog Name | " | This specifies the name of a software catalog to request. Software catalog names must be unique and are of the format TBBBB000.mig, where T is the type (1 = windows 16 bit, 3 = windows 32 bit, p = PPC, 6 = 6800 class), BBBB is the build number and 000 is a constant (migration files specified by the catalog will use a three-digit hexadecimal number to uniquely identify them in place of the 000 value). The current software catalog is used by the client to both maintain the current files (checking for corruption or tampering) and to add new components (e.g., channels). A value of NONE returned in this field will disable all features in the client except version control (please see the Client Issues section for more detail). |
| Upgrade SW catalog Name | " | This specifies the name of the ad catalog to request and is of the same format as the current software catalog name (in fact, they will often be the same filename). The upgrade software catalog is used by the client to migrate ALL software (including channels) to a new version. |
| *Category Catalog MD5 | " | (Optional) The MD5 checksum of the catalog. Because MD5s are guaranteed to be unique, including this field eliminates all redundant fetching of catalogs. The client will support this field, I'm leaving it up to the server team to decide whether adding the field is worth the effort. |
| *Ad catalog MD5 | " | (Optional) |
| *SS catalog MD5 | " | " |
| *SW Catalog MD5 | " | " |
| *Upg. SW catalog MD5 | " | " |

The results from the lookup in the above table, the client ADI list from the location code lookup, and the timestamp are then combined to form the final catalog.dat "file."

Because this field will have many, many rows (best-guess estimates put the eventual size at about 250,000 rows), it will need to be populated using a separate utility. Please see the Admin Population Tool section of this document for details on this application.

The Response

Since the administrative fetch is the only client request that is unique to a given client (other than uploads), the returned catalog.dat needs to contain all the information necessary to configure that client. To keep this request small and the only unique operation, most of the information contained in the catalog.dat is of the "meta" variety (i.e. pointers to files, rather than the files themselves, etc.). The five variables the client uses to request the catalog.dat will be used by the server service agent to compose this catalog.dat "file." (Because registration ID is only used for logging purposes, it will be excluded from this discussion.)

To reduce the number of possible values, two of the request variables are pre-processed. First, the OS version the client sends up will be mapped to an OS code [3-character string] using the same table as in previous versions of the administrative fetch. The OS code is merely a grouping value of OS version numbers into categories that are relevant to client compatibility. Currently, there are only four OS code values (w16, w32, 6mO, and pmO).

The second value to get pre-processed is the location code. The location code is used to return two separate values. The first is a Primary ADI (Area of Dominant Influence—it's a newspaper term) and the second is a list of all ADIs. An ADI is a geographical region used to specify a territory for a channel or ad. Having one location code map to several ADIs is useful for having overlapping or nested ADIs and thus simplifying the creation of ADIs. While this capability is useful for the playing of ads or the configuring of channels, having multiple ADIs makes the back-end database operations non-deterministic and hence the need for the Primary ADI field.

The result of these two operations are then used in conjunction with the other variables the client sends up to query the Master table and return a series of values:

EXAMPLE CATALOG.DAT:

[Authentication]
Time=845390130
ADIs=920,900
ReqChannel=10,50
NewReqChannel=10,50
OptChannel=201 0
NewOptChannel=2010
CatCatName=cat.dat
AdQueueName=a9610150.dat
SSQueueName=s9610150.dat
CatalogName=30138000.mig NewCatalogName=30140000.mig
[CatCatMD5=1234567890ABCDEF01234]
[AdCatMD5=1234567890ABCDEF01234]
[SSCatMD5=1234567890ABCDEF01234]
[SWCatMD5=1234567890ABCDEF01234]
[NewSWCatMD5=1234567890ABCDEF01234]
Note:

Time—[32-bit number] The server time for when the catalog.dat was created. This time is specified as the number of seconds since Jan. 1, 1970 GMT.

Client Issues

This section provides more detail on client behavior relative to the administrative fetch.

Disabling Older Clients

To provide a method for disabling older clients, a special keyword ("NONE") is now a legal response for the SWCatName field (current software catalog name) in the catalog.dat.

The next time the client channel viewer is launched after receiving this response, all features (except instant version control) and channels (except the Internet channel) will be disabled and a dialog with the following text will be displayed:

"This version of PointCast is no longer supported. To continue using PointCast, please click the Upgrade Now! icon located below the channel buttons and the software will upgrade itself over the Internet. If the icon is not present or when clicked does not successfully upgrade your software, please download the latest version from our Website at http://www.pointcast.com."

This feature will allow us to "turn off really old versions of the client so that their request types and migration files no longer need to be supported.

Optional Channels

Currently, there are two types of channels: required and selectable. Each client can turn on up to eight selectable channels, while required channels do not count against this total. Recent LMP (Local Media Partner) agreements, however, call for a third type of channel: Optional. Optional channels will be similar to required channels in that they will not count against the total of eight selectable channels. However, unlike required channels, the viewer will have the option of turning them off.

Another "feature" of these new LMP agreements is that optional channels need to turn on by default when they're first introduced. In version 2.0 of version control, a mechanism has already been put in place to notify the viewer when new channels have been introduced (it uses version stamping—for more details, please see n:\ped_pub\jdouglas\specs\Version Control.doc). That list now needs to be compared against the optional channels list returned from the server to determine what channels will need to be turned on by default. In addition, the software for new optional channels will need to be downloaded to complete an upgrade version control, even though these files would appear to be unnecessary since they don't belong to the core software or any currently selected channel.

Time Synching

The Time field returned in the catalog.dat will be used by the client so that it can "sync" itself with the server time. The value returned from the server is a 32-bit number representing the number of seconds since the beginning of the epoch (Jan. 1, 1970 Greenwich Mean Time). The client will take this value, add the local machine's time zone offset, subtract the local machine's time in seconds since the epoch, and record the delta in the PCN.INI. This value can then be used as an offset to adjust the local machine time whenever the client is performing an operation involving absolute time.

Initially, this value will be used to ensure accurate playing of ads, recording of adstats, and timely uploading of adstat files. While not a dramatic effect, correcting for erroneous machine time should increase our collected adstats by about 5%. And since adstats=revenue, the advertising-related portions of the client should be the first to use the time synching feature.

Eventually, the time offset should be introduced into the fetching code as well. However, since ALL fetching code would need to be changed for consistency's sake, this may not happen in 2.0 of the Windows client. Specifically, anything fetched from a source that returns absolute time for expiration values (i.e., the web or Public Access control files) really needs this feature.

Miscellaneous

New request format—The administrative fetch needs to adhere to the new GET syntax outlined in the Administrative Fetch section of this document.

Ignore unknown fields in catalog.dat—To guard against having to change the category ID for every release of the client, we need to ensure that the client will properly ignore field-value pairs that it doesn't recognize.

Remove the version string feature—Currently, version 1.1 of the Windows client can take a string and append it to the end of its version number. This was used so that similar clients could be treated differently based on their install kit (useful for beta programs). However, now that brand ID is used in the software catalog request again, it will be much simpler just to create a "beta" brand ID.

F. Pointcast Connections

Introduction

When PointCast was first launched, it delivered the same convenience, ease-of-use and consistency that people had come to expect from traditional media. The product was designed to be clearly differentiated from the chaotic and disorganized Web by delivering information in an effortless and personalizeable fashion. However, is so doing, there was a conscious sacrifice of many of the more positive and amazing aspects of Internet: namely, the creativity, collaboration and innovation that the open nature of the Web has thus far inspired. The PointCast Connections channel is an attempt to bring that same spirit of openness to the current version of PointCast by providing a place for small and independent "Connections Publishers" to explore and develop the Internet broadcast medium.

The Connections channel will allow viewers to directly subscribe to and update Connections Publisher content without PointCast intervention. Each publisher will provide a script (a pcc file) that will specify fetching and display instructions for any combination of HTML files and PointCast animations. The Connections channel will have both a ChannelViewer and SmartScreen component and PointCast advertising will run in both. The challenge of Connections will be to remain open while assuring advertisers of the value of advertising against unknown content. We hope to walk this delicate line by providing clear visual clues and boundaries distinguishing Connections content from advertising as well as from other "PointCast approved" information. The Connections channel is designed for use by individuals and organizations that either have too little content, too limited an audience or too small a budget to consider becoming a "registered" PointCast channel. The Connections channel will allow schools, clubs, non-profits, targeted newsletters and "vanity presses" to participate in Internet broadcasting without compromising the user experience of the rest of PointCast (Connections will be confined to one selectable channel). However, the addition of the Connections channel will add to our efforts to make PointCast truly personalizable as not everyone's interests or information needs will ever be met by our choice of channel partners and content.

Creating Connections sites

Overview

Connections publishers will have the choice of broadcasting HTML files, PointCast animations, or both. These options should meet a variety of needs from simply broadcasting existing web pages, to broadcasting pre-compiled animations as content, to broadcasting animations that contain dynamic information and content Oust like PointCast SmartScreens). The method for broadcasting this information will be the .pcc file outlined below. The authoring tools are specified in the Connections Authoring section of this document.

.pcc

The pcc file will serve as a script for Connections channels. This file will be created by the publisher and by way of a link from a "Subscribe to PointCast Connection" button, the way in which PointCast viewers will select a publisher. The file will be of the 15 following format: Bold items indicate default if none specified.

```
<PCN_CONNECTION
    Name = string
    URL = url
    [ID = string]
    [Date - str~
    [Frequency = n] -- where n = number of hours between updates
                                                   default: 24
    [Description = string]
    [InfoURL = urfl
    [Authenticate = Yes I No)
    [CharSet = string] -- "ISO-8859.1" is the default
>
<PCN_WEBITEM
    URL = url
    [Title = string]            -- optionalfor type=HTML, if excluded the
                                   html <TITLE> tag is used.
    [Type = Animation | HTML]
    [Align = Left| Center| Right]
    [Stretch = Fit| No]¹
    [Background = SystemDefault | Animation]¹
    [Show = Channel | SmartScreen | "Channel, SmartScreen" | No]
    [Fetch = Yes | No]
    [Repeat = repeat value]      ¹ values:   -1: for infinite repeat
                                 (0 or 1): for show once
                                 2+: for actual repeat count
    [Authenticate = Yes | No]
    [Height = pixels]¹, ²
    [Width = pixels]¹, ²
    [CharSet = string] -- "ISO-8859-1" is the default
>
animation script or Raw HTML - if URL not specified
</PCN_WEBITEM>
. . .
</PCN_CONNECTION>
```

The Connections directory will accept pcc files and strip out the PCN_WEBITEM sections to store in the directory. After retrieving the pcc file from the directory, the PointCast client will redirect itself to the appropriate URL. The same redirection may be used on publisher sites. The following is the format:

```
<PCN_CONNECTION
    Name=string
    URL=url
    ID=string
```

[Frequency=n]—where n number of hours between updates
[Description=string]
[InfoURL=url]
[Authenticate=Yes/51 No]
[CharSet=string]—"ISO-8859-1" is the default
</PCN_CONNECTION>

Following is a more detailed explanation of the tags:

PCN_CONNECTION

Only one Connection tag will exist per script and it is used to specify general administrative information about the channel. The frequency for each Connection applies to every HTML or animation file associated with that connection.

Name—Used as the display name in the Channel Viewer, SmartScreen and personalize.

URL—Points to the URL where the pcc file can be found. By default, it is the URL that the file was originally fetched from. This field is mostly useful if a publisher wishes to move the location of the file.

ID—A PointCast provided Connection ID which is associated with the Connection URL at the Reflector site. This only applies to Reflector Connections.

Frequency—Specifies how frequently to update the pcc file and all of the PCN_WEBITEMs contained within it. If no value is given, a conditional get will be done on the file once every 24 hours.

Description—A brief description of the contents or service the connection is providing. This description will be used to describe the connection in the Connections directory. The description is also used by the Personalize Connections tab to display the description when the Connection is selected in the Selected Connections list box.

InfoURL—Specifies the URL where an html file containing information about the connection is located. This URL is currently only used by the directory. The Connection Properties window should also provide a button to link the user's browser to this URL.

Authenticate—Specifies if any article or animation in the Connection requires user authentication to retrieve any published information. If this attribute value is yes, the user will be prompted to store a usemame and password for the tab. If an invalid usemame or password (or none) is provided, the Connection fetch will be skipped for only those articles and animations which require authentication.

Charset—Specifies the ISO character set used for the values of the Name and Description attributes. "ISO-8859-1" is the default, if not specified.

PCN_WEBITEM

The PCN_WEBITEM tag is optional and there can be more than one specified in a .pcc file. The URL property specifies the location of a HTML or animation file. In the future, the animation script or HTML itself can be written out within the PCN-WEBITEM tag.

URL—Points to the URL where the SmartScreen animation file can be found.

Title—Specifies the title to use in the ITEM selector for the connection. The title may be excluded for HTML items. If the title is excluded, the HTML <TITLE> tag is used.

Type—Specifies the type of item pointed to by the URL. Animation and HTML files are currently supported.

Align—Specifies the alignment of the animation in the channel viewer.

Stretch—Indicates if the animation should stretch to fit if displayed in the Smart Screen or Channel.

Background—Specifies which background color to use when displaying the animation (the current operating system default (SystemDefault) background color or the Animation background color).

Show—Specifies where to display the animation: in the Channel, SmartScreen, both ("Channel,SmartScreen') or not at all (No). No is used when the animation is referenced by another article or animation and is not displayed in the Connection article list. This should only be used with Fetch=True, since the idea is to allow the download of content to LCM so that links are local, but not necessarily displayed in the Connection List in the Channel Viewer.

Fetch—Specifies whether or not LCM should make a local copy of the animation. Yes=fetch local copy, No=don't fetch local copy.

Repeat—Specifies how many times to repeat the animation in a loop. −1 means infinite, 0 or 1 means show once, and 2 or greater is the repeat count.

Authenticate—Specifies if the animation requires user authentication to be retrieved. If this attribute value is Yes and a failure has occurred during any fetch requiring authentication (for this connection) the fetch for this animation will be skipped. Otherwise, LCM will fetch the animation with the username and password specified.

Height—Specifies the height to resize the animation to in the channel viewer and smart screen (only if Stretch=False). This will be implemented in a future version of the software.

Width—Specifies the width to resize the animation to in the channel viewer and smart screen (only if Stretch=False). This will be implemented in a future version of the software.

Charset—Specifies the ISO character set used for the value of the Title attribute. "ISO-8859-1" is the default, if not specified.

Animations

The animations will be created using the PointCast Studio application which is scheduled for a concurrent launch with PointCast 2.0.

Connections Authoring

OFFLINE TOOLS

The off-line development environment (called "Connection Creator" until someone comes up with a better name is available with the standard 16- and 32-bit client kits—refer to the Connections Wizard Specification for details on this tool. It is a separate executable that can read and write pcc files for creation or editing. It is only available for Windows 32-bit platforms initially. It will support Macintosh and other platforms through a Java implementation in the future. The Connection Creator allows authors to specify:

All connection attributes

Articles and animations to include in their connection along with all associated attributes.

Connection name

Registration information within the connection file

The Connection Creator can be launched from the Personalize dialog (Connections Tab) within only 32-bit 2.0 clients.

The Connection Creator application has a help system which provides:

Page(s) describing how to add the connection to the author's web site

Page(s) describing how to add the connection to the Connections Directory

Page(s) describing how to specify articles and animations using the tool

User Experience

Subscribing

Subscribing to Connection sites will be done in one of several ways:

1. Entering a URL by hand in the Connection personalize page
2. Clicking on a listing in the Connections registry on our web site
3. Clicking on a "Subscriber to PointCast Connection" button at the website of a Connection publisher, as in the example below.

Figure 18:
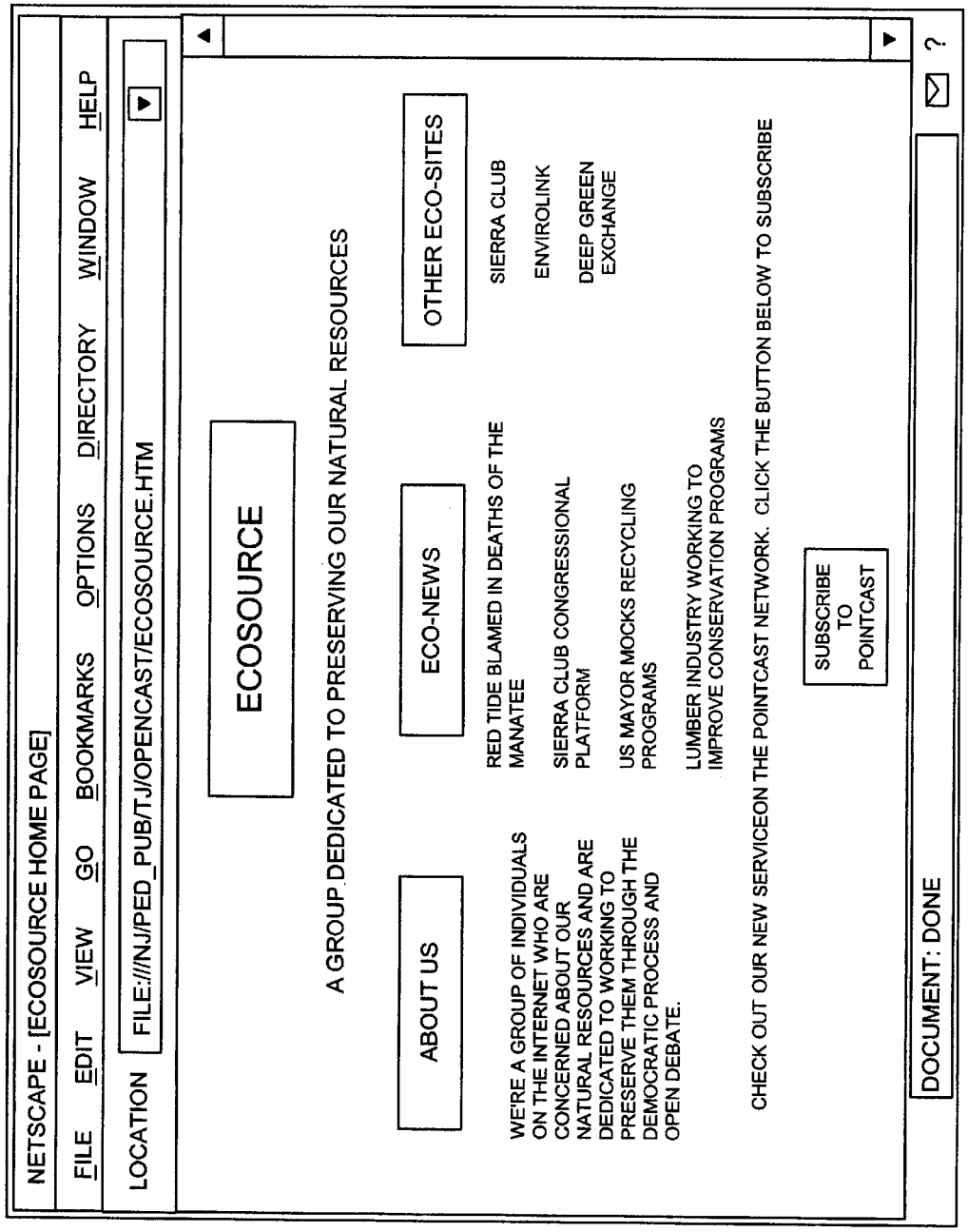
FIG. 18 shows an exemplary screenshot of a website of an ECOSOURCE connections publisher offering a "Subscribe to PointCast" connection button.

FIG. 18 shows an exemplary screenshot of a website of an ECOSOURCE connections publisher offering a "Subscribe to PointCast" connection button.

When a users chooses to subscribe to a Connections channel by clicking "Get PointCast Connection" button, they will receive a pcc file from the publisher's web site. The user's browser will then launch a helper application associated with the file which registers the connection with the Connections Channel. This will only work if the PointCast application registers those file types with Windows when the application is upgraded or installed. If PointCast has not been installed, the default action for the user will occur: the browser will prompt the user to save to file or open with an unknown application.

The helper application which accepts the pcc file will determine whether or not the Connections channel has been activated. If it has not, the channel will be added automatically (without user intervention) if the user is subscribed to less than the maximum number of channels. The new connections channel will be configured with default settings so the user does not have to enter any information after selecting the "Get PointCast Connection" button.

After the pcc file has been downloaded and successfully added to the Connections Channel, the PointCast or helper application will display a dialog box which states: "ccccc PointCast Connection has been successfully created". Where ccccc is the name of the connection. The user will also be warned (within the pop up dialog) that "The content of this Connection does not necessarily reflect the opinions of PointCast, its employees, investors or sponsors. PointCast makes no warranties, implied or otherwise, as to the validity or legality of the content." The dialog will have two buttons: "Install Anyway" and "Remove Connection". This ensures the customer understand the content is not PointCast sponsored.

If the client attempts to subscribe to a connection and has not enabled the Connections Channel and has the maximum number of optional channels selected, they will be prompted with a PCN Configuration Wizard which first displays the currently selected channels and prompts the user to select one to remove and click the "Next" button to remove that channel from the Selected Channel list. The user may choose "Cancel" to exit this process and not install the Connections channel or the connection they downloaded. If they cancel, the connection (.pcc file) will be deleted from their hard disk. The user will receive a warning that the cancel will abort the Connection installation and given the option to Exit Installation or Try again. Try again will take them back to the "Select which channel to remove" frame in the Wizard. After the user clicks "Next", the Wizard will display a frame which indicates: The ccccc connection will now be installed. Click Finish to complete the installation or Cancel to exit. We will also provide a "Get PointCast" icon and URL for publishers to add to their web sites. A document must be written to specify how the icon may be used on the publisher's web site. We need to also be careful we indicate that PointCast 2 is required for Connections.

Personalizing

The Personalize properties page will provide the ability to personalize at either the Connections Channel level or the Connection level. The Channel personalization allows the user to:

Remove a connection

Add connections (by typing in a URL)

Order the connections within the Channel Viewer

Launch the Connection Wizard to publish new connections (for Windows 32-bit OS's only)

Figure 19:
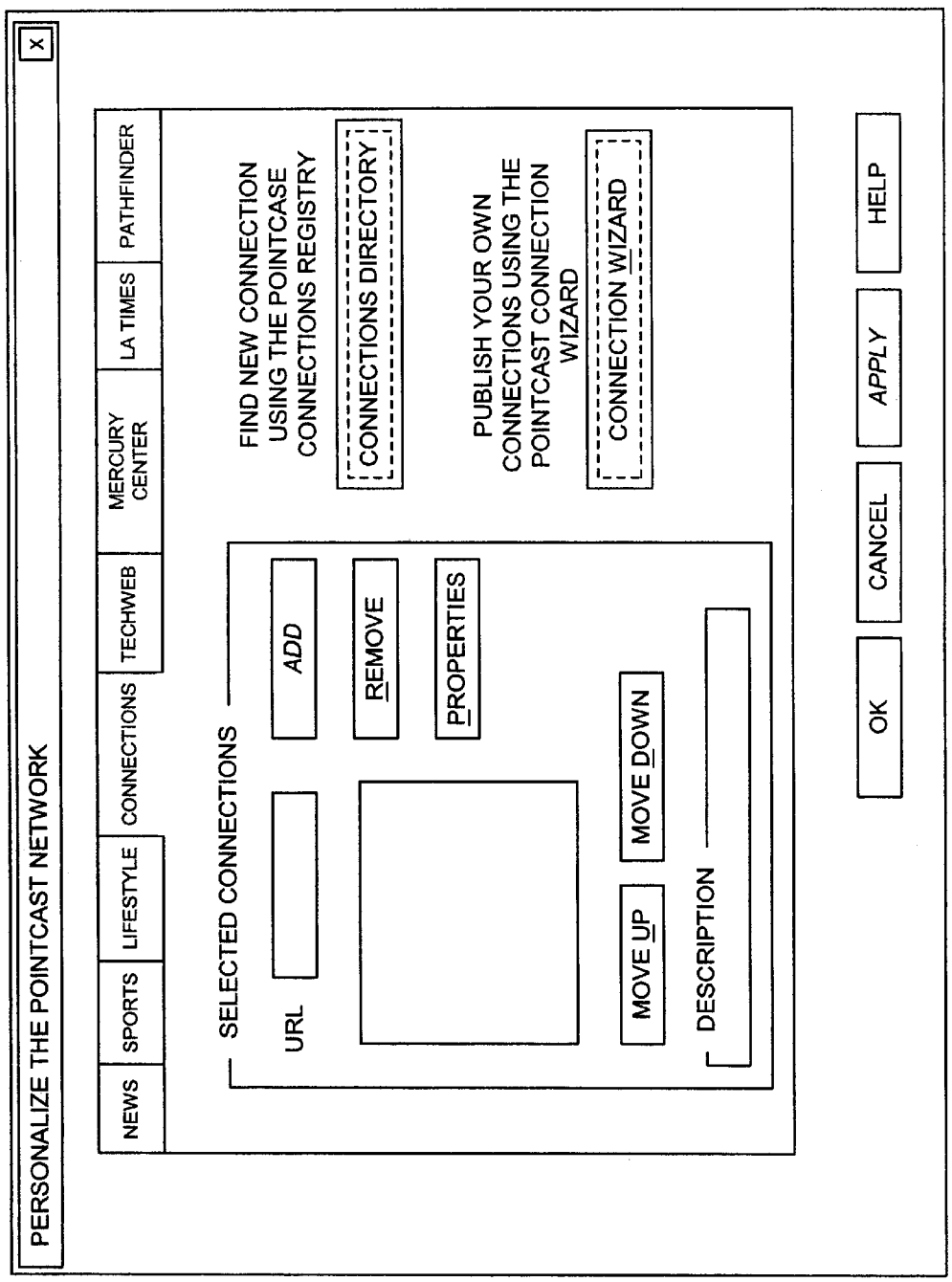
FIG. 19 shows an exemplary graphical user interface or screen that may be used to personalize the PointCast network.

Display the Connection Registry to subscribe to new connections via a web browser FIG. 19 shows an exemplary graphical user interface or screen that may be used to personalize the PointCast network.

The Connection properties allows the user to:

Disable the connection Smart Screen display

Specify a User Name and password for automatic login to HTTP username/password challenges (username and password will be stored on the client in encoded format).

Change the "Next Update" time for a connection.

Figure 20:
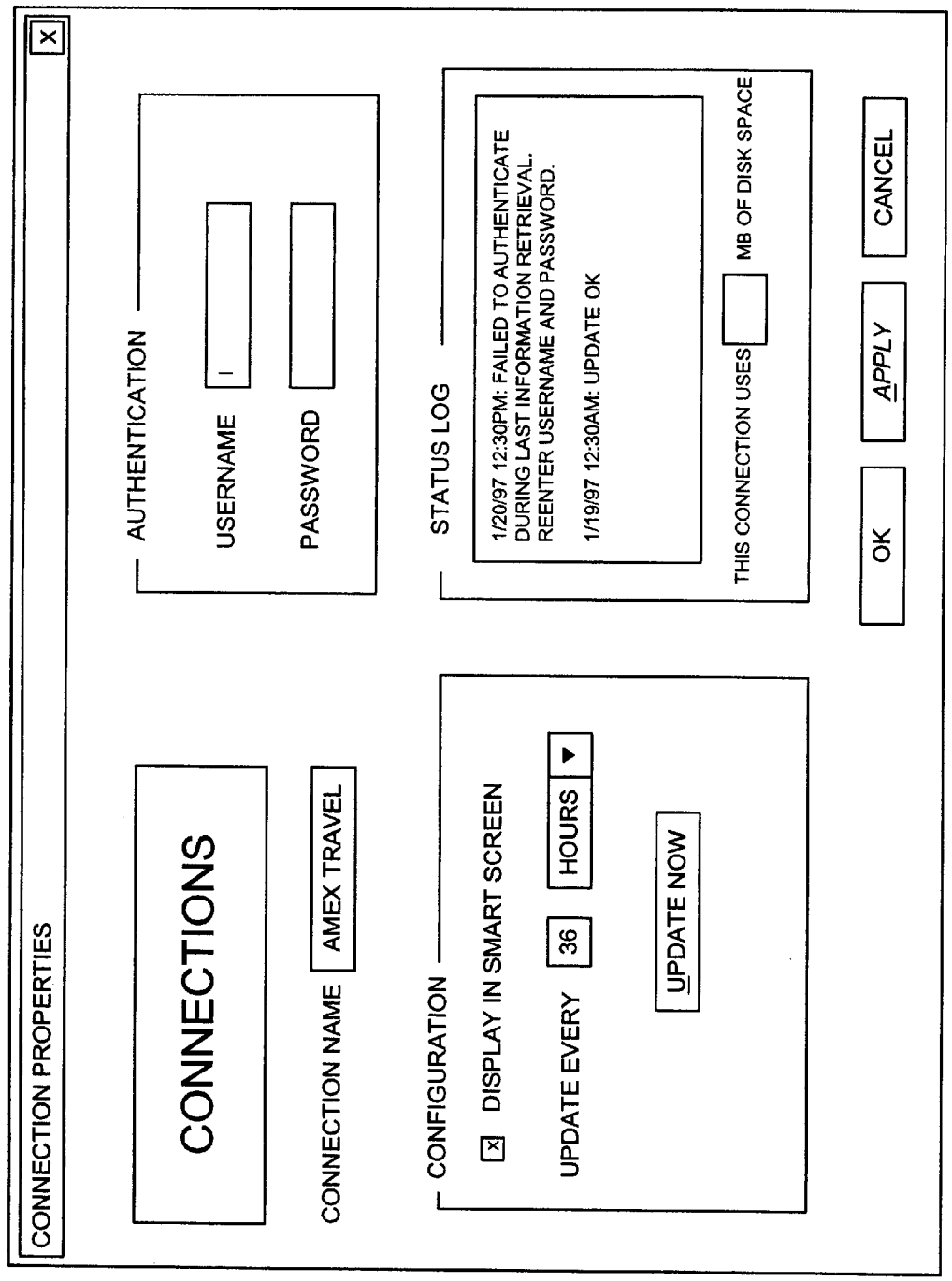
FIG. 20 shows an exemplary graphical user interface or screen that may be used to modify connection properties.

FIG. 20 shows an exemplary graphical user interface or screen that may be used to modify connection properties.

Connection Authentication

By allowing authentication for a connection at the article or animation level, publisher can provide free "teaser" information to subscribers and require a username and password for premium information. If the user does not have an account, the pages which require authentication (and therefore cannot be retrieved without a valid account) will point to the Connections "InfoURL". This allows the publisher to provide a URL for subscribing and/or getting more information on their information service.

The Fetch engine will be able to deal with basic HTTP username and password challenges when attempting to fetch information specified by a PointCast Connection. All username password pairs for each connection will be stored encrypted on the client. The username and password will be sent to URL's which require authentication as is specified in the connection's pcc file. If any retrieval fails because of a failure to properly authenticate, all future retrievals for that connection which require authentication will be skipped.

If a retrieval fails because of failure to authenticate, the article or animation will still be listed in the Channel Viewer if [Show—CV or Both] and a Title is provided and an InfoURL is provided. The article or animation will be listed with the specified Title and the listing will link to the InfoURL (since the actual article specified requires authentication and is not accessible).

Channel Viewer

The Channel Viewer component of Connections will be similar to the standard article channel. There will be one tab per subscribed Connection that will list the HTML files that have been fetched (the headlines will come from the <TITLE> tag of each article if not specified with each article).

Initial SmartScreens

The first few seconds of every Connections smart screen will display a content disclaimer hich will be appropriate to differentiate between the respective roles of the actual provider and content broadcaster. That disclaimer will animate off the view area of the smart screen at the same time all "PointCast" names and logos animate off the screen. At no point will both the connections content and the PointCast name or logo appear on the smart screen simultaneously.

Figure 21:
FIG. 21 shows an exemplary SmartScreen that may be displayed.

The two types of content to appear in the Connections SmartScreens will be thumbnails of HTML pages (if no animations were specified in the .pcc):

FIG. 21 shows an exemplary SmartScreen that may be displayed.

Or animations (if any are specified in the .pcc script):

FIG. 22 shows another example of a SmartScreen that may be displayed.

If the client is not behind an I-Server (or O.dc does not specify [Connections] properties):

After a successful admin fetch, the client will ping (using ICMP ping) [we may want to attempt to open a socket, instead—this needs further discussion] www.pcnrflector.com.

```
If the ping (ping1) is successful,
      The client pings www.pcnconnect.com
      If that ping (ping2) is successful,
            Client Mode = All connections
else
            Client Mode = Restricted connections
else
            Client Mode = No Connections
```

At client startup, the client always checks for the current state (not necessarily perform the ping, but check the state as indicated by the pa.cfg or pcn.cfg or pcn.ini file) before enabling the Connections channel.

If the client is behind an I-Server which specifies a [Connections Model property:

The client retrieves the Connections Catalog by examining the Catalog property of the [Connections] section in the 0.dc file. The following are the possible states in which the client transition:

A, B, C, D—represent the state for the client; state letters in the matrix reflect the new state after receiving a 0.dc with Catalog and Mode properties specified as indicated in each column heading.

```
Catalog     !=      NULL  Catalog         ==      NULL
Cat + All   Cat + Ref   Cat + None    Cat + All    Cat + Ref
Cat + None
A: Connections Disabled    B-1,7    C-1, 7    D-1, 7    B-1   C-1
   A-
B: Open Connections  B - MD5(4, 5, 7, 8)   C - 2, MD5(4, 5, 7, 8)
   D - 2, 3, 7    B-5, 8      C-2, 5, 8       A-2, 3, 9
C: Reflector Connections    B - MD5(4, 5, 7, 8)   C - MD5(4, 5, 7, 8)
   D - 2, 3, 7    B-5, 8      C-5, 8      A-2, 3, 9
D: 1-Server specified Connections   B - MD5(4, 5, 7, 8)
C - MD5(4, 5, 7, 8)   D - MD5(4, 5, 7, 8)    B - 5, 8    C - 5, 8
A - 2, 3, 9
```

Legend:

MD5=Conditional→if MD5 is different for new catalog, then ( . . . )

1=Enable Connections Channel

2=No more fetches on Open Connections; allow Open Connections content to expire

3=No more fetches on Reflector Connections; allow Reflector Connections content to expire 4=Merge old Connections catalog with new Connections catalog by performing "OR" on catalogs 5=Remove optional channels listed on previous Connections catalog which are not selected and not in new catalog
6=No more fetches on all connections; allow all connections content to expire
7=Turn on mandatory and recommended connections and list optional connections in the personalize dialog
8=Reset mandatory connections from the previous catalog to recommended
9=Remove Connections channel from Channel Viewer
0.dc Connections properties
[Connections]
Catalog=URLlcatalog_pame.pcc
Overwrite=True|False
Mode=CatalogOnly|Catalog+Reflector|Catalog+All
FastestUpdateFreq=nnnn (where nnnn is the minimum number of hours between update requests)–default=6
SlowestUpdateFreq=mmmm (where mmmm is the most number of hours between update requests)–default=768
Notes: When mode is CatalogOnly and no Catalog is supplied, this behaves the same as disabling Connections.
Property descriptions
Catalog—The URL the points to the catalog (.pcc) file on the I-Server. The catalog file has the same properties as a publisher pcc file except it contains multiple PCN_CONNECTION sections and no PCN_WEBITEM sections.
Overwrite—Specifies whether the client should completely overwrite their existing pa.dat with the content of the new catalog. This is basically a very ungraceful configuration. This should only be used in extreme circumstances because all existing user preferences for Connections will be destroyed. For now, Overwrite=TRUE can only be used if the Mode=CatalogOnly. By default, this property shall be False.
Mode—Specifies the mode in which all clients talking to this I-Server should operate. CatalogOnly indicates the client can only fetch and activate Connections which are specified in the Catalog—and therefore listed in their Connections Personalization dialog. Catalog+Reflector indicates the client can fetch and subscribe to Connections listed in the catalog and Connections which have been validated through the PointCast Reflector. The client software determines whether or not to validate a Reflector approved connection based on the presence of an ID tag in the PCN_CONNECTION section of the .pcc file.
FastestUpdateFreq and SlowestUpdateFreq—already specified above. This allows the I-Server manager to override the defaults provided with the initial client installation.
Connections Catalog properties
The connections catalog will consist of PCN-CONNECTION tags and attributes as is specified for the pcc file. It will also add an optional state attribute to each connection with the following syntax:

State=Mandatory I Recommended I Optional

Figure 23:
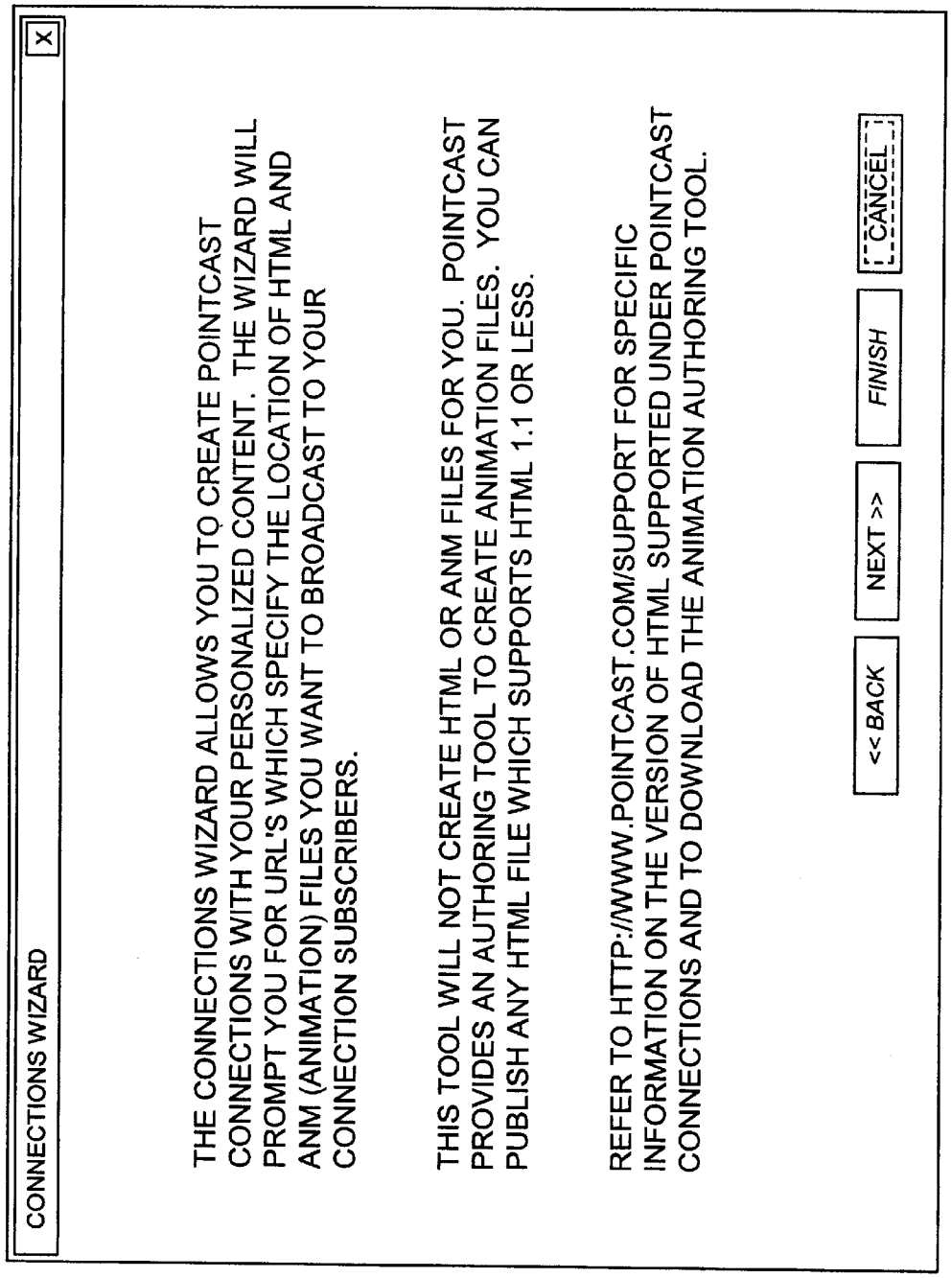
FIG. 23 shows an exemplary graphical user interface or screen that a Connection Wizard may use to initiate walking a user through identifying components of a connection.
Figure 24:
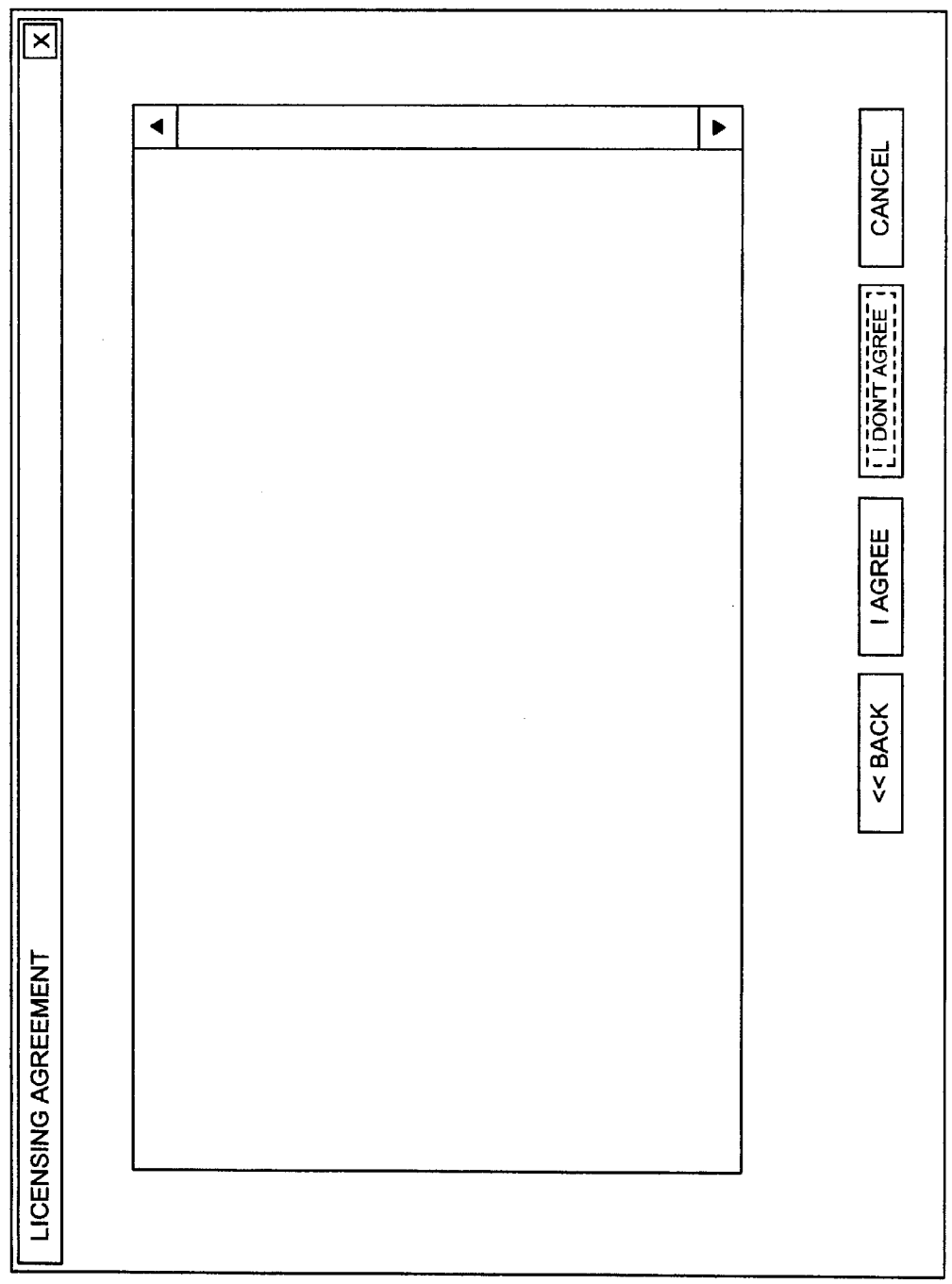
FIG. 24 shows an exemplary graphical user interface or screen that may be used to have a user accept or reject a license agreement for each connection.
Figure 25:
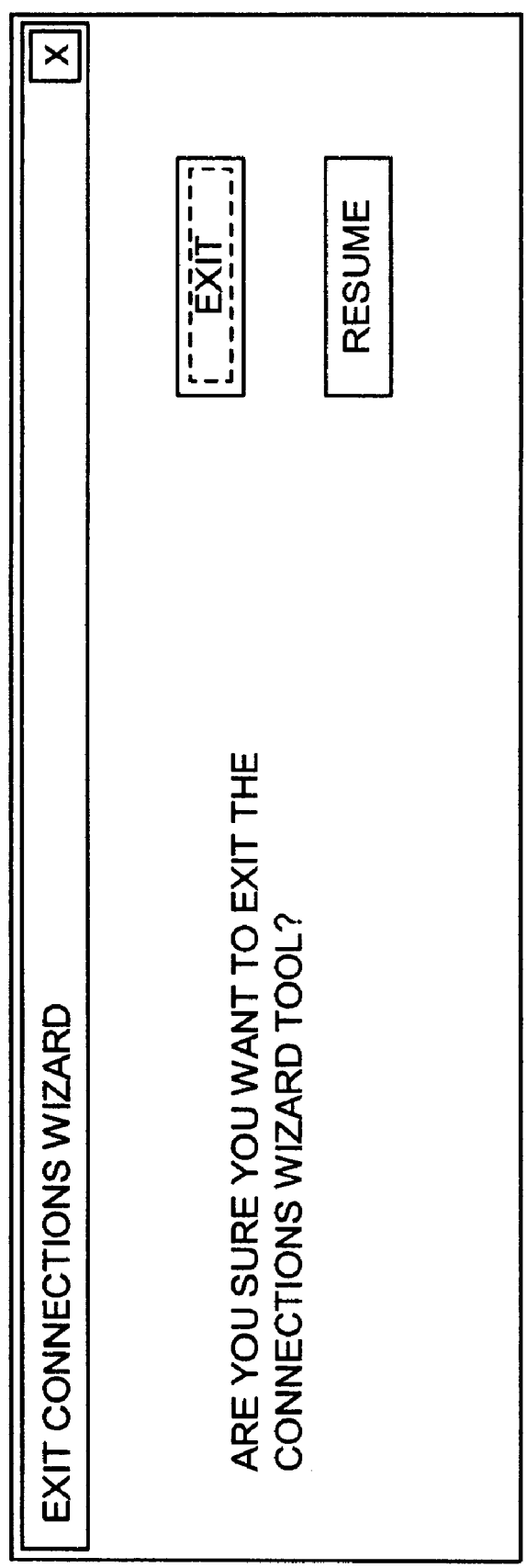
FIG. 25 shows an exemplary graphical user interface or screen that may be presented by a Connection Wizard when a user attempts to exit the Connection Wizard or cancel out of the license agreement.
Figure 26:
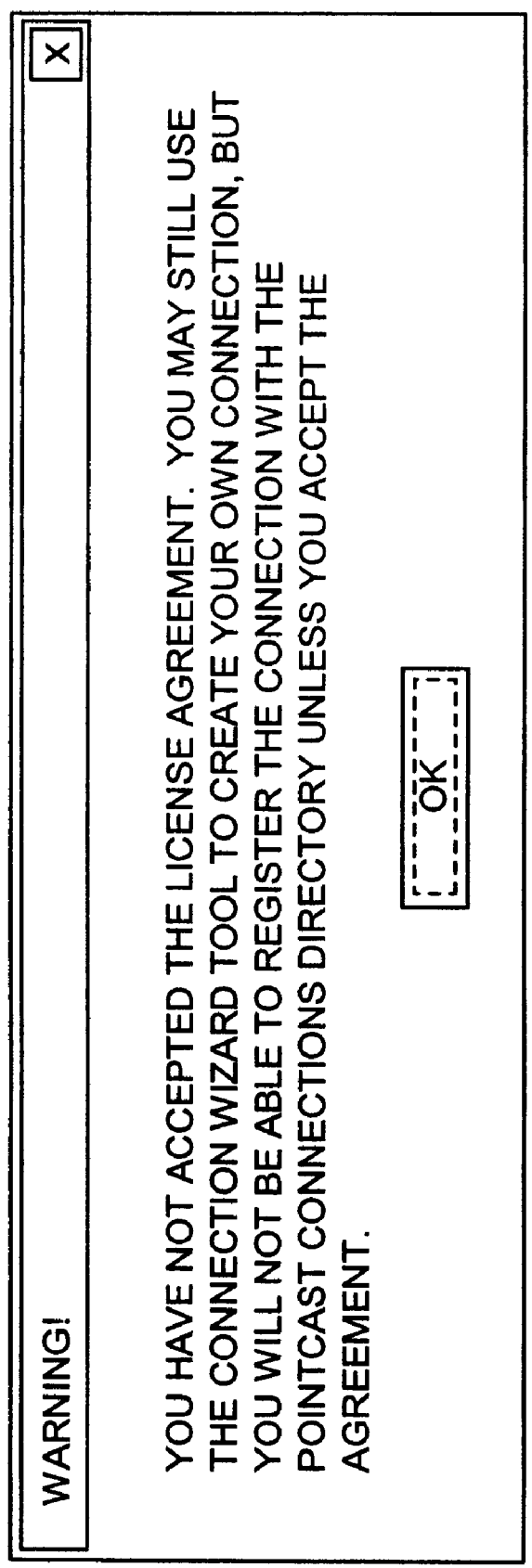
FIG. 26 shows an exemplary dialog box that may be presented by a Connection Wizard when a user selects "I Don't Agree" from the license agreement interface of FIG. 24.

This field is used by the I-Server administrator to force the state of each connection for every user behind the I-Server. Mandatory connections cannot be disabled by the user. Recommended connections appear initially as enabled, but may be disabled by the user. Optional connections are listed in the Connections personalization connections list, but are not enabled.
G. PointCast Connections Wizard
Introduction
In order to facilitate the use of the PointCast Connection channel, PointCast will provide authoring tools to enable non-technical users to create Connections sites. Ideally, the tool can operate in a number of modes which reflect the experience of the user. Initially, we will provide a "wizard" which walks the author through the connection creation steps. In the future, another specification may be written to enable faster editing for more advanced users.
This tool will be provided as part of the PointCast 2.x client kit and will be launched from the Personalize Connections dialog.
Using the Connections Wizard, users will be able to create a personal profile of web sites they are interested in retrieving along with their PointCast aggregate content.
Design Guidelines
The wizard shall conform to the Wizard User Interface style guide (attachment 2) to this document. The purpose of the style guide is to ensure consistency across wizards in the PointCast client. At a minimum the icon, size of wizard pages, key positions, and mnemonics will be specified in the style guide. That document supersedes any UI layout unless an exception is specifically noted in this document.
The wizard shall also be created/coded in such a way to facilitate localization. This includes but is not limited to:
Double-byte enabled
All strings presented to the user are coded as separate resources
Wizard Pages
The PointCast 2.0 client will provide two ways to create a PointCast Connection. The first will be a Connections Wizard which walks the user through the steps in identifying each component of the Connection. The second (which will not be detailed here) method to create or edit a connection is by using a text editor and manually changing the .ppa file contents. All Connections Wizard screens will respond to the F1 help key. If this button is clicked, the help system will be opened.
FIG. 23 shows an exemplary graphical user interface or screen that a Connection Wizard may use to initiate walking a user through identifying components of a connection.
The following dialog specifies the licensing agreement the publisher agrees to for every Connection they create using the Wizard. The licensing agreement should also cover .ppa files whether they are created using the Wizard, by hand, or any other tool. The text for the license agreement shall be validated using a checksum to determine if the license agreement has been corrupted. If the license agreement was modified/corrupted, the Wizard will not present a license agreement dialog and proceed as though the user selected "I Don't Agree". A valid license file should be version controlled into the client as part of the next Administrative Fetch.
The text is specified in Appendix A, License Agreement, of this document. The default selection for this page (Return button) is the "I Don't Agree" button.
FIG. 24 shows an exemplary graphical user interface or screen that may be used to have a user accept or reject a license agreement for each connection.
The "Cancel" button has the same effect as does "Cancel" in any screen in the wizard: The user is prompted with the following dialog:
FIG. 25 shows an exemplary graphical user interface or screen that may be presented by a Connection Wizard when a user attempts to exit the Connection Wizard or cancel out of the license agreement.
If the user clicks "I Don't Agree" they can continue authoring using the wizard, but will not be able to register the Connection file with the directory. A dialog box will appear warning the user that they cannot register with the Connections Directory unless the license agreement is agreed to:

FIG. 26 shows an exemplary dialog box that may be presented by a Connection Wizard when a user selects "I Don't Agree" from the license agreement interface of FIG. 24.

Figure 27:
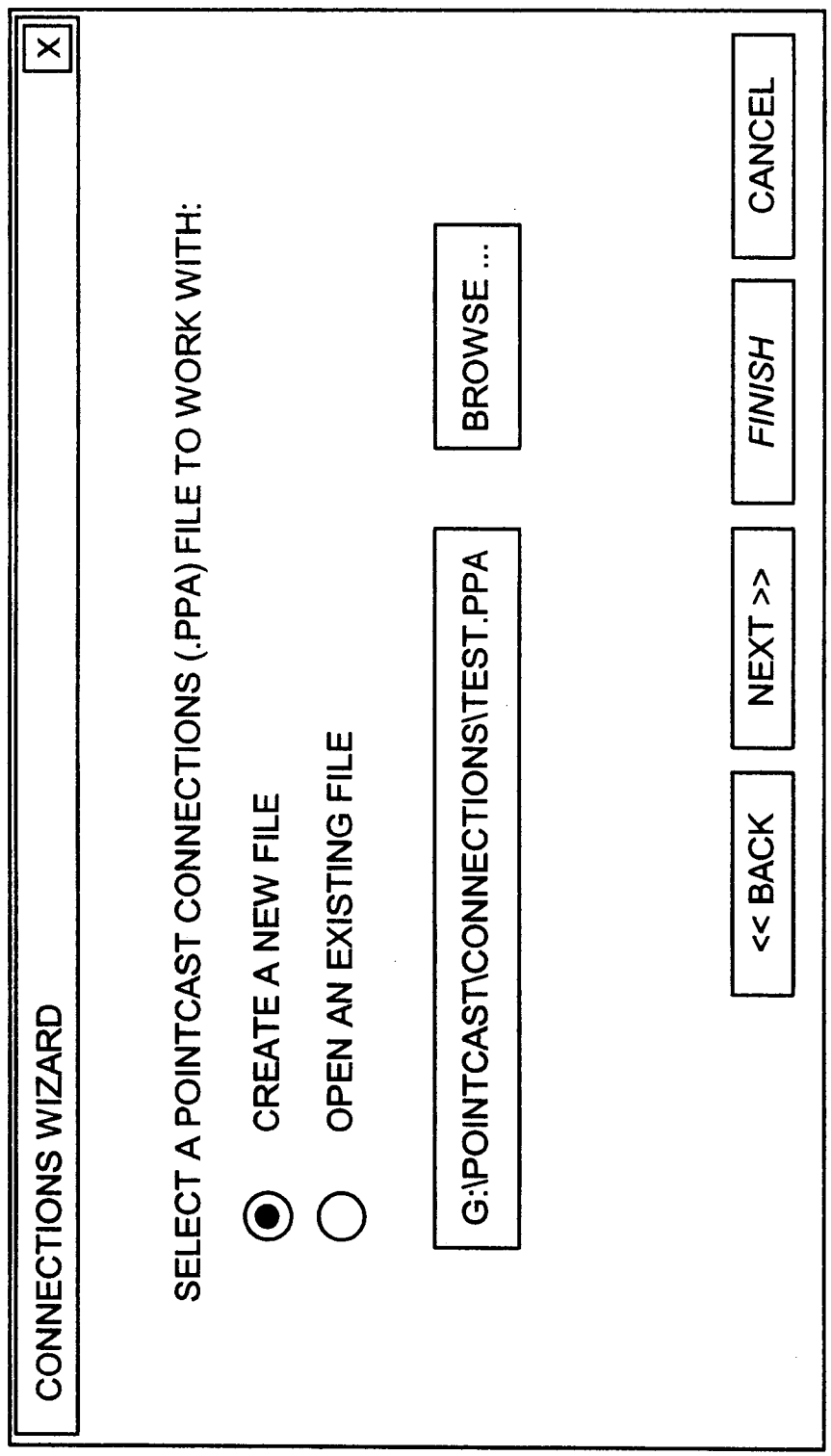
FIG. 27 shows an exemplary graphical user interface or screen that may be presented by a Connection Wizard after a publisher user has agreed to the license agreement to allow the publisher to edit or create a file.

After agreeing to the license agreement, the publisher is given the option of editing an existing file or creating a new one:

FIG. 27 shows an exemplary graphical user interface or screen that may be presented by a Connection Wizard after a publisher user has agreed to the license agreement to allow the publisher to edit or create a file.

If an author is editing an existing file or just working on a new file, they will have entries in the list box which specify all animations or articles for the connection.

Figure 28:
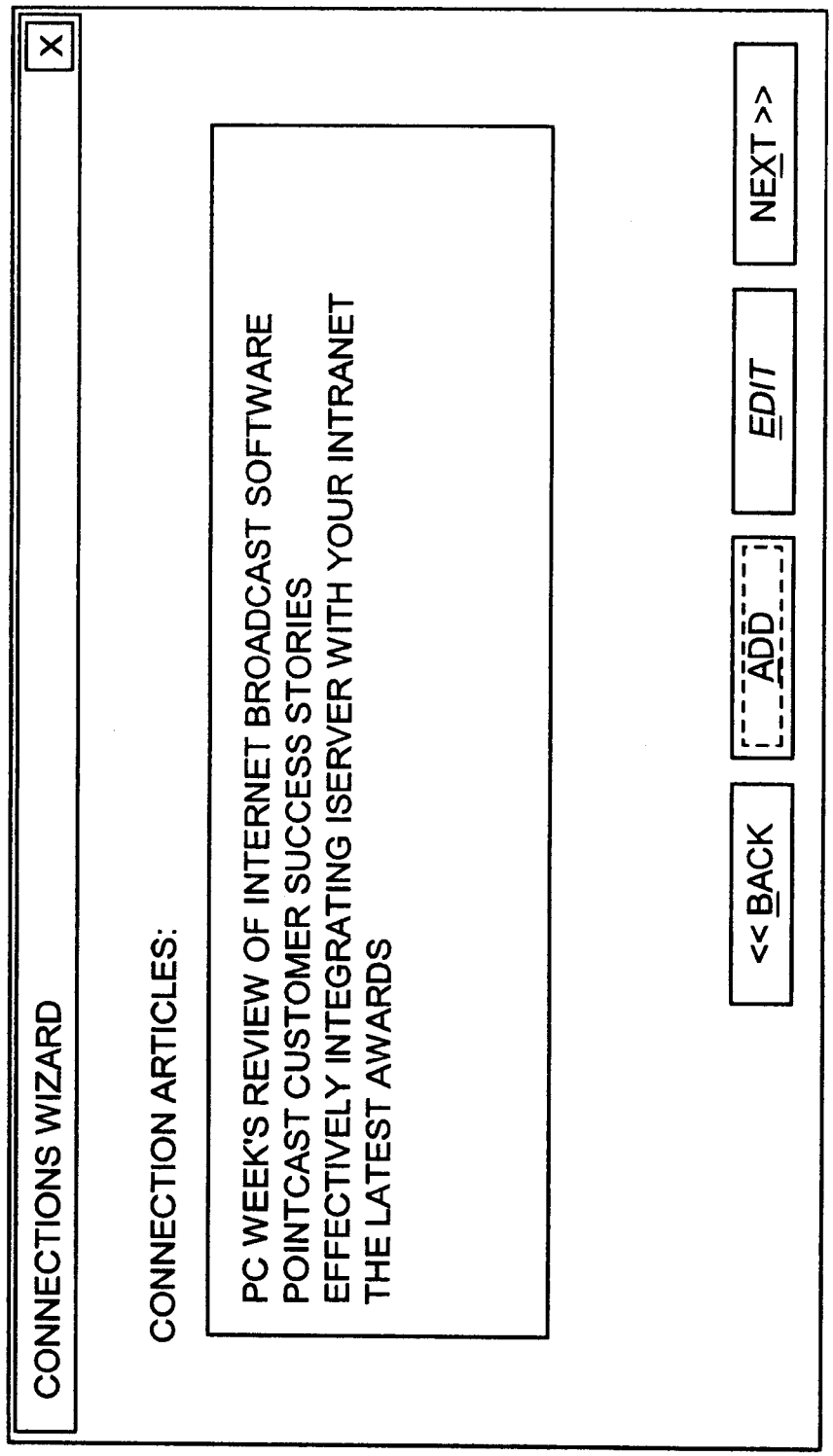
FIG. 28 shows an exemplary graphical user interface or screen containing a list of connection articles that may be presented by a Connection Wizard.

FIG. 28 shows an exemplary graphical user interface or screen containing a list of connection articles that may be presented by a Connection Wizard.

If the user clicks on an existing item in the list box the "Edit" button is made the default button and the "Move Up" and "Move Down" buttons appear. Double clicking on an article will open the Article Properties dialog.

Figure 29:
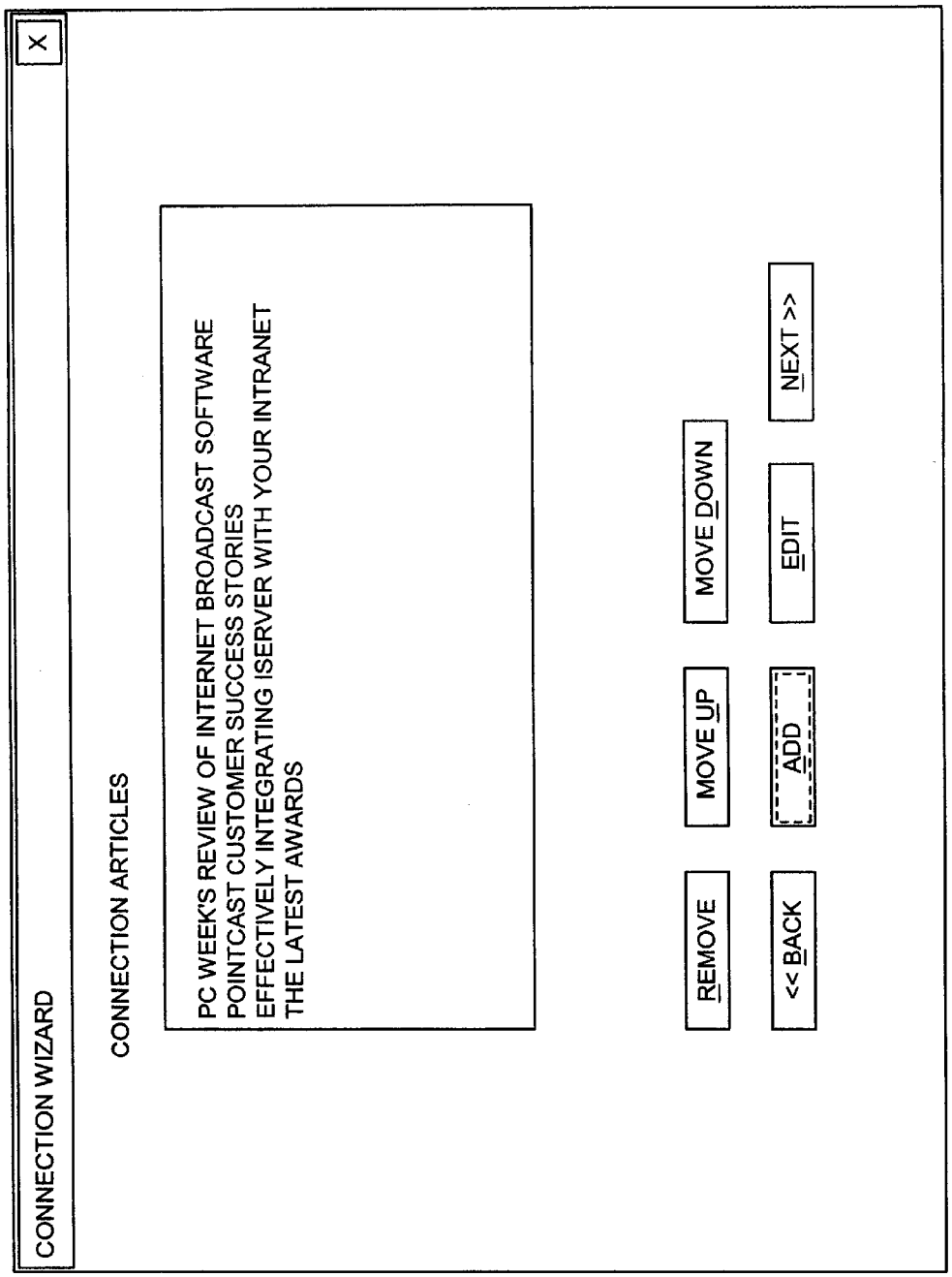
FIG. 29 shows an exemplary graphical user interface or screen presenting additional functionalities to remove an article or move up or down in the list when a connection article is selected from the list of FIG. 28.

FIG. 29 shows an exemplary graphical user interface or screen presenting additional functionalities to remove an article or move up or down in the list when a connection article is selected from the list of FIG. 28.

After clicking "Add" or "Edit" the author is presented with the item properties dialog to specify.

FIG. 30 shows an exemplary graphical user interface or screen for specifying article properties, in this case for an HTML type newsletter, which may be presented when an article is added or edited.

Each group in the properties dialog has context sensitive help such that the author can get help on "Stretch to Fit", "Auto Fetch", "Background Color", "Show Item in", and "Continuous Loop" by clicking on the right mouse button above the Group Box. The following default selections are provided for each group:

Article Type: HTML
Auto Fetch: Yes
Show Item in: Channel Viewer

The following properties are enabled if the Animation "Article Type" is selected (with the indicated defaults):

Background Color: Windows
Continuous Loop: No
Stretch to Fit: No
Align: Left

FIG. 31 shows an exemplary graphical user interface similar to that shown in FIG. 30 when the article type is animation.

The "Preview" button launches Internet Explorer, if available, (or the PointCast browser) with the URL specified. This allows the author to validate the URL path and content of the page they are adding to their Connection.

After clicking Continue, the author is returned to the Connection Article list dialog to either add new articles or animations, edit existing articles or animations, or finish the Connection creation process (by clicking "Next").

FIG. 32 shows an exemplary graphical user interface or screen that may be presented by a Connection Wizard to allow a user to specify information used to label and identify a connection on the Internet.

Figure 33:
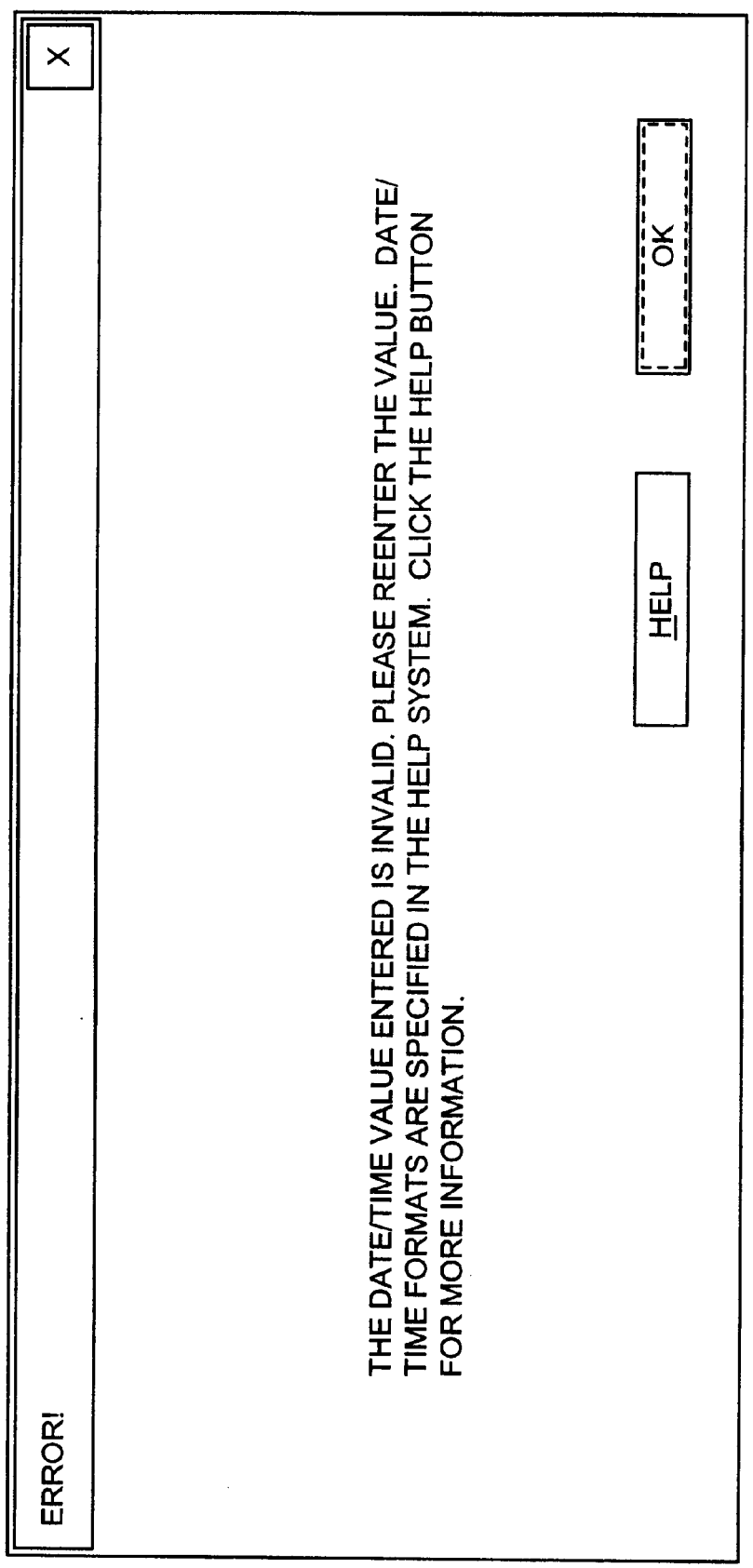
FIG. 33 shows an exemplary graphical user interface or screen that may be presented by a Connection Wizard if Date/Time data entered in through the interface of FIG. 32 is inappropriate.

The author can enter an expiration date/time as an absolute value or "+24 hours" to expire every day. This field must be checked by the Wizard before creating the expiration value in the .ppa file. If the value is incorrect, the user shall be notified by highlighting the Date/Time field (in red or simply highlighting it) and displaying the following dialog:

FIG. 33 shows an exemplary graphical user interface or screen that may be presented by a Connection Wizard if Date/Time data entered in through the interface of FIG. 32 is inappropriate.

The help button will link the user to the help page which specifies the accepted date/time values for the expiration property.

If the author agreed to the license agreement, they are then instructed on how to register their connection with the Connections Directory. Since the registration process will likely be controlled by the directory provider, this part of the authoring process will be excluded from the Wizard. The only reference will be provided in the following dialog box which is displayed after the user clicks "Finish".

Figure 34:
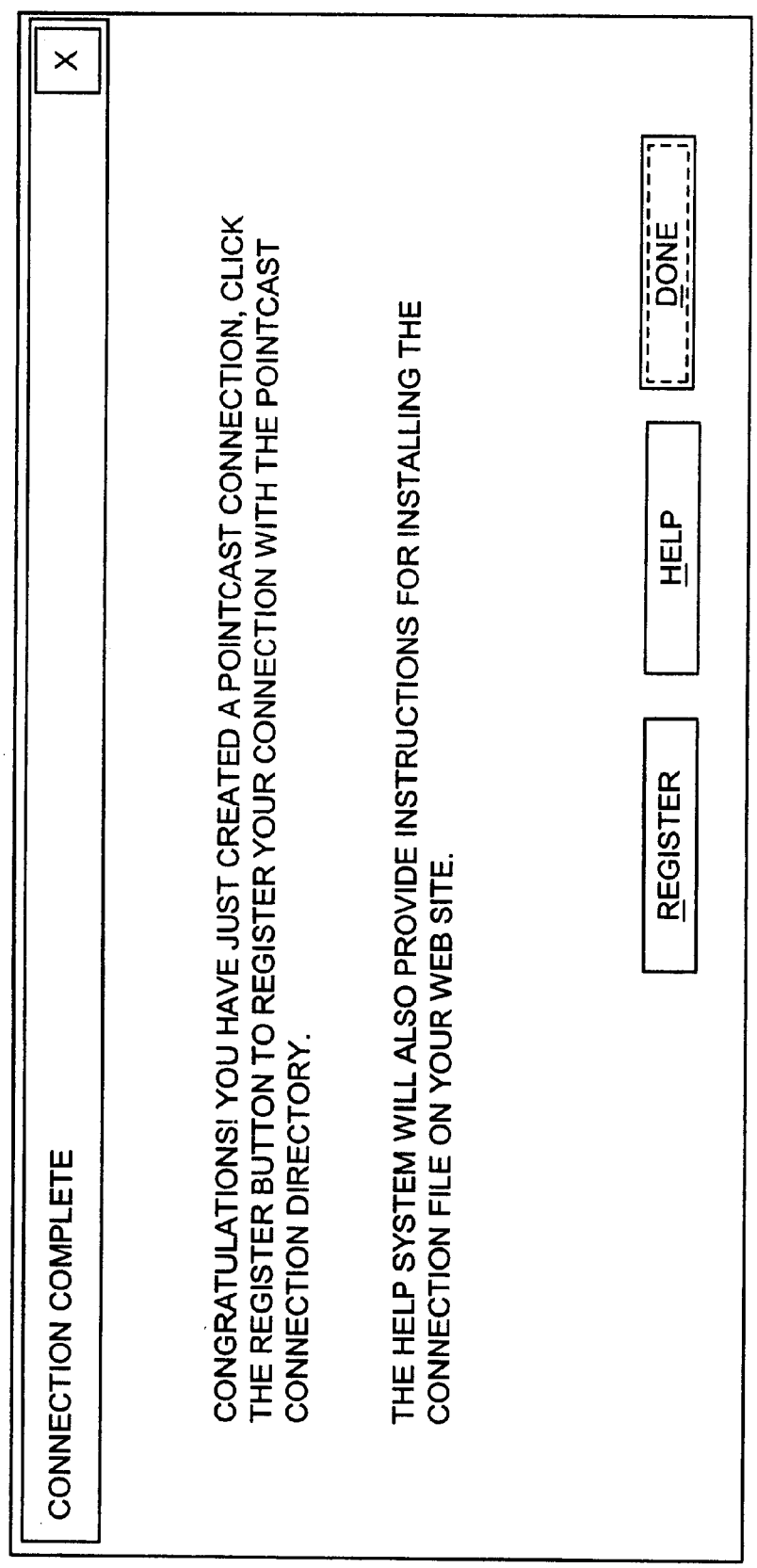
FIG. 34 shows an exemplary graphical user interface or dialog box indicating a connection has been created and providing an opportunity to register the connection.

FIG. 34 shows an exemplary graphical user interface or dialog box indicating a connection has been created and providing an opportunity to register the connection.

Register is the default button for this dialog. After clicking Register, the default browser will be launched with the URL for the registration site (configurable in the Ani file).

H. Connections Subscribing

Introduction

In order to facilitate the use of the PointCast Connection channel, PointCast will provide a simple user interface for subscribing to Internet- and I-Server-based Connections. This document specifies the user experience and software behavior during the process of finding and installing Point-Cast connections.

Finding a Connection

There are three methods in which a PointCast user can subscribe to connections:

1. Enter a URL in the Connections Channel Personalize screen. After the User begins to type (key press event in the text field) a URL, the "Add" button is enabled and any selection in the list box (list of Connections) is deselected. If the URL is entered by hand, after "Add" button is clicked, the client retrieves the ppa file and goes through the "Installing the Connection" process listed below. Behavior Issue: after this is done, is there a way to cancel from Personalize an have it back out the connection?

Figure 35:
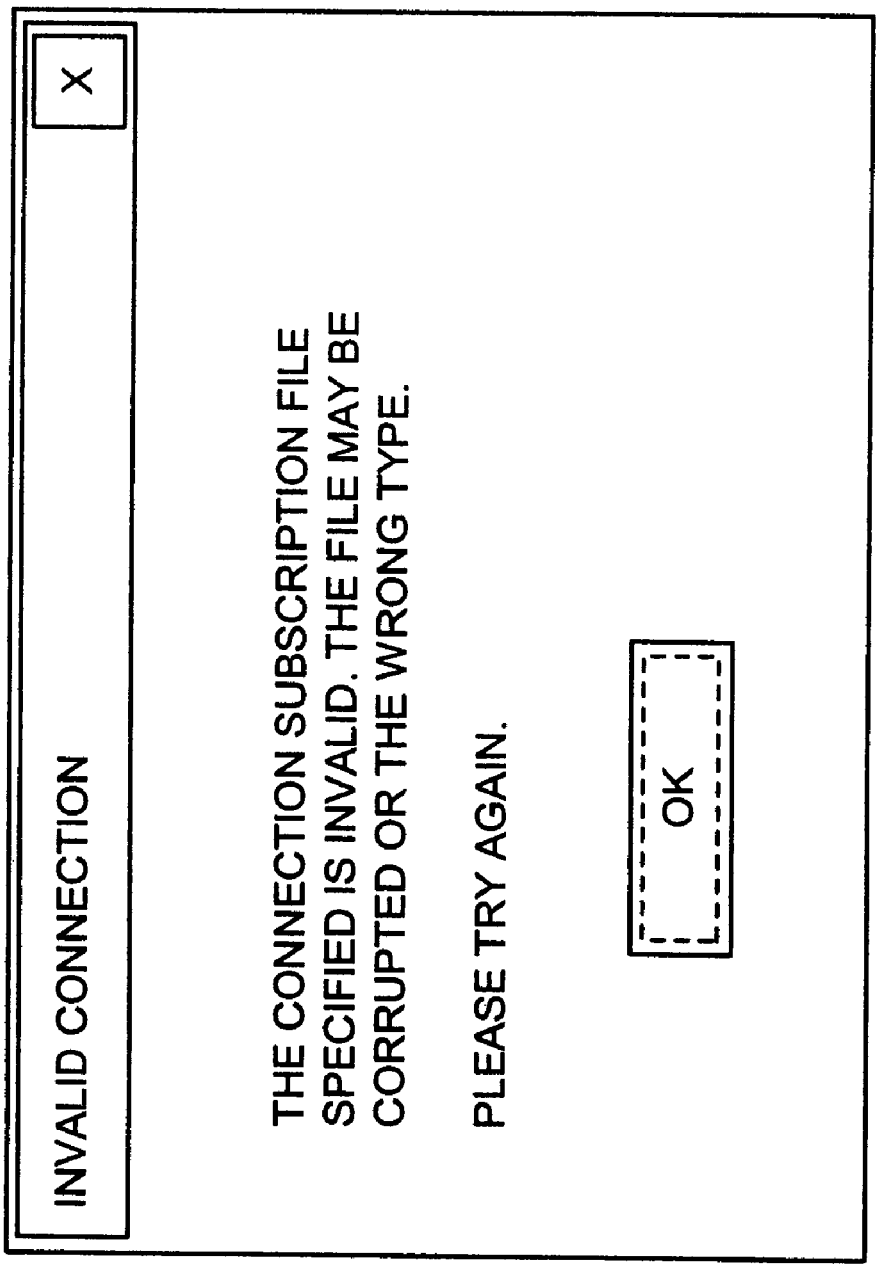
FIG. 35 shows an exemplary graphical user interface or dialog box that may be presented if an invalid URL is submitted.

If the URL is invalid (doesn't point to a valid .ppafile), the URL is highlighted in the text 4 box and the following error dialog is displayed:

FIG. 35 shows an exemplary graphical user interface or dialog box that may be presented if an invalid URL is submitted.

2. Display the Connections Registry and click on a.ppa URL. This will download the .ppa connection file to the user's PC. The ppa extension (file type) will be registered with the OS and the appropriate OS flag which automatically opens the file will be set (this occurs when the 2.0 client is installed on the user's PC. The ppa file is downloaded using HTTP. The ppa extension shall be associated with the Connections mini-app, which is responsible for verifying with the user to install the Connection and confirms the user knows this is not PointCast sponsored content (see "Installing the Connection" below). Under no circumstances will a connection be added to the PointCast client without user acknowledgement.

3. Browse the WWW and find a "Get PointCast Connection" button (to be specified by design group) and select it. This will download the .ppa file as in #2 above.

If any error occurs with the .ppa file in any of the above three scenarios, the "Invalid Connection" Dialog.

Installing the Connection

Figure 36:
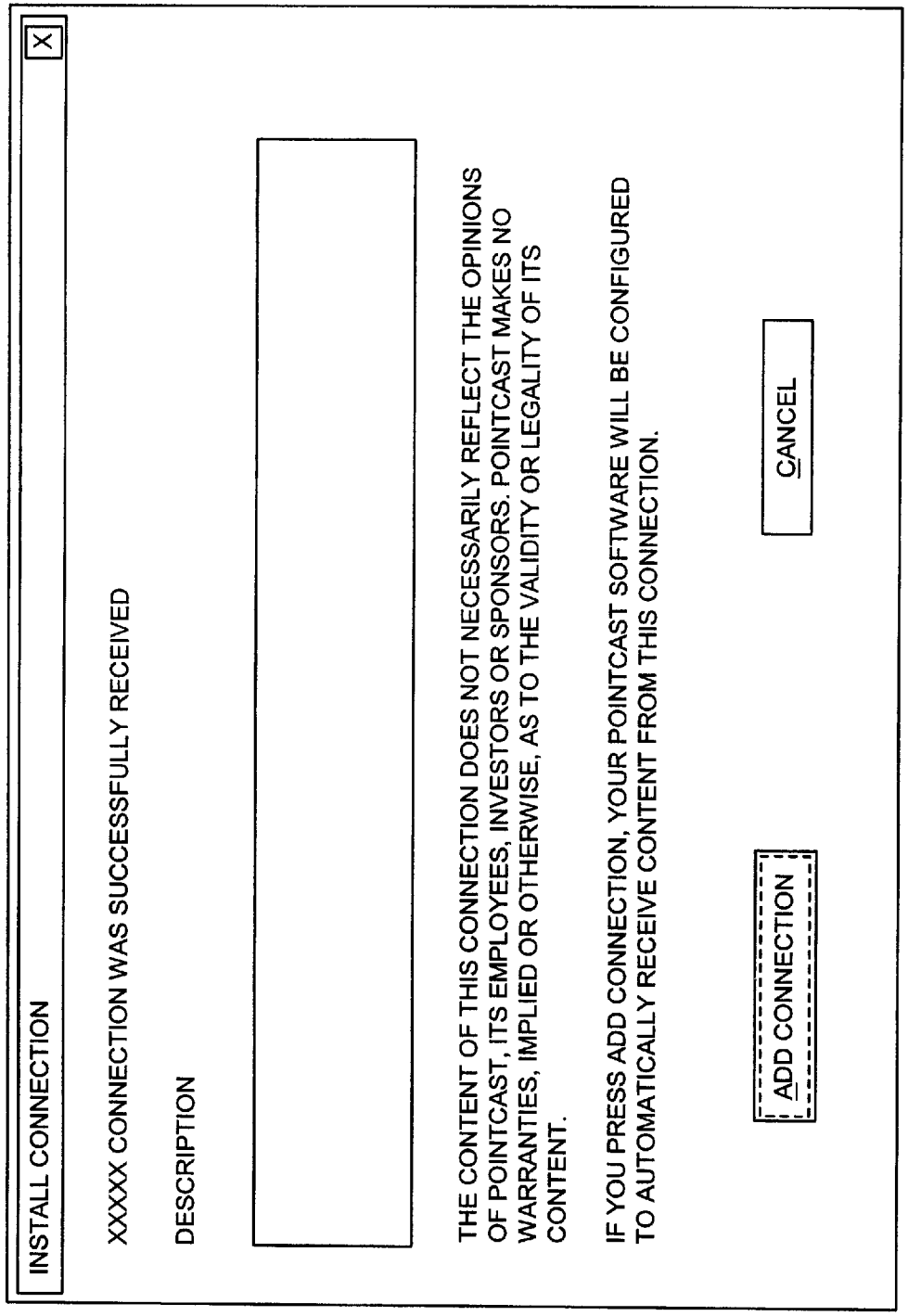
FIG. 36 shows an exemplary graphical user interface or screen that may be presented to allow a connection to be installed.

After the .ppa file is transferred to the client PC, the mini-app will pop-up the following dialog:

FIG. 36 shows an exemplary graphical user interface or screen that may be presented to allow a connection to be installed.

The xxxxx represents the Name property of the Connection downloaded. The Description provided by in the ppa file is displayed in the Description text box. If the user clicks the "Cancel" button, the ppa file is deleted from the user's disk and the mini-app exits. If the user clicks "Add Connection", the Connection is added to the pa.cfg file.

Before the ppa file is written/copied to the PointCast installation directory under the pa subdirectory, the expiration frequency is checked to make sure it falls between the [Refresh] Min= and Max=refresh rates. If the refresh/expire time does not fall within those bounds, the expires time shall be changed when writing the properties to the fetch item table (to the valid range).

Figure 37:
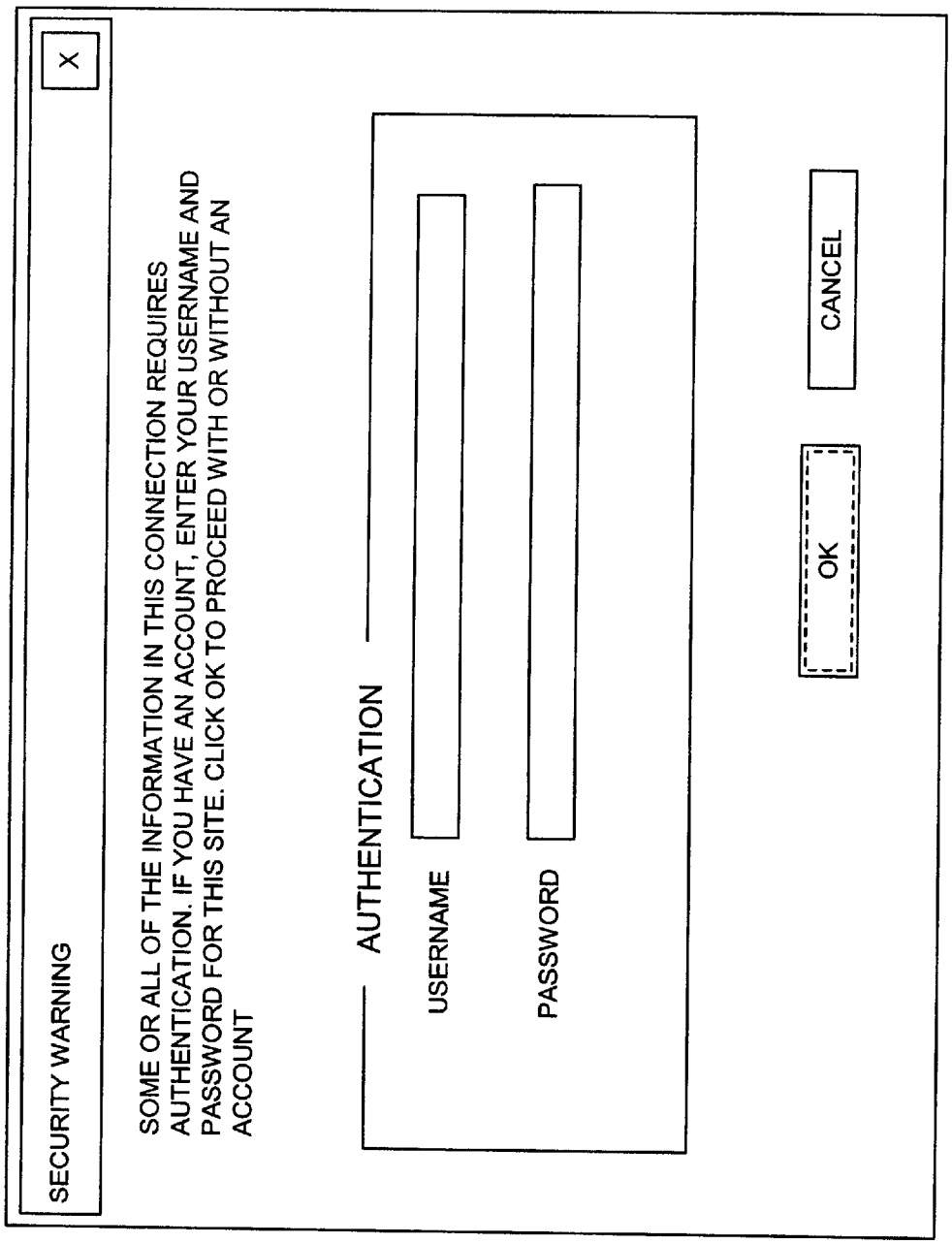
FIG. 37 shows an exemplary graphical user interface or screen that may be presented to allow authenticating information associated with a connection.

If .ppa specifies [Authenticate=True] for the connection (or any article or animation in the .ppa has [Authenticate= True]) the user is prompted for Username and Password:

FIG. 37 shows an exemplary graphical user interface or screen that may be presented to allow authenticating information associated with a connection.

If the user doesn't have an account or doesn't remember their username and password, they can Uninstall the Connection until they get an account. The connection publisher may have content that does not require authentication mixed with content that requires authentication. See the Connections specification for details on this behavior. If they click cancel, the Connection is installed. LCM will attempt to fetch connections and/or articles which require authentication, but if the authentication fails, a flag will be set in LCM for that connection and no attempt will be made in the future to fetch an article or animation which requires authentication until the user changes the username and/or password properties in the Personalize Connections tab.

Next, the user is then asked if they want to Update the contents of the Connection.

FIG. 38 shows an exemplary graphical user interface or screen that may be presented to allow downloading of connection articles to begin.

Connection Properties

Figure 39:
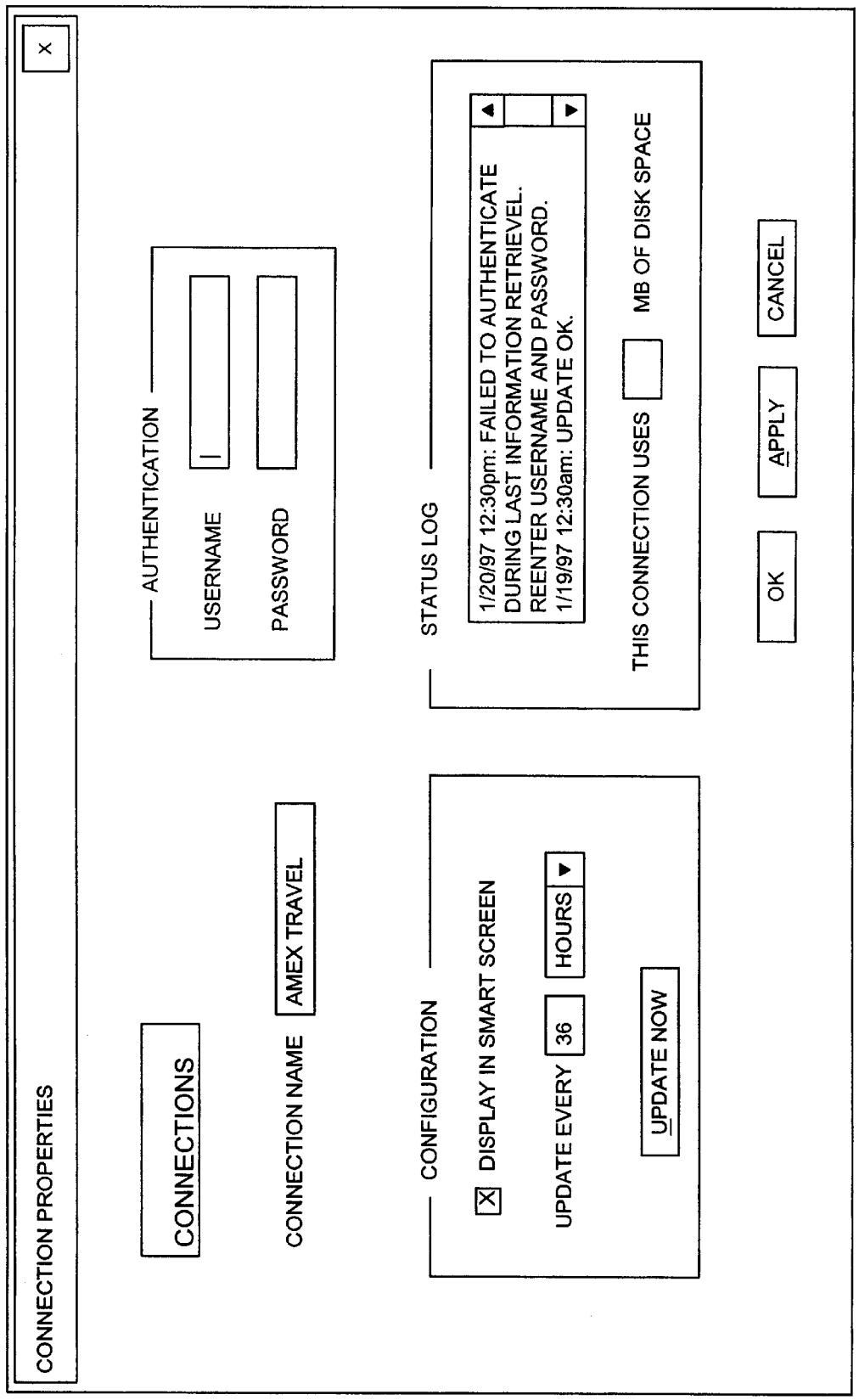
FIG. 39 shows an exemplary graphical user interface or screen that may be presented to display and allow modification of connection properties.

FIG. 39 shows an exemplary graphical user interface or screen that may be presented to display and allow modification of connection properties.

After each fetch, the connection properties are updated with the following information:
  Last updated date and time
  Update frequency—which can be changed by the user.
  Last download size which specifies how many MB's of data were fetched during the last retrieval.—this is displayed to the user in the "This connection uses nn MB of disk space" area of the Status log.

The display in Screen Saver property is initially specified by the Connection publisher, but may be overridden by the user to display or not display each article or animation in the Smart Screen. The publisher has the ability to control down to the article/animation level what is displayed in the Smart Screen or Channel Viewer. The user can only control display at the connection level—and only restrict display to the Smart Screen.

Username and Password or disabled for Connections which require no authentication.

The status log shows the status of retrievals, if a failure occurs the following status strings may be displayed as appropriate:
  1. Failed to authenticate during last information retrieval. Re-enter username and password.
  2. Failed to retrieve some information specified by connection.
  3. Bad connection URL. Please remove this connection and reinstall it.
  4. Update OK.

Every entry in the status log is preceded by the data and time the entry is made. The number of entries maintained by the status log is controlled by the pa.cfg file. The default number of entries is 10. (note: the pa.dat is now used to store the list of .pcc connections, pa.cfg maintains configuration information for the Connections channel.

1. Information Dithering/Load Balancing

There are two distinct general approaches to load balancing or dithering. The first is based on taking action at or with respect to the server. The second is based on taking action at or with respect to a client workstation.

For automated fethces of information from the server, it is generally the case that the server is adapted to schedule such activity and it therefore tells the client when it should return for its next update. The server varies and distributes these times to keep clients' requests from bunching up when they make automated information fetches.

For schedule fetches controlled by or set at the client, the local workstation program implements its own fetch dithering logic. When a user schedules updates at a specific time, but most especially when the selected time is on an hour, a random value of from 2 to 17 minutes is added to the scheduled update time. The random value is added each time the client is launched so that the time at which updates are performed for a given client vary from day to day or "power-on" to "power-on." The concept is to control the offset automatically and make its value less obvious. This spread the update times for 4 scheduled fetches over a 15 minute window which can be enlarged or moved as dictated by system usage. This greatly reduces peak traffic at the originating data center.

While the present inventions have been described with reference to a few specific embodiments, the description is illustrative of the inventions and is not to be construed as limiting the inventions. Various modifications may occur to those skilled in the art without departing from the true spirit and scope of the inventions.

We claim:

1. A method comprising:
  receiving distributable information from a first information transmission service and receiving distributable information from a second information transmission service;
  organizing the distributable information into information categories, including assigning the distributable information received from the first information transmission service to a first predetermined information category and assigning the distributable information received from the second information transmission service to a second predetermined information category; and
  distributing at least a subset of the distributable information to each of a plurality of computers based on information categories indicated to be of interest to the plurality of computers.

2. The method of claim 1, wherein receiving distributable information includes receiving an advertisement from the first information transmission service and includes receiving news from the second information transmission service.

3. The method of claim 2, wherein the first information transmission service includes a stock market news transmission service, and wherein the second information transmission service includes a sports news transmission service.

4. The method of claim 1, wherein organizing further comprises selecting the distributable information, assigning the distributable information to one or more information categories, and formatting the distributable information for dissemination to the plurality of computers.

5. The method of claim 1, wherein distributing includes distributing the subset to the plurality of computers according to profiles that indicate categories of interest associated with each of the plurality of computers.

6. The method d of claim 5, wherein distributing includes distributing to a subscriber based on a subscriber identifier, a connection password, subscriber hardware and software configuration information that is used to determine the type of information that is compatible with the subscriber's computer, and category preference information that identifies information categories the subscriber wants to view.

7. The method of claim 1, wherein distributing comprises:
   determining updated information to distribute to a first computer of the plurality; and
   determining distributed information at the first computer to be deleted;
   generating instruction specifying the distributed information to be deleted; and
   sending the updated information and the instructions to the first computer.

8. The method of claim 1, further comprising receiving at least a portion of a user profile from each of the plurality of computers, the portion indicating preferred information viewing categories.

9. The method of claim 8, wherein distributing includes distributing based on the at least a portion of the user profile associated with each of the plurality of computers.

10. The method of claim 1, further comprising:
    selecting a next recommended download time for each of the plurality of computers, the next recommended download times spread over time; and
    sending the next recommended download time to each of the plurality of computers.

11. The method of claim 1, wherein distributing at least a subset of the distributable information includes distributing an information item having a wrapper that includes descriptive information that describes the properties of the information item.

12. The method of claim 11, wherein a format of the information item is HTML and a format of the wrapper is HTML.

13. The method of claim 11, further comprising:
    receiving the information item having the wrapper;
    storing the information item having the wrapper to a memory;
    examining the wrapper of the information item and adding descriptive information that describes the properties of the information item to a record that also contains descriptive information for other information items; and
    using the record to manage use of the information item on a computer.

14. The method of claim 1, wherein distributing at least a subset of the distributable information includes distributing an actor and distributing an information item that includes syntax to associate the information item with the actor, the actor to move around a display with the associated information item.

15. The method of claim 14, wherein distributing an information item includes distributing an information item with a wrapper, the wrapper containing descriptive information about the information item including a tag to associate the information item with the actor.

16. The method of claim 14, further comprising:
    using the syntax to match the information item to the actor; and
    displaying the actor and the information item.

17. The method of claim 1, wherein distributing at least a subset of the distributable information includes distributing an information item and distributing an actor that includes syntax to associate the actor with the information item, the actor to move around a display with the associated information item.

18. The method of claim 1, wherein receiving distributable information from a first network device includes receiving a text item and an associated image item, the method further comprising providing one or more tags to define the text item and the associated image item as a linked set to display simultaneously.

19. The method of claim 1, further comprising distributing software to one or more of the computers, the software to accept user input including subscriber information viewing preferences at the one or more computers and generate a user profile based on the user input.

20. The method of claim 19, further comprising:
    providing user input that indicates information viewing preferences of a subscriber;
    generating a user profile based on the user input; and
    receiving categorized information based on the user profile.

21. The method of claim 20, further comprising transmitting the user profile to a server that serves a plurality of subscribers computers.

22. The method of claim 20, wherein providing includes providing computer hardware and software configuration information, and wherein receiving includes receiving categorized information files compatible with the configuration information.

23. The method of claim 20, wherein providing includes providing a subscriber identifier and a connection password.

24. The method of claim 20, wherein providing includes providing user input that indicates information categories the subscriber does not want to view and wherein receiving includes receiving categorized information that does not include those information categories.

25. The method of claim 20, wherein receiving includes receiving an advertisement and receiving categorized news.

26. The method of claim 20, wherein receiving includes receiving categorized information at a predetermined next connection time specified by an information server.

27. The method of claim 20, wherein receiving includes receiving categorized information randomly selected within boundaries of a user specified schedule of connections.

28. The method of claim 20, wherein receiving comprises receiving an information item wrapped in a content wrapper, wherein the content wrapper includes one or more predetermined tags that indicate one or more properties of the information item.

29. The method of claim 1, further comprising:
    receiving a plurality of user profiles from a plurality of subscribers computers, each of the user profiles indicating information viewing preferences; and
    generating a group profile based on the plurality of user profiles, the group profile representing a union of information viewing preferences for the plurality of subscribers computers.

30. The method of claim 1, further comprising:
receiving updated information and one or more instructions that specify previously received information to be deleted; and
deleting the previously received information according to the one or more instructions.

31. The method of claim 1, further comprising:
receiving distributable information at a subscriber computer, the distributable information including a headline having associated content, the headline linked with the associated content by one or more tags;
storing the distributable information in a memory of the subscriber computer;
representing the headline as an entry in a queue;
selecting the headline entry from the queue and displaying the headline on a display device of the subscriber computer if the associated content indicated by the one or more tags exists in the memory; and
displaying the associated content if the headline is selected.

32. The method of claim 1, further comprising:
receiving distributable information at a subscriber computer, the distributable information including a plurality of new information content items; and
dynamically displaying the plurality of new information content items so that the displayed content varies over time by using old instructions at the network device, the old instructions created before creation of the plurality of new information content items, the old instructions not containing instructions that are hardwired to the plurality of new information content items and to display the plurality of new information content items based on old tags that indicate properties of each of the plurality of new information content items.

33. The method of claim 1, further comprising distributing software to at least one computer of the plurality of computers, the software to generate display statistics corresponding to distributable information that is distributed to the at least one computer.

34. The method of claim 33, further comprising:
generating display statistics for at least one item of the at least a subset of the distributable information, the display statistics including information about the number of times the at least one item has been displayed; and
transferring the display statistics to a network location associated with the at least one item of the distributable information.

35. The method of claim 34, wherein transferring the display statistics includes transferring the display statistics at predetermined time periods.

36. The method of claim 34, wherein transferring includes transferring during a connection to a network information server to obtain updated information.

37. The method of claim 1, further comprising distributing a plurality of scripts to each of the plurality of computers, each of the scripts when executed controls the display of at least a subset of the distributable information for a period of time, including controlling items of the subset that are displayed and controlling a position of each of the items.

38. The method of claim 37, wherein at least one script when executed controls movement of an item.

39. The method of claim 37, wherein at least one script specifies fetching instructions for an HTML file and display instructions for an animation.

40. The method of claim 1, further comprising:
receiving a script specifying one or more information fetching instructions and one or more information display instructions; and
using the script to display at least a portion of the distributed information, the script controlling the display of the portion of the distributed information for a period of time, including controlling items of the portion that are displayed and controlling a position of each of the items.

41. The method of claim 40, further comprising:
receiving a second script; and
using the second script to display at least a second portion of the distributed information for a predetermined period of time, the second script controlling items of the second portion that are displayed, and controlling movement of at least one of the items.

42. The method of claim 40, wherein receiving comprises receiving a dynamic script that includes one or more associative tags to define the associative relationship between at least one text item and at least one image to create a linked set of the least one text item and the least one image.

43. The method of claim 42, further comprising displaying the linked set by sequencing through the dynamic script, finding the linked set, and playing the linked set regardless of the order of the linked sets constituent data chunks in storage.

44. A machine-readable medium having stored thereon data representing sequences of instructions that when executed cause a machine to:
receive distributable information from a first information transmission service and receive distributable information from a second information transmission service;
organize the distributable information into information categories, including assigning the distributable information received from the first information transmission service to a first predetermined information category and assigning the distributable information received from the second information transmission service o a second predetermined information category; and
distribute at least a subset of the distributable information to each of a plurality of computers based on information categories indicated to be of interest to the plurality of computers.

45. The machine-readable medium of claim 44, wherein the instructions further comprise instructions causing the machine to:
receive user input that indicates information viewing preferences of a subscriber;
generate a user profile based on the user input; and
receive categorized information based on the user profile.

46. The machine-readable medium of claim 44, wherein the instructions further comprise instructions causing the machine to:
generate display statistics for at least one item of the at least a subset of the distributable information, the display statistics including information about the number of times the at least one item has been displayed; and
transfer the display statistics to a network location associated with the at least one item of the distributable information.

* * * * *